US010910967B2

(12) United States Patent
Miura

(10) Patent No.: US 10,910,967 B2
(45) Date of Patent: Feb. 2, 2021

(54) MOTOR DRIVER DEVICE AND SEMICONDUCTOR DEVICE

(71) Applicant: Rohm Co., Ltd., Kyoto (JP)

(72) Inventor: Shinichi Miura, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 16/578,532

(22) Filed: Sep. 23, 2019

(65) Prior Publication Data

US 2020/0106375 A1 Apr. 2, 2020

(30) Foreign Application Priority Data

Oct. 1, 2018 (JP) ................................. 2018-186414

(51) Int. Cl.
*H02P 6/18* (2016.01)
*H02P 27/06* (2006.01)

(52) U.S. Cl.
CPC ............... *H02P 6/18* (2013.01); *H02P 27/06* (2013.01)

(58) Field of Classification Search
CPC .................................. H02P 6/18; H02P 27/06
USPC ............................................ 318/400.42, 700
See application file for complete search history.

(56) References Cited

U.S. PATENT DOCUMENTS 7,590,334 B2 * 9/2009 Yabusaki ............... H02P 25/18
318/400.06

FOREIGN PATENT DOCUMENTS

JP 2005-039991 2/2005

* cited by examiner

*Primary Examiner* — David Luo
(74) *Attorney, Agent, or Firm* — Fish & Richardson P.C.

(57) ABSTRACT

A motor driver device supplies drive voltages to three phase coils of a stator in a brushless DC motor based on a detection result of a position of a rotor in a sensorless manner. In a position detection section, two phase coils are set as a target coil pair and a remaining one phase coil is set as a non-target coil, and with respect to all combinations of target coil pairs, a first process of applying a pulse voltage from a first direction to the target coil pair and a second process of applying a pulse voltage from a second direction opposite to the first direction to the target coil pair are executed. In the first and second processes, power supply to the non-target coil is stopped. The position of the rotor is detected based on voltages generated in the non-target coil in each first process and each second process.

13 Claims, 31 Drawing Sheets

FIG. 5A
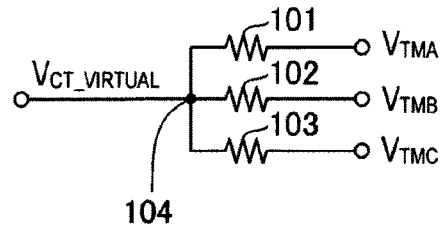
FIG. 5B
$$V_{CT} \begin{cases} V_{CT\_REAL} \\ V_{CT\_VIRTUAL} \end{cases}$$
FIG. 5C
$$\begin{cases} V_{SPA} = V_{TMA} - V_{CT} \\ V_{SPB} = V_{TMB} - V_{CT} \\ V_{SPC} = V_{TMC} - V_{CT} \end{cases}$$
FIG. 5D
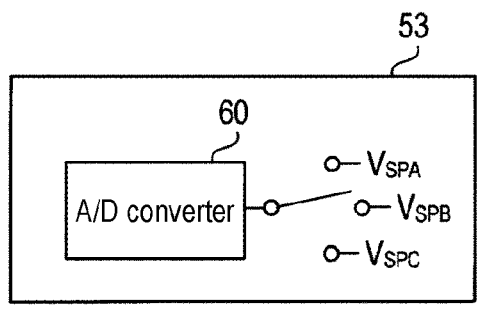

FIG. 6A

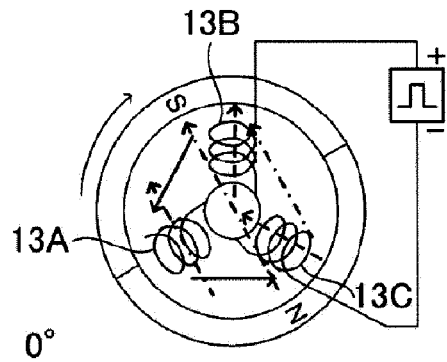

0°

←-·- Magnetic field due to rotor magnet
←-- Magnetic field due to detection current
←— Magnetic field due to mutual inductance

FIG. 6B

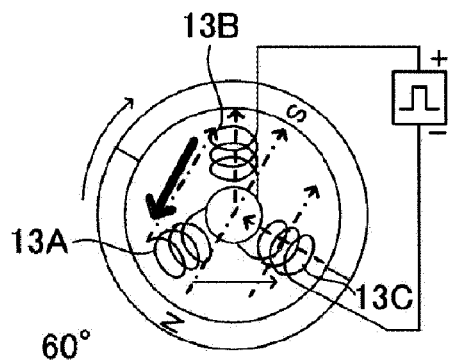

60°

←-·- Magnetic field due to rotor magnet
←-- Magnetic field due to detection current
←— Magnetic field due to mutual inductance

FIG. 6C

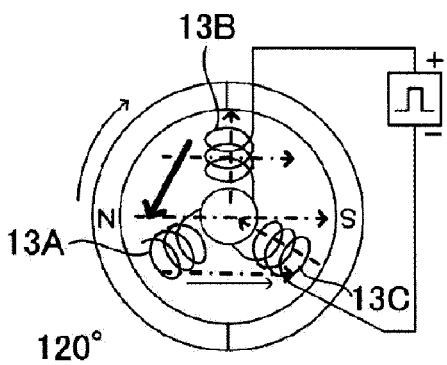

120°

←-·- Magnetic field due to rotor magnet
←-- Magnetic field due to detection current
←— Magnetic field due to mutual inductance

FIG. 6D

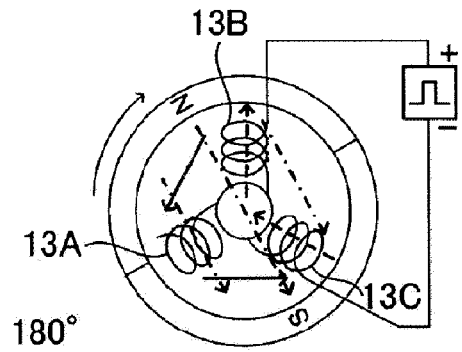

← – · Magnetic field due to rotor magnet
← – – Magnetic field due to detection current
←——— Magnetic field due to mutual inductance

FIG. 6E

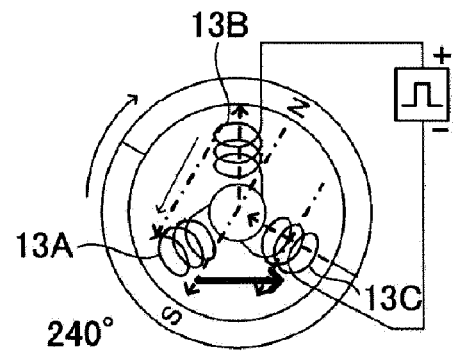

← – · Magnetic field due to rotor magnet
← – – Magnetic field due to detection current
←——— Magnetic field due to mutual inductance

FIG. 6F

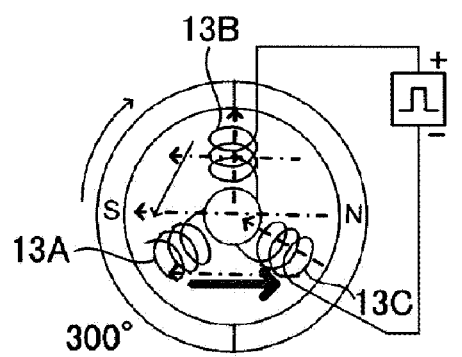

← – · Magnetic field due to rotor magnet
← – – Magnetic field due to detection current
←——— Magnetic field due to mutual inductance Drive section
Position detection section
→ Time

P[0] P[1] P[2] P[3] P[4] P[5] P[6]

| Dummy section | Actual detection section | Actual detection section | Actual detection section | Actual detection section | Actual detection section | Actual detection section |

Position detection section
(During execution of 7-pulse application process)

FIG. 24

| Detection result in (k-1)th position detection section | kth position detection section | | | |
|---|---|---|---|---|
| | Target coil pair | Non-target coil | P[0] | P[1],[2] |
| $R_A[0], R_A[3]$ | B&C phase | A phase | C→B | B→C,C→B |
| $R_A[1], R_A[4]$ | A&B phase | C phase | B→A | A→B,B→A |
| $R_A[2], R_A[5]$ | C&A phase | B phase | C→A | A→C,C→A |

FIG. 29

| Detection result in $(k-1)^{th}$ position detection section | $k^{th}$ position detection section | | | | | |
|---|---|---|---|---|---|---|
| | P[0] | P[1]~P[4] Target coil pair | P[1] | P[2] | P[3] | P[4] |
| $R_R[0], R_R[3]$ | A→C | B&C phase, A&B phase | B→C | B→A | C→B | A→B |
| $R_R[1], R_R[4]$ | B→C | A&C phase, A&B phase | A→C | B→A | C→A | A→B |
| $R_R[2], R_R[5]$ | B→A | A&C phase, B&C phase | A→C | B→C | C→A | C→B |

Acquiring $V_{BC+CB}$ & $V_{AB+BA}$

Acquiring $V_{AC+CA}$ & $V_{AB+BA}$

Acquiring $V_{AC+CA}$ & $V_{BC+CB}$

FIG. 31

| BEMF | Forward rotation | Backward rotation |
|---|---|---|
| $V_{SPA} \downarrow$ | $V_{SPB}(+)$ & $V_{SPC}(-)$ | $V_{SPC}(+)$ & $V_{SPB}(-)$ |
| $V_{SPC} \uparrow$ | $V_{SPB}(+)$ & $V_{SPA}(-)$ | $V_{SPA}(+)$ & $V_{SPB}(-)$ |
| $V_{SPB} \downarrow$ | $V_{SPC}(+)$ & $V_{SPA}(-)$ | $V_{SPA}(+)$ & $V_{SPC}(-)$ |
| $V_{SPA} \uparrow$ | $V_{SPC}(+)$ & $V_{SPB}(-)$ | $V_{SPB}(+)$ & $V_{SPC}(-)$ |
| $V_{SPC} \downarrow$ | $V_{SPA}(+)$ & $V_{SPB}(-)$ | $V_{SPB}(+)$ & $V_{SPA}(-)$ |
| $V_{SPB} \uparrow$ | $V_{SPA}(+)$ & $V_{SPC}(-)$ | $V_{SPC}(+)$ & $V_{SPA}(-)$ |

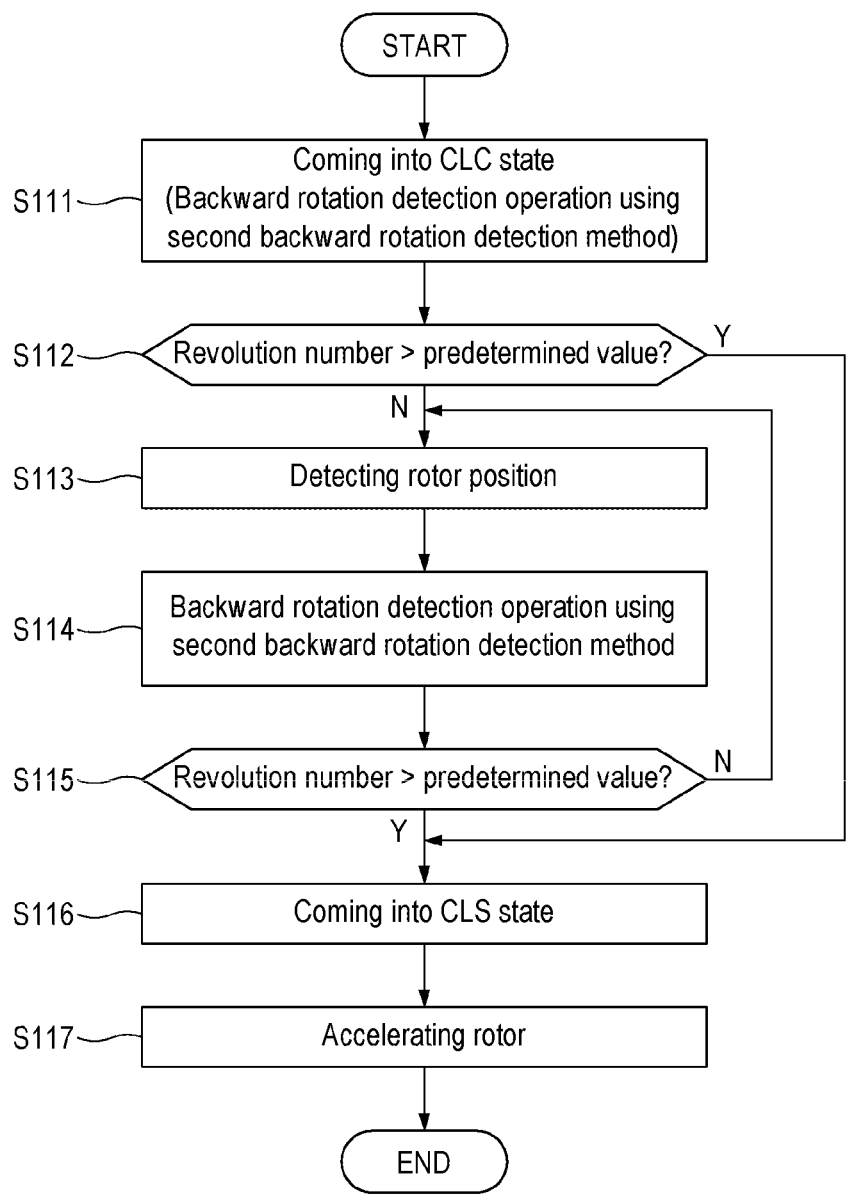

MOTOR DRIVER DEVICE AND SEMICONDUCTOR DEVICE

CROSS-REFERENCE TO RELATED APPLICATION

This application is based upon and claims the benefit of priority from Japanese Patent Application No. 2018-186414, filed on Oct. 1, 2018, the entire contents of which are incorporated herein by reference.

TECHNICAL FIELD

The present disclosure relates to a motor driver device and a semiconductor device.

BACKGROUND

In a motor having no brush commutation mechanism such as a brushless DC motor or the like, it is necessary to switch the direction of a current supplied to a coil depending on the position of a rotor. As methods for driving a brushless DC motor, there are widely known methods that use rotor position information obtained from Hall elements and sensorless methods that estimate a rotor position based on coil voltage information without using Hall elements.

The sensorless methods include a method for estimating a rotor position based on the zero cross point of a counter electromotive force (induced voltage) generated in a coil and a method for estimating a rotor position from coil current information by inserting a test section for application of a test voltage into a motor drive voltage application section.

In the sensorless methods, particularly in a rotor acceleration stage, it is desired to stably estimate and detect a rotor position with a high resolution. However, there is room for improvement in the conventional rotor position detection methods.

SUMMARY

Some embodiments of the present disclosure provide a motor driver device and a semiconductor device capable of stably detecting a rotor position with a high resolution in a sensorless manner.

An aspect of the present disclosure provides a motor driver device that drives a brushless direct current (DC) motor in a sensorless manner. The motor driver device includes: a position detector configured to detect a position of a rotor of the brushless DC motor, which has first to third phase coils connected to one another at a neutral point, based on a voltage of each of the phase coils; a drive controller configured to generate a drive control signal for rotating the rotor based on a detection result of the position of the rotor obtained by the position detector; and an output stage circuit configured to supply drive voltages to the respective phase coils based on the drive control signal. The motor driver device further includes a position detection controller configured to set a position detection section and cause the output stage circuit to execute a position detection operation in the position detection section. The position detection operation includes a pulse train application process. In the pulse train application process, given that two of the first to third phase coils are set as a target coil pair and a remaining one of the first to third phase coils is set as a non-target coil, the output stage circuit is further configured to, with respect to all combinations of target coil pairs, execute a first process of applying a pulse voltage from a first direction to the target coil pair and a second process of applying a pulse voltage from a second direction opposite to the first direction to the target coil pair, and stop power supply to the non-target coil in the first process and the second process. The position detector detects the position of the rotor based on voltages generated in the non-target coil in each first process and each second process of the pulse train application process.

Specifically, in some embodiments, the pulse train application process may include a first application process of applying the pulse voltage to the target coil pair composed of the first phase coil and the second phase coil with the first phase coil set to a high potential side, a second application process of applying the pulse voltage to the target coil pair composed of the first phase coil and the second phase coil with the second phase coil set to a high potential side, a third application process of applying the pulse voltage to the target coil pair composed of the second phase coil and the third phase coil with the second phase coil set to a high potential side, a fourth application process of applying the pulse voltage to the target coil pair composed of the second phase coil and the third phase coil with the third phase coil set to a high potential side, a fifth application process of applying the pulse voltage to the target coil pair composed of the third phase coil and the first phase coil with the third phase coil set to a high potential side, and a sixth application process of applying the pulse voltage to the target coil pair composed of the third phase coil and the first phase coil with the first phase coil set to a high potential side. The non-target coil may be the third phase coil in the first application process and the second application process, the first phase coil in the third application process and the fourth application process, and the second phase coil in the fifth application process and the sixth application process. The position detector may detect the position of the rotor based on a first evaluation voltage, a second evaluation voltage, and a third evaluation voltage. The first evaluation voltage, the second evaluation voltage, and the third evaluation voltage may be a sum of voltages generated in the third phase coil in the first application process and the second application process, a sum of voltages generated in the first phase coil in the third application process and the fourth application process, and a sum of voltages generated in the second phase coil in the fifth application process and the sixth application process, respectively.

In some embodiments, the position detector may detect the position of the rotor based on polarities of the first evaluation voltage to the third evaluation voltage.

In some embodiments, the position detector may detect the position of the rotor based on magnitude relationships among the first evaluation voltage to the third evaluation voltage.

In some embodiments, the position detector may detect the position of the rotor based on polarities of the first evaluation voltage to the third evaluation voltage and magnitude relationships among the first evaluation voltage to the third evaluation voltage.

In some embodiments, the pulse train application process may further include a dummy application process that is executed before the first application process to the sixth application process. In the dummy application process, the output stage circuit may set two of the first to third phase coils as the target coil pair, apply the pulse voltage to the target coil pair, and stop power supply to a remaining one of the first to third phase coils in the dummy application process.

In some embodiments, the position detection controller may set an application time of the pulse voltage applied to each target coil pair in the first application process to the sixth application process based on a current flowing through the target coil pair in the dummy application process.

More specifically, in some embodiments, the position detection controller may measure a time from a start of application of the pulse voltage to the target coil pair to a time at which the current flowing through the target coil pair reaches a predetermined value in the dummy application process, and set the measured time as the application time of the pulse voltage applied to each target coil pair in the first application process to the sixth application process.

In some embodiments, the position detector may detect the position of the rotor in consideration of a revolution number of the rotor when detecting the position of the rotor from the detection result of the voltage generated in the non-target coil.

In some embodiments, the position detection controller may be further configured to: insert a plurality of position detection sections into a drive section in which the drive voltages are supplied; cause the output stage circuit to execute a reference pulse train application process, which is the pulse train application process, as the position detection operation in a first position detection section; and then cause the output stage circuit to execute a modified pulse train application process as the position detection operation in a second position detection section. In the modified pulse train application process, given that two of the first to third phase coils are set as the target coil pair and a remaining one of the first to third phase coils is set as the non-target coil, the output stage circuit may be further configured to execute the first process and the second process with respect to the target coil pair, and stop power supply to the non-target coil in the first process and the second process. The position detection controller may set the target coil pair in the modified pulse train application process based on the detection result of the position of the rotor obtained in the reference pulse train application process. When the modified pulse train application process is executed after the reference pulse train application process, the position detector may detect the position of the rotor based on a voltage generated in the non-target coil in the first process and the second process of the modified pulse train application process.

In some embodiments, the position detection controller may be further configured to: insert a plurality of position detection sections into a drive section in which the drive voltages are supplied; cause the output stage circuit to execute a reference pulse train application process, which is the pulse train application process, as the position detection operation in a first position detection section; and then cause the output stage circuit to execute a modified pulse train application process as the position detection operation in a second position detection section. In the modified pulse train application process, given that two sets of target coil pairs are set such that in each of the two sets, two of the first to third phase coils are set as the target coil pair and a remaining one of the first to third phase coils is set as the non-target coil, the output stage circuit may be further configured to execute the first process and the second process with respect to the two sets of target coil pairs, and stop power supply to the non-target coil in the first process and the second process. The position detection controller may set the two sets of target coil pairs in the modified pulse train application process based on the detection result of the position of the rotor obtained in the reference pulse train application process. When the modified pulse train application process is executed after the reference pulse train application process, the position detector may detect the position of the rotor based on a voltage generated in the non-target coil in the first process and the second process of the modified pulse train application process.

In some embodiments, the motor driver device may drive a spindle motor, which rotates a magnetic disk of a magnetic disk device, as the brushless DC motor in a sensorless manner.

Another aspect of the present disclosure provides a semiconductor device that forms the above-described motor driver device. The motor driver device is formed of an integrated circuit.

BRIEF DESCRIPTION OF DRAWINGS

FIGS. 5A to 5D are diagrams for explaining several voltages referred to in the embodiments of the present disclosure.

FIGS. 6A to 6F are diagrams showing states of magnetic fields related to the SPM according to an embodiment of the present disclosure.

FIG. 24 is an explanatory diagram of a method for determining contents of the 3-pulse application process according to Example 6 of the present disclosure.

FIG. 29 is an explanatory diagram of a method for determining contents of a 5-pulse application process according to Example 7 of the present disclosure.

FIG. 31 is an explanatory diagram of a first backward rotation detection method according to Example 8 of the present disclosure.

FIG. 34 is a flowchart in a rotor acceleration stage according to Example 10 of the present disclosure.

DETAILED DESCRIPTION

Figure 1:
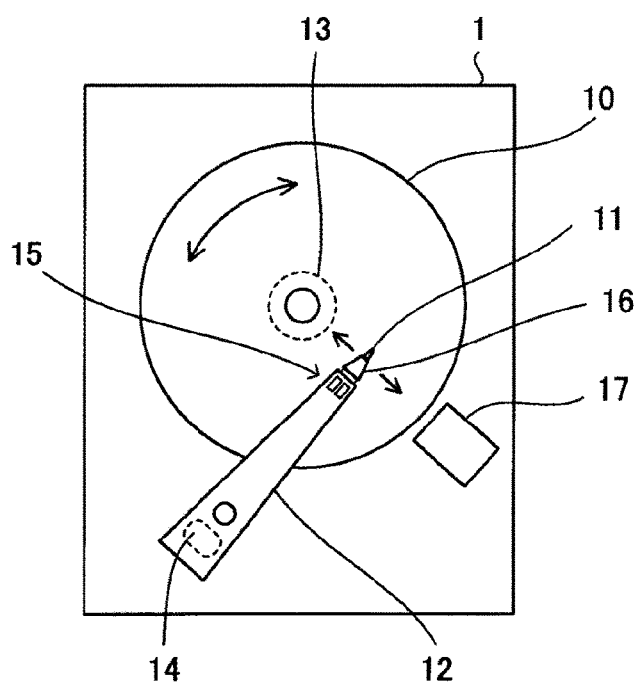
FIG. 1 is a schematic configuration diagram relating to a mechanism of a hard disk device according to an embodiment of the present disclosure.

Embodiments of the present disclosure will now be described in detail with reference to the drawings. Like or equivalent components, members, and processes illustrated in each drawing are given like reference numerals and a repeated description thereof will be properly omitted. In this specification, for simplification of description, the names of information, signals, physical quantities, members or the like corresponding to symbols or signs are sometimes omitted or abbreviated by reciting the symbols or signs that denote the information, the signals, the physical quantities, the members or the like. For example, a driver IC denoted by "30" to be described later may be recited as driver IC 30 or may be abbreviated as IC 30. However, they indicate the same thing.

First, some terms used in the description of the present embodiments will be explained. The term "ground" indicates a conductive part having a reference potential of 0 V (zero volts) or the reference potential itself. As for an arbitrary transistor configured as an FET (field effect transistor) including transistors TrH and TrL to be described later, the term "on state" indicates that the drain and source of the transistor are in a conductive state, and the term "off state" indicates that the drain and source of the transistor are in a non-conducting state (cutoff state). The on state and the off state may be simply expressed as on and off.

FIG. 1 is a schematic configuration diagram relating to a mechanism of a hard disk device (hereinafter referred to as an HDD device) 1 as a magnetic disk device according to an embodiment of the present disclosure.

The HDD device 1 includes a magnetic disk 10 which is a recording medium, a magnetic head 11 (hereinafter also referred to as a head 11) that writes and reads information to and from the magnetic disk 10, an arm 12 that supports the magnetic head 11 so as to be movable in the radial direction of the magnetic disk 10, a spindle motor 13 (hereinafter also referred to as SPM 13) that supports and rotates the magnetic disk 10, and a voice coil motor 14 (hereinafter also referred to as VCM 14) that moves and positions the magnetic head 11 in the radial direction of the magnetic disk 10 by rotationally driving and positioning the arm 12.

The HDD device 1 further includes a pair of piezoelectric elements 15, a load beam 16, and a ramp part 17 that holds the magnetic head 11 at a predetermined retracted position spaced apart from the magnetic disk 10. The load beam 16 is attached to the distal end of the arm 12, and the magnetic head 11 is attached to the distal end of the load beam 16. The pair of piezoelectric elements 15 is arranged near the attachment portion of the load beam 16 at the distal end of the arm 12. By applying voltages to the piezoelectric elements 15 in opposite phases, the piezoelectric elements 15 are expanded and contracted in opposite phases, whereby the magnetic head 11 at the distal end of the load beam 16 can be displaced in the radial direction of the magnetic disk 10.

Thus, the HDD device 1 adopts a so-called two-stage actuator system. The VCM 14 functions as a rough movement actuator that drives the arm 12 to roughly position the magnetic head 11 over the magnetic disk 10 (to position the magnetic head 11 with a relatively rough resolution), and the piezoelectric elements 15 function as a fine movement actuator that adjusts the position of the magnetic head 11 based on the position of the arm 12 to finely position the magnetic head 11 over the magnetic disk 10 (to position the magnetic head 11 with a finer resolution than the VCM 14). Hereinafter, the actuator composed of the piezoelectric elements 15 will be referred to as MA 15 using the abbreviation "MA" for a micro actuator. Furthermore, by providing plural pairs of piezoelectric elements 15, the fine movement actuator may be composed of multistage actuators.

The magnetic disk 10, the magnetic head 11, the arm 12 to which the MA 15 and the load beam 16 are attached, the SPM 13, the VCM 14, and the ramp part 17 are accommodated in a housing of the HDD device 1. Regarding the movement and displacement of the magnetic head 11 by the VCM 14 or the MA 15, the movement and displacement in the radial direction of the magnetic disk 10 means the movement and displacement in the direction connecting the outer periphery and the center of the magnetic disk 10 having a disk shape. However, the movement and displacement of the magnetic head 11 by the VCM 14 or the MA 15 may include components of the movement and displacement in another direction (for example, the tangential direction of the outer circumference of the magnetic disk 10) as well as the movement and displacement of the magnetic disk 10 in the radial direction.

Figure 2:
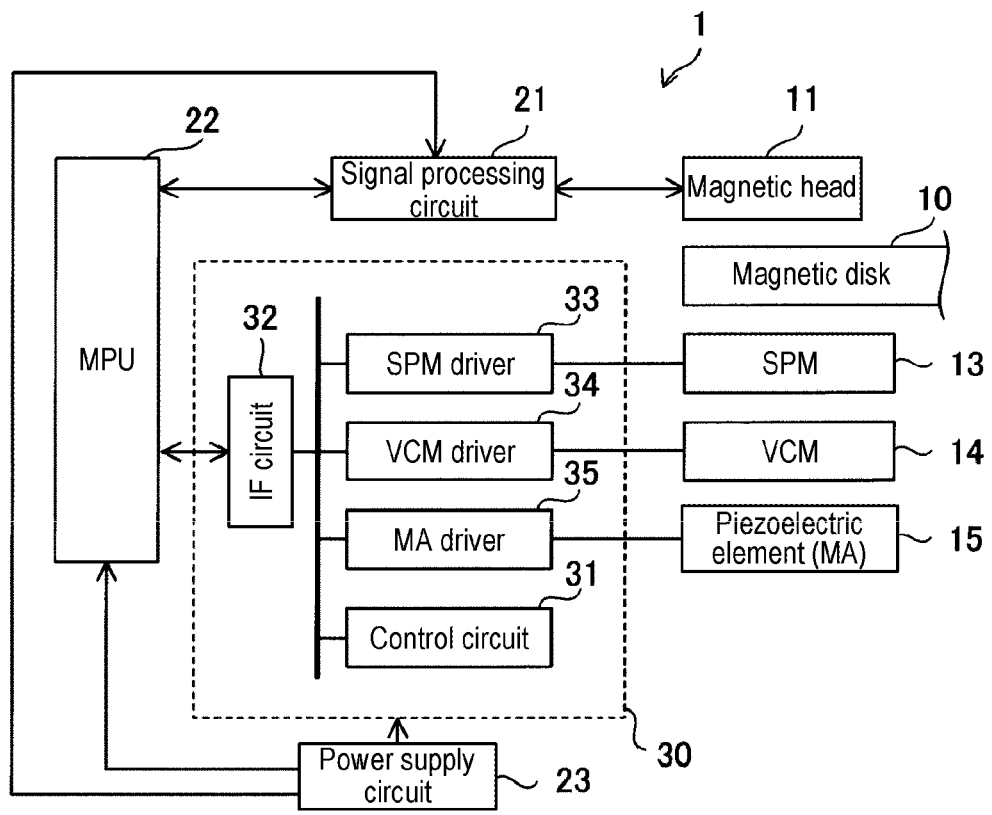
FIG. 2 is an electrical schematic block diagram of the hard disk device according to an embodiment of the present disclosure.

FIG. 2 is an electrical schematic block diagram of the HDD device 1. The HDD device 1 is provided with a driver IC 30, a signal processing circuit 21, an MPU (microprocessing unit) 22, and a power supply circuit 23 as electrical components. The power supply circuit 23 supplies a power supply voltage for driving the driver IC 30, the signal processing circuit 21, and the MPU 22 to the driver IC 30, the signal processing circuit 21, and the MPU 22. The MPU 22 is connected to the signal processing circuit 21 and the driver IC 30 so as to enable bidirectional communications with the signal processing circuit 21 and the driver IC 30.

The signal processing circuit 21 outputs a recording signal for writing information to the magnetic head 11 when writing information (data) on the magnetic disk 10, performs necessary signal processing with respect to a signal read from the magnetic disk 10 when reading information (data) from the magnetic disk 10, and transmits a resultant signal to the MPU 22. The MPU 22 controls an information writing operation and an information reading operation of the magnetic head 11 through the control of the signal processing circuit 21.

Figure 3:
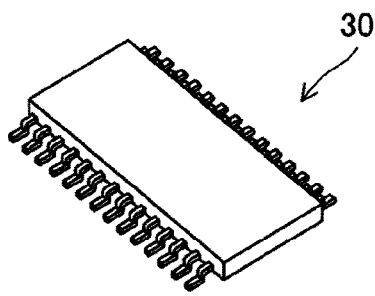
FIG. 3 is an external perspective view of a driver IC mounted on the hard disk device according to an embodiment of the present disclosure.

As shown in FIG. 3, the driver IC 30 is an electronic component (driver device) formed by enclosing a semiconductor integrated circuit in a housing (package) made of a resin. The number of pins (the number of external terminals) of the driver IC 30 shown in FIG. 3 is nothing more than an example. The driver IC 30 is provided with an SPM driver 33 for driving and controlling the SPM 13, a VCM driver 34 for driving and controlling the VCM 14, and an MA driver 35 for driving and controlling the MA 15. In addition, the driver IC 30 is provided with an IF circuit (interface circuit) 32 for enabling bidirectional communications between the MPU 22 and the driver IC 30, and a control circuit 31 for controlling operations of the drivers 33 to 35 based on control data received from the MPU 22 through the IF circuit 32.

The MPU 22 controls the rotation of the magnetic disk 10 through the drive control of the SPM 13 by controlling the SPM driver 33 of the driver IC 30, and performs the movement control and positioning of the magnetic head 11 through the drive control of the VCM 14 and the MA 15 by controlling the VCM driver 34 and the MA driver 35 of the driver IC 30. Position information indicating the respective positions on the magnetic disk 10 is recorded at the respective locations of the magnetic disk 10. When the magnetic head 11 is positioned over the magnetic disk 10, this position information is read by the magnetic head 11 and transmitted to the MPU 22 through the signal processing circuit 21. The MPU 22 can control the VCM driver 34 and the MA driver 35 based on the position information. Through this control, the VCM driver 34 supplies a drive current necessary for the VCM 14, thereby realizing the first stage positioning of the magnetic head 11. In addition, the MA driver 35 supplies a voltage necessary for the MA 15, thereby realizing the second stage positioning of the magnetic head 11. The magnetic head 11 being positioned over the magnetic disk 10 means that the magnetic head 11 is positioned above the magnetic disk 10 with a minute space left therebetween.

In a state in which the position information is not read by the magnetic head 11 because the magnetic head 11 is located outside the outer periphery of the magnetic disk 10, the MPU 22 can control the VCM driver 34 and the MA driver 35 without relying on the position information. For example, when the magnetic head 11 is moved from the retracted position in the ramp part 17 onto the magnetic disk 10, the MPU 22 may output a signal, which instructs the supply of a predetermined drive current suitable for the movement to the VCM 14, to the driver IC 30. Thus, the VCM driver 34 supplies the predetermined drive current to the VCM 14 based on the signal. In the state in which the position information is not read by the magnetic head 11, it is not necessary to precisely control the position of the magnetic head 11. Therefore, the voltage supplied to the MA 15 may be zero or a fixed voltage.

Figure 4:
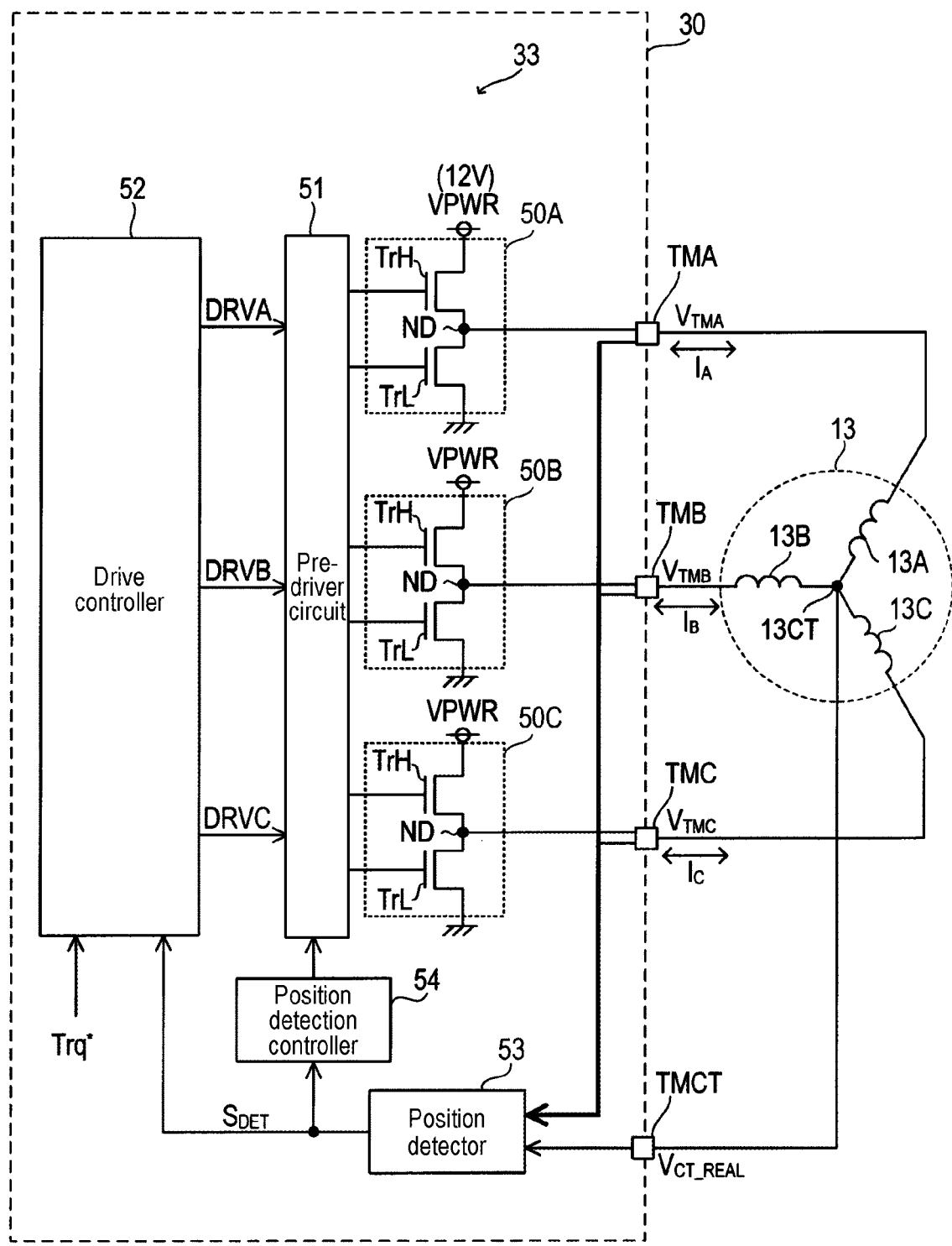
FIG. 4 is a configuration diagram of an SPM and an SPM driver according to an embodiment of the present disclosure.

FIG. 4 shows internal configurations of the SPM 13 and the SPM driver 33 and a connection relationship thereof. The external terminals provided in the driver IC 30 include terminals TMA, TMB, TMC, and TMCT. The SPM 13 is a three-phase brushless DC motor including an A-phase coil 13A, a B-phase coil 13B, and a C-phase coil 13C which are star-connected to one another. The SPM 13 includes a stator and a rotor having permanent magnets. The coils 13A, 13B, and 13C are provided on the stator. The coils 13A, 13B, and 13C are arranged at locations with their phases deviating from one another by an electrical angle of 120 degrees. One end of the coil 13A, one end of the coil 13B, and one end of the coil 13C are connected to the external terminals TMA, TMB, and TMC, respectively. The other ends of the coils 13A, 13B, and 13C are commonly connected to a neutral point 13CT, which is also called a center tap. The external terminals TMA, TMB, and TMC may also be referred to as output terminals. Furthermore, the neutral point 13CT is connected to the external terminal TMCT. In the following description, when a stator and a rotor are merely recited, they indicate the stator and the rotor of the SPM 13.

The SPM driver 33 includes an A-phase half-bridge circuit 50A, a B-phase half-bridge circuit 50B, a C-phase half-bridge circuit 50C, a pre-driver circuit 51, a drive controller 52, a position detector 53, and a position detection controller 54. The SPM driver 33 drives the SPM 13 in a sensorless manner.

Each of the half-bridge circuits 50A, 50B, and 50C includes a high-side transistor TrH and a low-side transistor TrL connected in series between a line to which a power supply voltage VPWR is applied and a ground. The transistors TrH and TrL are configured as N-channel type MOSFETs (Metal Oxide Semiconductor Field Effect Transistors). The power supply voltage VPWR is a predetermined positive DC voltage and is assumed to be, for example, 12 V (volt) in the present embodiment.

More specifically, in each of the half-bridge circuits 50A, 50B, and 50C, the drain of the transistor TrH is connected to a first power supply terminal, to which the power supply voltage VPWR is applied, to receive the power supply voltage VPWR. The source of the transistor TrH and the drain of the transistor TrL are commonly connected to a node ND, and the source of the transistor TrL is connected to the ground that functions as a second power supply terminal. The nodes ND in the half-bridge circuits 50A, 50B, and 50C are connected to the output terminals TMA, TMB, and TMC, respectively. Therefore, the nodes ND in the half-bridge circuits 50A, 50B, and 50C are connected to one ends of the coils 13A, 13B, and 13C via the output terminals TMA, TMB, and TMC, respectively. Although not particularly shown, in each half-bridge circuit, a parasitic diode having a forward direction from the source to the drain of the transistor TrH is connected in parallel to the transistor TrH, and a parasitic diode having a forward direction from the source to the drain of the transistor TrL is connected in parallel to the transistor TrL.

Voltages corresponding to the voltages at one ends of the coils 13A, 13B, and 13C and applied to the output terminals TMA, TMB, and TMC are represented by $V_{TMA}$, $V_{TMB}$, and $V_{TMC}$, respectively. The pre-driver circuit 51 and the half-bridge circuits 50A, 50B, and 50C constitute an output stage circuit. By the output stage circuit, the voltages $V_{TMA}$, $V_{TMB}$, and $V_{TMC}$ are supplied to the coils 13A, 13B, and 13C as drive voltages for an A phase, a B phase and a C phase, respectively. Noting the fact that the voltages $V_{TMA}$, $V_{TMB}$, and $V_{TMC}$ are applied to the terminals TMA, TMB, and TMC, respectively, the voltages $V_{TMA}$, $V_{TMB}$, and $V_{TMC}$ are sometimes referred to as terminal voltages $V_{TMA}$, $V_{TMB}$, and $V_{TMC}$, respectively.

In addition, currents flowing to the coils 13A, 13B, and 13C through the output terminals TMA, TMB, and TMC, respectively, are referred to as coil currents and are denoted by $I_A$, $I_B$, and $I_C$, respectively. Regarding the coil current $I_A$, the polarity of the coil current $I_A$ flowing from the node ND of the half-bridge circuit 50A toward the coil 13A via the output terminal TMA is defined as positive, and the opposite polarity is defined as negative. The polarities are similarly defined for the coil currents $I_B$ and $I_C$.

In order to realize sensorless driving of the SPM 13, the position detector 53 detects the position of the rotor of the SPM 13 (hereinafter sometimes referred to as rotor position) based on the voltages $V_{TMA}$, $V_{TMB}$, and $V_{TMC}$, and outputs a signal $S_{DET}$ indicating the detection result of the rotor position to the drive controller 52. The signal $S_{DET}$ is also supplied to the position detection controller 54. Furthermore, the position detector 53 is also connected to the external terminal TMCT. A voltage $V_{CT\_REAL}$ representing the potential of the neutral point 13CT is applied to the external terminal TMCT. The position of the magnetic pole of the permanent magnet provided on the rotor (the position of the N or S pole) is changed along with the rotation of the rotor, and the position of this magnetic pole is detected as the rotor position. Therefore, the rotor position to be detected may be read as the magnetic pole position.

The drive controller 52 generates and outputs drive control signals DRVA, DRVB, and DRVC for causing the rotor to make a desired rotation based on the signal $S_{DET}$ indicating the detection result of the rotor position obtained by the position detector 53. The signals DRVA, DRVB, and DRVC are drive control signals for the half-bridge circuits 50A, 50B, and 50C, respectively. The drive controller 52 may generate pulse-width-modulated signals as the drive control signals DRVA, DRVB, and DRVC. For example, when a torque command signal Trq*, which specifies a torque to be generated in the SPM 13, is given to the drive controller 52, the drive controller 52 generates the pulse-width-modulated drive control signals DRVA, DRVB, and DRVC so that the torque specified by the torque command signal Trq* can be generated in the SPM 13.

The pre-driver circuit 51 controls the state of each half-bridge circuit by controlling the gate potential of each transistor in the half-bridge circuits 50A, 50B, and 50C according to the drive control signals DRVA, DRVB, and DRVC. Thus, voltages obtained by switching the power supply voltage VPWR according to the drive control signals DRVA, DRVB, and DRVC are applied to the output terminals TMA, TMB, and TMC as the drive voltages $V_{TMA}$, $V_{TMB}$, and $V_{TMC}$, so that the SPM 13 is switched and driven and the rotor is rotated. In a target half-bridge circuit, which is any one of the half-bridge circuits 50A, 50B, and 50C, a state in which the transistor TrH is on and the transistor TrL is off is referred to as a high output state, and a state in which the transistor TrH is off and the transistor TrL is on is referred to as a low output state. Assuming that the on-resistances of the transistors TrH and TrL are zero, for example, when the half-bridge circuit 50A is in the high output state, the power supply voltage VPWR is applied to the output terminal TMA via the high-side transistor TrH. For example, when the half-bridge circuit 50A is in the low output state, the ground potential is applied to the output terminal TMA via the low-side transistor TrL (in which case the transient state is ignored). The same applies to the half-bridge circuits 50B and 50C.

In addition, the target half-bridge circuit may be in a high impedance state (hereinafter sometimes referred to as Hi-Z state). The Hi-Z state in the target half-bridge circuit is realized by turning off the transistors TrH and TrL of the target half-bridge circuit (bringing the transistors TrH and TrL into an off state), whereby the power supply to the corresponding coil by the target half-bridge circuit is stopped.

Referring to FIG. 5A, in the SPM driver 33, a virtual neutral point voltage $V_{CT\_VIRTUAL}$ is generated from the voltages $V_{TMA}$ to $V_{TMC}$ using resistors 101 to 103. More specifically, voltages $V_{TMA}$, $V_{TMB}$, and $V_{TMC}$ are supplied to one ends of the resistors 101, 102, and 103, respectively, and the other ends of the resistors 101 to 103 are commonly connected at a node 104. The voltage generated at the node 104 is the virtual neutral point voltage $V_{CT\_VIRTUAL}$. The resistors 101 to 103 emulate resistance components of the coils 13A to 13C in the SPM 13. However, the resistance values of the resistors 101 to 103 are much larger than the resistance values of the coils 13A to 13C. In the SPM 13, the resistance values of the coils 13A to 13C are substantially equal to one another. Therefore, by making the resistance values of the resistors 101 to 103 coincide with one another, the virtual neutral point voltage $V_{CT\_VIRTUAL}$ can be considered as being equal to the real voltage $V_{CT\_REAL}$ at the neutral point 13CT.

Referring to FIG. 5B, the position detector 53 handles any one of the voltages $V_{CT\_REAL}$ and $V_{CT\_VIRTUAL}$ as a neutral point voltage $V_{CT}$ representing the potential of the neutral point 13CT. The MPU 22 may be able to specify which of the voltages $V_{CT\_REAL}$ and $V_{CT\_VIRTUAL}$ is used as the neutral point voltage $V_{CT}$. When it is predetermined that the voltage $V_{CT\_VIRTUAL}$ is used as the neutral point voltage $V_{CT}$, the external terminal TMCT may be omitted from the IC 30.

As shown in FIG. 5C, a difference voltage ($V_{TMA} - V_{CT}$) between the voltage $V_{TMA}$ applied to the terminal TMA and the neutral point voltage $V_{CT}$, a difference voltage ($V_{TMB} - V_{CT}$) between the voltage $V_{TMB}$ applied to the terminal TMB and the neutral point voltage $V_{CT}$, and a difference voltage ($V_{TMC} - V_{CT}$) between the voltage $V_{TMC}$ applied to the terminal TMC and the neutral point voltage $V_{CT}$ are represented as "$V_{SPA}$," "$V_{SPB}$," and "$V_{SPC}$," respectively. The voltage $V_{SPA}$ represents a voltage (coil voltage) applied across the coil 13A, the voltage $V_{SPB}$ represents a voltage (coil voltage) applied across the coil 13B, and the voltage $V_{SPC}$ represents a voltage (coil voltage) applied across the coil 13C. A circuit that generates the voltages $V_{SPA}$ to $V_{SPC}$ from the voltages applied to the terminals TMA to TMC through the generation of the virtual neutral point voltage $V_{CT\_VIRTUAL}$ or a circuit that generates the voltages $V_{SPA}$ to $V_{SPC}$ from the voltages applied to the terminals TMA to TMC and TMCT is provided in the position detector 53. As shown in FIG. 5D, an A/D converter 60 provided in the position detector 53 samples the voltage $V_{SPA}$, $V_{SPB}$, or $V_{SPC}$ input as an analog voltage at a desired timing, whereby the value of the voltage $V_{SPA}$, $V_{SPB}$, or $V_{SPC}$ can be detected as a digital signal.

The mutual inductance among the coils in the SPM 13 will now be considered. As an example, a relationship between the A-phase coil current $I_A$ and the B-phase coil voltage $V_{SPB}$ will be described. The coil current $I_A$ and the coil voltage $V_{SPB}$ satisfy the relationship represented by the following expressions (A1) and (A2) where "$dI_A/dt$" denotes a time derivative of the coil current $I_A$, M denotes a mutual inductance between the coils 13A and 13B, LA and LB represent self-inductances of the coils 13A and 13B, respectively, "(LA·LB)$^{1/2}$" denotes a positive square root of (LA·LB), and $k_{AB}$ denotes a coupling coefficient between the coils 13A and 13B.

$$V_{SPB} = M \cdot dI_A/dt \quad (A1)$$

$$M = k_{AB}(LA/LB)^{1/2} \quad (A2)$$

The coupling coefficient $k_{AB}$ depends on the rotor position. Therefore, the voltage $V_{SPB}$ generated based on the mutual inductance M (specifically, the voltage $V_{SPB}$ generated in the coil 13B based on the mutual inductance M in response to the time-dependent change of the coil current $I_A$) also depends on the rotor position. For that reason, when the voltage $V_{SPB}$ generated based on the mutual inductance M is detected, it is possible to detect (in other words, estimate) the rotor position from the detection result. Although the relationship between the A phase and the B phase has been described, the same applies to other two phases.

The position detector 53 uses this principle to detect the rotor position. That is, among the A-phase, B-phase, and C-phase coils 13A, 13B, and 13C, two phase coils are treated as a target coil pair and the remaining one phase coil is treated as a non-target coil. A detection current is caused to flow through the target coil pair by applying a detection pulse voltage, which is a pulse-shaped rectangular voltage, to the target coil pair while keeping the half-bridge circuit corresponding to the non-target coil in the Hi-Z state. At this time, the rotor position is detected by detecting the voltage ($V_{SPA}$, $V_{SPB}$, or $V_{SPC}$) generated in the non-target coil based on the mutual inductance.

FIGS. 6A to 6F show states of magnetic fields when the coils 13B and 13C are used as a target coil pair and the detection pulse voltage is applied so that the coil 13B is on the high potential side and the coil 13C is on the low potential side. Specifically, FIGS. 6A to 6F show states of magnetic fields when the rotor positions are 0 degrees, 60 degrees, 120 degrees, 180 degrees, 240 degrees, and 300 degrees, respectively. The rotor position corresponds to a phase in the rotation of the rotor and is expressed by an electrical angle within a range of 0 degrees to 360 degrees. In the present embodiment, the rotor position at which the rotor stops when no current is supplied to the coil 13A and a current is supplied from the coil 13B to the coil 13C is defined as 0 degrees.

In each of FIGS. 6A to 6F, the ring surrounding the coils 13A to 13C schematically shows a permanent magnet provided on the rotor. In each of FIGS. 6A to 6F, three straight lines with arrows indicated by one-dot chain lines represent a magnetic field generated by the permanent magnet provided on the rotor, two straight lines with arrows indicated by broken lines represent a magnetic field generated by a detection current, and two straight lines with arrows indicated by solid lines represent a magnetic field based on the mutual inductance between the coils 13A and 13B and a magnetic field based on the mutual inductance between the coils 13A and 13C.

The magnetic field generated by the mutual inductance is changed according to the rotor position, and the voltage $V_{SPA}$ generated in the coil 13A as the non-target coil (the voltage $V_{SPA}$ based on the mutual inductance) is changed in conjunction therewith. Although FIGS. 6A to 6F show the states of the magnetic fields when the detection pulse voltage is applied to the coils 13B and 13C with the coil 13C of the coils 13B and 13C set to the high potential side, the voltage $V_{SPA}$ varies depending on the rotor position even when the detection pulse voltage is applied in the opposite direction.

In the present embodiment, after setting the coils 13B and 13C as a target coil pair, a sum of the voltage $V_{SPA}$ when the detection pulse voltage is applied so that the coil 13B is on the high potential side and the voltage $V_{SPA}$ when the detection pulse voltage is applied so that the coil 13C is on the high potential side is obtained, and the rotor position is detected using the sum. With only the above sum, the rotor position is detected in 180 degrees steps (i.e., the detection resolution is 180 degrees). Therefore, the same process is performed after setting the coils 13A and 13B as a target coil pair, and the same process is performed after setting the coils 13C and 13A as a target coil pair. By integrating these processes, detection of 60 degrees steps is realized.

Figure 7:
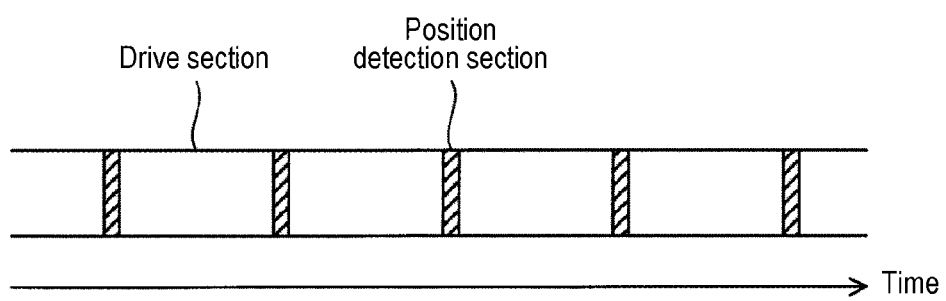
FIG. 7 is a diagram showing a state in which position detection sections are inserted into a drive section according to an embodiment of the present disclosure.

Referring to FIG. 7, a section for applying a detection pulse voltage is referred to as a position detection section, and a section for applying a voltage for rotationally driving the rotor to the output terminals TMA, TMB, and TMC is referred to as a drive section. Basically, all sections in which the rotor needs to be rotated belong to the drive section. The position detection controller 54 (see FIG. 4) periodically inserts position detection sections, each of which has a predetermined length (time length), into the drive section. The insertion period of the position detection sections is set in advance. The insertion period of the position detection sections may be variably set. The MPU 22 may be able to designate the insertion period of the position detection sections. The length of the position detection sections may in some embodiments be set so that a change in the rotor position in one position detection section is small enough to be ignored. However, this is an ideal target. Strictly speaking, a deviation occurs from the target (in the following description, the existence of such a deviation is ignored).

In the drive section, the drive controller 52 generates the drive control signals DRVA, DRVB, and DRVC for causing the rotor to make desired rotation, and the pre-driver circuit 51 controls the gate potential of each transistor of the half-bridge circuits 50A, 50B, and 50C according to the drive control signals DRVA, DRVB, and DRVC. Therefore, in the drive section, voltages obtained by switching the power supply voltage VPWR according to the drive control signals DRVA, DRVB, and DRVC are applied to the output terminals TMA, TMB, and TMC as drive voltages $V_{TMA}$, $V_{TMB}$, and $V_{TMC}$, and the SPM 13 is switched and driven.

On the other hand, in each position detection section, the pre-driver circuit 51 executes a predetermined position detection operation under the control of the position detection controller 54 regardless of the drive control signals DRVA, DRVB, and DRVC. Even when the position detection section is inserted and the position detection operation is executed during the rotation of the rotor, the rotor continues to rotate due to the inertia of the rotor.

In the following Examples, detailed specific examples of the position detection operation, operation examples related to the above-described configuration, applied techniques, and modified techniques will be described. Unless particularly stated and unless contradicted, the above-mentioned matters are applied to each Example described below. In each Example described below, the description may be given priority for the matters that contradict the above-described content. Unless contradicted, the matters mentioned in any of the plurality of Examples described below may be applied to any other Example (that is, any two or more of the plurality of Examples may be combined).

Example 1

Example 1 will be described. As the position detection operation, any one of plural types of pulse train application processes may be performed. In Example 1, a 7-pulse application process (reference pulse train application process) that forms the basis of a pulse train application process will be described.

Figure 8:
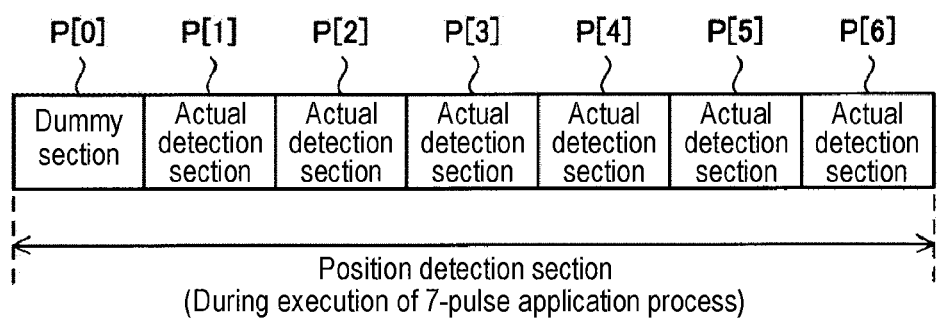
FIG. 8 is a configuration diagram of a position detection section when a 7-pulse application process is executed according to Example 1 of the present disclosure.

As shown in FIG. 8, when the 7-pulse application process is executed in the position detection section, the position detection section is subdivided into seven sections P[0] to P[6]. Hereinafter, the section P[i] indicates any one of the sections P[0] to P[6]. For an arbitrary integer i, the section P[i+1] comes next to the section P[i]. Among the sections P[0] to P[6], the first section P[0] is a dummy section, and the remaining sections P[1] to P[6] are actual detection sections. Therefore, in the following description, the section P[0] is sometimes referred to as a dummy section P[0] or simply referred to as a dummy section. The section P[i] for the natural number i is sometimes referred to as an actual detection section P[i] or simply referred to as an actual detection section.

Figure 9A:
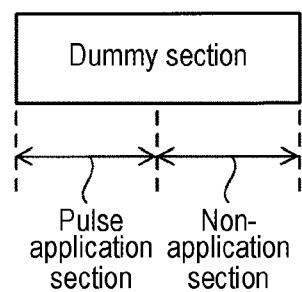
FIGS. 9A and 9B are configuration diagrams of a dummy section and an actual detection section according to Example 1 of the present disclosure.
Figure 9B:
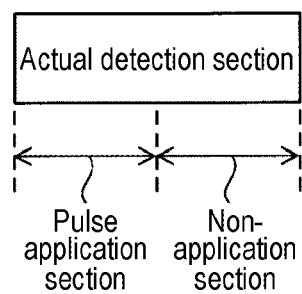

As shown in FIGS. 9A and 9B, each section [i] (i.e., each of the dummy section P[0] and the actual detection sections P[1] to P[6]) includes a pulse application section and a non-application section provided after the pulse application section. The pulse application section is a section in which the detection pulse voltage is applied to the target coil pair, and the non-application section is a section in which the half-bridge circuits 50A, 50B, and 50C of all phases are kept in the Hi-Z state. The lengths of the pulse application section and the non-application section may be set in advance. A method of dynamically setting the length of the pulse application section may also be adopted (this method will be described later). However, in any case, the length of the pulse application section may preferably be common among the sections P[0] to P[6], and the length of the non-application section may also preferably be common among the sections P[0] to P[6].

In one section P[i], any one of an application process BC, an application process BA, an application process CA, an application process CB, an application process AB, and an application process AC is executed during the pulse application section.

Figure 10:
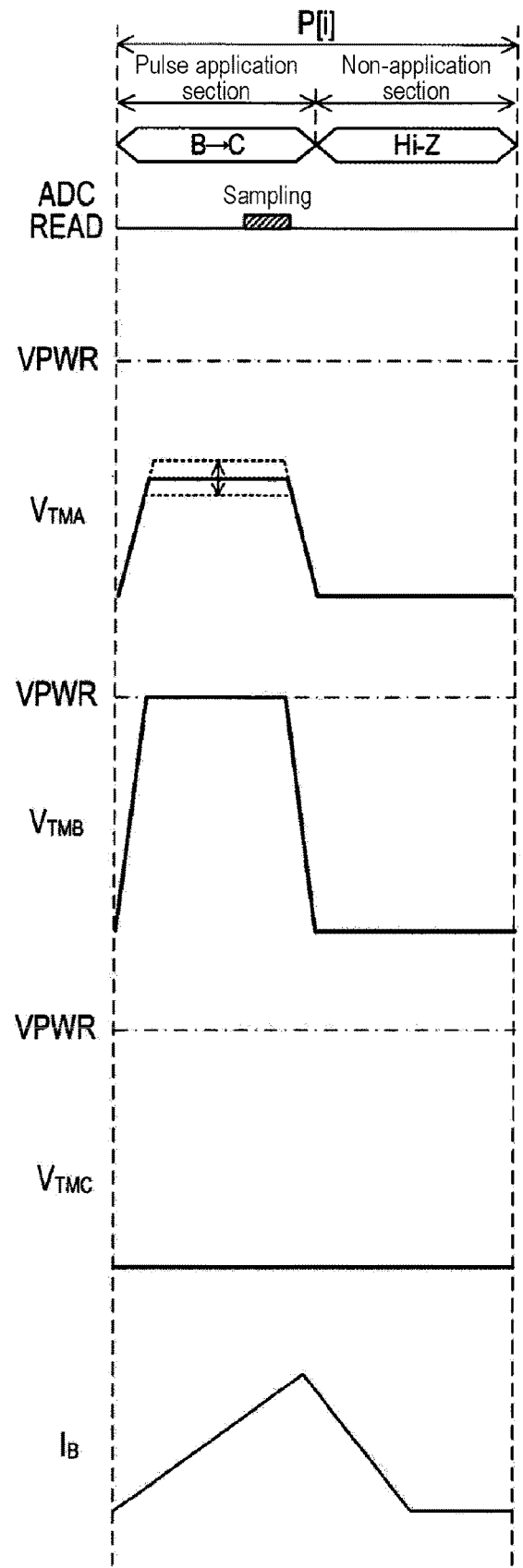
FIG. 10 is a diagram showing a state of voltages and a current in one actual detection section according to Example 1 of the present disclosure.

FIG. 10 is a diagram showing states of voltages and a current in the section P[i] when the application process BC is executed during the pulse application section in the section P[i]. The application process BC is a process in which the coils 13B and 13C are set as the target coil pair, the coil 13A is set as the non-target coil, and the detection pulse voltage is applied to the target coil pair with the coil 13B set to the high potential side. Therefore, when the application process BC is executed, the half-bridge circuits 50B, 50C, and 50A are set to the high output state, the low output state, and the Hi-Z state, respectively. As a result, the terminal voltages $V_{TMB}$ and $V_{TMC}$ become equal to the potential of the power supply voltage VPWR and the potential of the ground, respectively. On the other hand, the terminal voltage $V_{TMA}$ is a potential between the potential of the power supply voltage VPWR and the potential of the ground, and varies depending on the rotor position.

In the pulse application section, the magnitude of the current flowing through the target coil pair increases, and a voltage corresponding to the increasing slope of the current magnitude is generated in the non-target coil (the coil 13A in FIG. 10). The generated voltage depends on the rotor position. In FIG. 10, the two broken lines indicated in the vicinity of the waveform of the terminal voltage ($V_{TMA}$ in FIG. 10) corresponding to the non-target coil are images which indicate that the terminal voltage varies between the two broken lines depending on the rotor position (the same applies to FIGS. 11, 22, and 27 described later).

The detection pulse voltage is a pulse-shaped rectangular voltage, but the length of the pulse application section corresponds to the pulse width of the detection pulse voltage. Further, the magnitude of the detection pulse voltage coincides with the power supply voltage VPWR (12 V in this Example).

The A/D converter 60 (see FIG. 5D) samples the coil voltage ($V_{SPA}$ in the application process BC) corresponding to the non-target coil at a predetermined sampling timing during the pulse application section. The sampling timing is a concept having a time width including an acquisition time (e.g., five microseconds) and a conversion time (e.g., ten microseconds), which are electrical characteristics of the A/D converter 60.

In the non-application section, the stored energy of each coil is released through the parasitic diodes of the transistors (TrH and TrL) of each half-bridge circuit, and the terminal voltages $V_{TMA}$, $V_{TMB}$, and $V_{TMC}$ are zero at the end of the non-application section.

Figure 11:
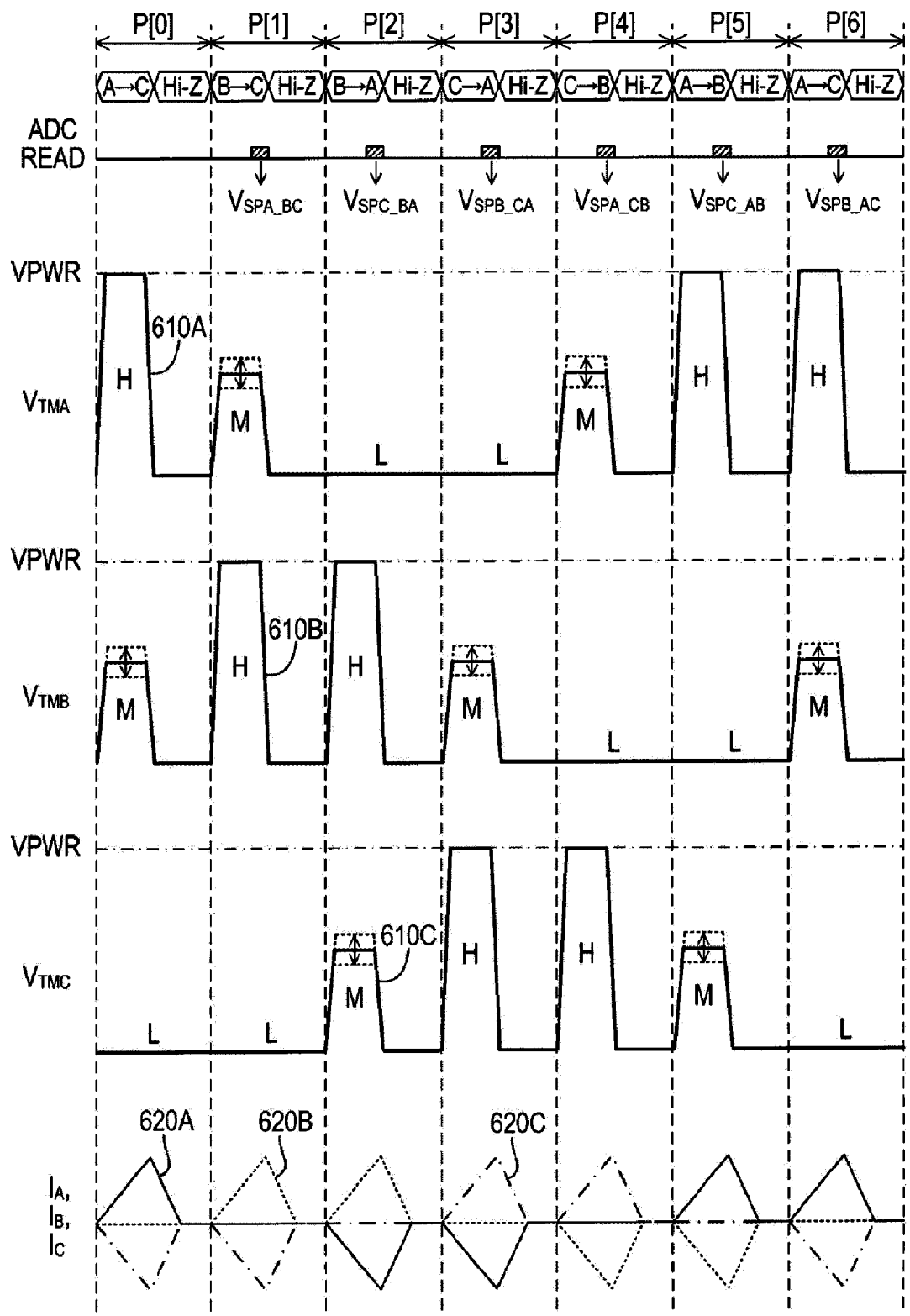
FIG. 11 is a timing chart of the 7-pulse application process according to Example 1 of the present disclosure.

FIG. 11 is a timing chart of the 7-pulse application process. In the 7-pulse application process of FIG. 11, the application process AC is executed in the pulse application section of the dummy section P[0], and the application process BC, the application process BA, the application process CA, the application process CB, the application process AB, and the application process AC are executed in the pulse application sections of the actual detection sections P[1] to P[6], respectively. In FIG. 11, the bent lines 610A, 610B, and 610C represent the waveforms of the terminal voltages $V_{TMA}$, $V_{TMB}$, and $V_{TMC}$ in the sections P[0] to P[6], respectively. The solid bent line 620A, the broken bent line 620B, and the one-dot chain bent line 620C indicate the waveforms of the coil currents $I_A$, $I_B$, and $I_C$ in the sections P[0] to P[6], respectively.

It can be said that the six application processes executed in the actual detection sections P[1] to P[6] constitute a 6-pulse application process. It can be said that the 7-pulse application process is constituted by adding the process in the dummy section P[0] to the 6-pulse application process. As will be described later, the dummy section P[0] may not be provided. In this case, the 7-pulse application process is the 6-pulse application process itself.

In any of the application process BC, the application process BA, the application process CA, the application process CB, the application process AB, and the application process AC, the detection pulse voltage is applied to the target coil pair, and the half-bridge circuit corresponding to the non-target coil is kept in the Hi-Z state, whereby the power supply to the non-target coil is stopped. However, the combination of the target coil pair or the application direction of the detection pulse voltage is different among the six application processes. These six application processes will be described. The application process BC is the same as described above.

The application process BA is a process in which the coils 13B and 13A are set as a target coil pair, the coil 13C is set as a non-target coil, and the detection pulse voltage is applied to the target coil pair with the coil 13B set to the high potential side. Therefore, when the application process BA is executed, the half-bridge circuits 50B, 50A, and 50C are kept in the high output state, the low output state, and the Hi-Z state, respectively. As a result, the terminal voltages $V_{TMB}$ and $V_{TMA}$ become equal to the potential of the power supply voltage VPWR and the potential of the ground, respectively. On the other hand, the terminal voltage $V_{TMC}$ becomes equal to a potential between the potential of the power supply voltage VPWR and the potential of the ground, and varies depending on the rotor position.

The application process CA is a process in which the coils 13C and 13A are set as a target coil pair, the coil 13B is set as a non-target coil, and the detection pulse voltage is applied to the target coil pair with the coil 13C set to the high potential side. Therefore, when the application process CA is executed, the half-bridge circuits 50C, 50A, and 50B are kept in the high output state, the low output state, and the Hi-Z state, respectively. As a result, the terminal voltages $V_{TMC}$ and $V_{TMA}$ become equal to the potential of the power supply voltage VPWR and the potential of the ground, respectively. On the other hand, the terminal voltage $V_{TMB}$ becomes equal to a potential between the potential of the power supply voltage VPWR and the potential of the ground, and varies depending on the rotor position.

The application process CB is a process in which the coils 13C and 13B are set as a target coil pair, the coil 13A is set as a non-target coil, and the detection pulse voltage is applied to the target coil pair with the coil 13C set to the high potential side. Therefore, when the application process CB is executed, the half-bridge circuits 50C, 50B, and 50A are kept in the high output state, the low output state, and the Hi-Z state, respectively. As a result, the terminal voltages $V_{TMC}$ and $V_{TMB}$ become equal to the potential of the power supply voltage VPWR and the potential of the ground, respectively. On the other hand, the terminal voltage $V_{TMA}$ becomes equal to a potential between the potential of the power supply voltage VPWR and the potential of the ground, and varies depending on the rotor position.

The application process AB is a process in which the coils 13A and 13B are set as a target coil pair, the coil 13C is set as a non-target coil, and the detection pulse voltage is applied to the target coil pair with the coil 13A set to the high potential side. Therefore, when the application process AB is executed, the half-bridge circuits 50A, 50B, and 50C are kept in the high output state, the low output state, and the Hi-Z state, respectively. As a result, the terminal voltages $V_{TMA}$ and $V_{TMB}$ become equal to the potential of the power supply voltage VPWR and the potential of the ground, respectively. On the other hand, the terminal voltage $V_{TMC}$ becomes equal to a potential between the potential of the power supply voltage VPWR and the potential of the ground, and varies depending on the rotor position.

The application process AC is a process in which the coils 13A and 13C are set as a target coil pair, the coil 13B is set as a non-target coil, and the detection pulse voltage is applied to the target coil pair with the coil 13A set to the high potential side. Therefore, when the application process AC is executed, the half-bridge circuits 50A, 50C, and 50B are kept in the high output state, the low output state, and the Hi-Z state, respectively. As a result, the terminal voltages $V_{TMA}$ and $V_{TMC}$ become equal to the potential of the power supply voltage VPWR and the potential of the ground, respectively. On the other hand, the terminal voltage $V_{TMB}$ becomes equal to a potential between the potential of the power supply voltage VPWR and the potential of the ground, and varies depending on the rotor position.

In FIG. 11, in each section P[i], a symbol "H" is assigned to the largest one among the terminal voltages $V_{TMA}$, $V_{TMB}$, and $V_{TMC}$, and a symbol "L" is assigned to the smallest one. A symbol "M" is assigned to the remaining one (the same applies to FIGS. 22 and 27 described later).

In the actual detection section (P[1] in the example of FIG. 11) in which the application process BC is performed, the A/D converter 60 samples the coil voltage $V_{SPA}$ at a predetermined sampling timing during the pulse application section. The value of the coil voltage $V_{SPA}$ obtained by this sampling is denoted by "$V_{SPA\_BC}$." In the actual detection section (P[2] in the example of FIG. 11) in which the application process BA is performed, the A/D converter 60 samples the coil voltage $V_{SPC}$ at a predetermined sampling timing during the pulse application section. The value of the coil voltage $V_{SPC}$ obtained by this sampling is denoted by "$V_{SPC\_BA}$." In the actual detection section (P[3] in the example of FIG. 11) in which the application process CA is performed, the A/D converter 60 samples the coil voltage $V_{SPB}$ at a predetermined sampling timing during the pulse application section. The value of the coil voltage $V_{SPB}$ obtained by this sampling is denoted by "$V_{SPB\_CA}$."

In the actual detection section (P[4] in the example of FIG. 11) in which the application process CB is performed, the A/D converter 60 samples the coil voltage $V_{SPA}$ at a predetermined sampling timing during the pulse application section. The value of the coil voltage $V_{SPA}$ obtained by this sampling is denoted by "$V_{SPA\_CB}$." In the actual detection section (P[5] in the example of FIG. 11) in which the application process AB is performed, the A/D converter 60 samples the coil voltage $V_{SPC}$ at a predetermined sampling timing during the pulse application section. The value of the coil voltage $V_{SPC}$ obtained by this sampling is denoted by "$V_{SPC\_AB}$." In the actual detection section (P[6] in the example of FIG. 11) in which the application process AC is performed, the A/D converter 60 samples the coil voltage $V_{SPB}$ at a predetermined sampling timing during the pulse application section. The value of the coil voltage $V_{SPB}$ obtained by this sampling is denoted by "$V_{SPB\_AC}$."

The position detector 53 uses the voltage values obtained by the respective sampling to obtain voltages $V_{BC+CB}$, $V_{AC+CA}$, and $V_{AB+BA}$ according to the following expressions (B1) to (B3) as evaluation voltages. The voltages $V_{BC+CB}$, $V_{AC+CA}$, and $V_{AB+BA}$ have values depending on the rotor position.

$$V_{BC+CB} = V_{SPA\_BC} + V_{SPA\_CB} \tag{B1}$$

$$V_{AC+CA} = V_{SPB\_AC} + V_{SPB\_CA} \tag{B2}$$

$$V_{AB+BA} V_{SPC\_AB} V_{SPC\_BA} \tag{B3}$$

Figure 12:
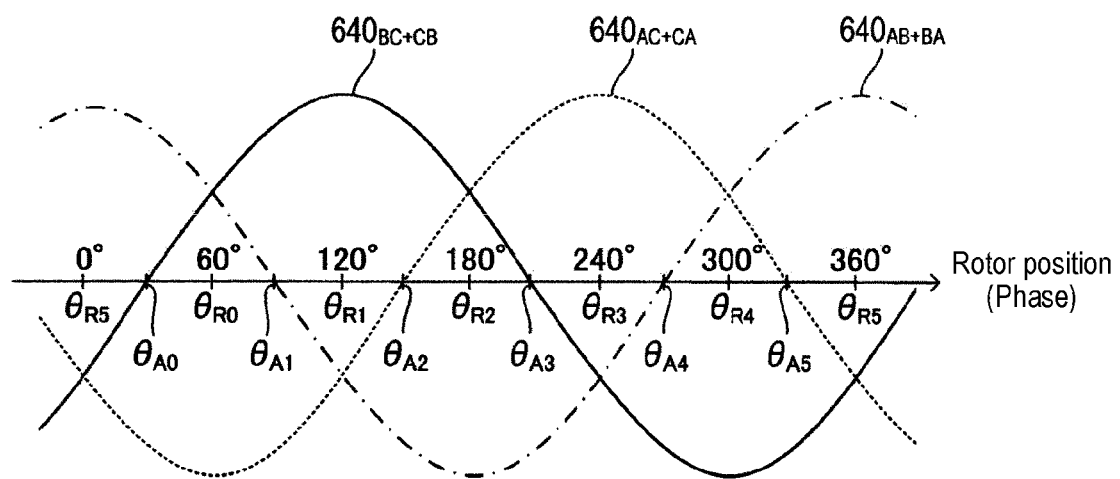
FIG. 12 is a diagram showing the rotor position dependency of three voltages (evaluation voltages) according to Example 1 of the present disclosure.

In FIG. 12, curve waveforms $640_{BC+CB}$, $640_{AC+CA}$, and $640_{AB+BA}$ show examples of the rotor position dependency of the voltages $V_{BC+CB}$, $V_{AC+CA}$, and $V_{AB+BA}$, respectively. As an example of the waveform of the voltage $V_{BC+CB}$, a sinusoidal waveform $640_{BC+CB}$ is shown in FIG. 12, but the actual waveform of the voltage $V_{BC+CB}$ is not necessarily sinusoidal. The same applies to the waveforms of the voltages $V_{AC+CA}$ and $V_{AB+BA}$.

In FIG. 12, $\theta_{A0}$ to $\theta_{A5}$ and $\theta_{R0}$ to $\theta_{R5}$ represent twelve electrical angles that the rotor position can take, and at least "0 degrees<$\theta_{A0}$<$\theta_{R0}$<$\theta_{A1}$<$\theta_{R1}$<$\theta_{A2}$<$\theta_{R2}$<$\theta_{A3}$<$\theta_{R3}$<$\theta_{A4}$<$\theta_{R4}$<$\theta_{A5}$<$\theta_{R5}$" is satisfied. Theoretically, "($\theta_{A0}$, $\theta_{A1}$, $\theta_{A2}$, $\theta_{A3}$, $\theta_{A4}$, $\theta_{A5}$)=(30 degrees, 90 degrees, 150 degrees, 210 degrees, 270 degrees, 330 degrees)" and "($\theta_{R0}$, $\theta_{R1}$, $\theta_{R2}$, $\theta_{R3}$, $\theta_{R4}$, $\theta_{R5}$)=(60 degrees, 120 degrees, 180 degrees, 240 degrees, 300 degrees, 360 degrees)." In electrical angles, 360 degrees and 0 degrees are equal to each other.

The theoretical rotor position dependency of the voltage $V_{BC+CB}$ will be described. Theoretically, the voltage $V_{BC+CB}$ becomes zero when the phase of the rotor position coincides with one of the electrical angles $\theta_{A0}$ and $\theta_{A3}$. The voltage $V_{BC+CB}$ takes a positive value in a range larger than the electrical angle $\theta_{A0}$ and smaller than the electrical angle $\theta_{A3}$, and takes a negative value in a range other than the aforementioned range. More specifically, the voltage $V_{BC+CB}$ theoretically takes a negative value when the phase of the rotor position is the electrical angle 0 degrees. The voltage $V_{BC+CB}$ monotonically increases as the phase of the rotor position increases from the electrical angle 0 degrees toward the electrical angle $\theta_{R1}$. The voltage $V_{BC+CB}$ becomes a largest value as a positive value at the electrical angle $\theta_{R1}$. At this time, the value of the voltage $V_{BC+CB}$ is changed from negative to positive at the electric angle $\theta_{A0}$ as a boundary in the increasing process of the phase of the rotor position. Thereafter, the voltage $V_{BC+CB}$ theoretically decreases monotonically as the phase of the rotor position increases from the electrical angle $\theta_{R1}$ toward the electrical angle $\theta_{R4}$, and takes a smallest value as a negative value at the electrical angle $\theta_{R4}$. At this time, the value of the voltage $V_{BC+CB}$ is changed from positive to negative at the electric angle $\theta_{A3}$ as a boundary in the increasing process of the phase of the rotor position. Thereafter, the voltage $V_{BC+CB}$ theoretically increases monotonically as the phase of the rotor position increases from the electrical angle $\theta_{R4}$ toward the electrical angle 360 degrees.

The theoretical rotor position dependency of the voltage $V_{AC+CA}$ will be described. Theoretically, the voltage $V_{AC+CA}$ becomes zero when the phase of the rotor position coincides with one of the electrical angles $\theta_{A2}$ and $\theta_{A5}$. The voltage $V_{AC+CA}$ takes a positive value in a range larger than the electrical angle $\theta_{A2}$ and smaller than the electrical angle $\theta_{A5}$, and takes a negative value in a range other than the aforementioned range. More specifically, the voltage $V_{AC+CA}$ theoretically takes a negative value when the phase of the rotor position is the electrical angle 0 degrees. The voltage $V_{AC+CA}$ monotonically decreases as the phase of the rotor position increases from the electrical angle 0 degrees toward the electrical angle $\theta_{R0}$. The voltage $V_{AC+CA}$ takes a smallest value as a negative value at the electrical angle $\theta_{R0}$. Thereafter, the voltage $V_{AC+CA}$ monotonically increases as the phase of the rotor position increases from the electrical angle $\theta_{R0}$ toward the electrical angle $\theta_{R3}$, and takes a largest value as a positive value at the electrical angle $\theta_{R3}$. At this time, the value of the voltage $V_{AC+CA}$ is changed from negative to positive at the electric angle $\theta_{A2}$ as a boundary in the increasing process of the phase of the rotor position. Thereafter, the voltage $V_{AC+CA}$ theoretically decreases monotonically as the phase of the rotor position increases from the electrical angle $\theta_{R3}$ toward the electrical angle 360 degrees. At this time, the value of the voltage $V_{AC+CA}$ is changed from positive to negative at the electrical angle $\theta_{A5}$ as a boundary in the increasing process of the phase of the rotor position.

The theoretical rotor position dependency of the voltage $V_{AB+BA}$ will be described. Theoretically, the voltage $V_{AB+BA}$ becomes zero when the phase of the rotor position coincides with one of the electrical angles $\theta_{A1}$ and $\theta_{A4}$. The voltage $V_{AB+BA}$ takes a negative value in a range larger than the electrical angle $\theta_{A1}$ and smaller than the electrical angle $\theta_{A4}$, and takes a positive value in a range other than the aforementioned range. More specifically, the voltage $V_{AB+BA}$ theoretically takes a positive value when the phase of the rotor position is the electrical angle 0 degrees. The voltage $V_{AB+BA}$ monotonically decreases as the phase of the rotor position increases from the electrical angle 0 degrees toward the electrical angle $\theta_{R2}$. The voltage $V_{AB+BA}$ takes a smallest value as a negative value at the electrical angle $\theta_{R2}$. At this time, the value of the voltage $V_{AB+BA}$ is changed from positive to negative at the electric angle $\theta_{A1}$ as a boundary in the increasing process of the phase of the rotor position. Thereafter, the voltage $V_{AB+BA}$ theoretically increases monotonically as the phase of the rotor position increases from the electrical angle $\theta_{R2}$ toward the electrical angle $\theta_{R5}$ and takes a largest value as a positive value at the electrical angle $\theta_{R5}$. At this time, the value of the voltage $V_{AB+BA}$ is changed from negative to positive at the electric angle $\theta_{A4}$ as a boundary in the increasing process of the phase of the rotor position.

The voltage $V_{BC+CB}$ is a quantity that depends on the mutual inductance between the coils 13A and 13C and the mutual inductance between the coils 13A and 13B. The magnetic field based on the mutual inductance depends on the rotor position (see FIGS. 6A to 6F). As a result, the voltage $V_{BC+CB}$ is changed as described above according to the change in the rotor position. The same applies to the voltages $V_{AC+CA}$ and $V_{AB+BA}$, but the phases of the voltages $V_{BC+CB}$, $V_{AC+CA}$, and $V_{AB+BA}$ deviate from one another by 60 degrees. Therefore, by determining the polarity of these three voltages, the rotor position can be detected in 60 degrees steps (i.e., with a resolution of 60 degrees).

Figure 13:
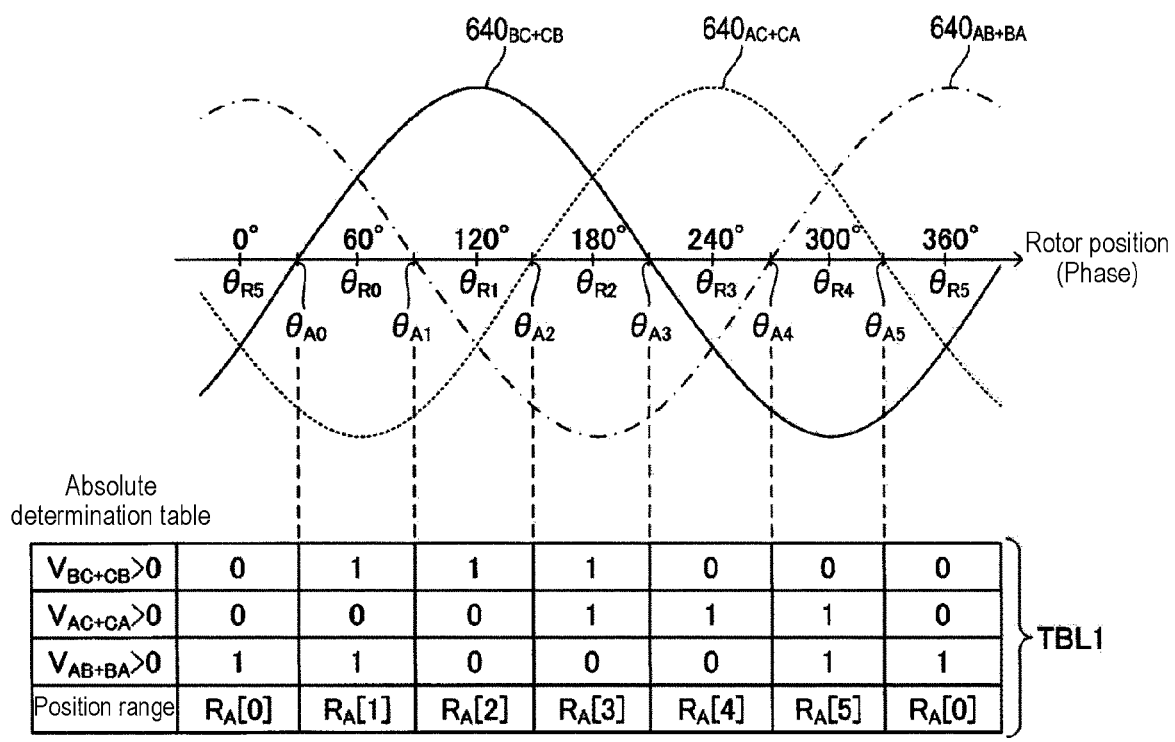
FIG. 13 is an explanatory view of a rotor position detection method according to Example 1 of the present disclosure.

FIG. 13 shows an absolute determination table TBL1 that can be used for rotor position detection together with the waveforms $640_{BC+CB}$, $640_{AC+CA}$, and $640_{AB+BA}$ shown in FIG. 12. The position detector 53 according to Example 1 detects the rotor position by an absolute determination method using the absolute determination table TBL1. The table TBL1 is provided in the position detector 53. The rotor position range is considered by dividing it into six position ranges $R_A[0]$ to $R_A[5]$.

The position range $R_A[1]$ is a range that is equal to or greater than the electrical angle $\theta_{A0}$ and less than the electrical angle $\theta_{A1}$.

The position range $R_A[2]$ is a range that is equal to or greater than the electrical angle $\theta_{A1}$ and less than the electrical angle $\theta_{A2}$.

The position range $R_A[3]$ is a range that is equal to or greater than the electrical angle $\theta_{A2}$ and less than the electrical angle $\theta_{A3}$.

The position range $R_A[4]$ is a range that is equal to or greater than the electrical angle $\theta_{A3}$ and less than the electrical angle $\theta_{A4}$.

The position range $R_A[5]$ is a range that is equal to or greater than the electrical angle $\theta_{A4}$ and less than the electrical angle $\theta_{A5}$.

The position range $R_A[0]$ is a composite range including a range that is equal to or greater than the electric angle 0 degrees and less than the electrical angle $\theta_{A0}$ and a range that is equal to or greater than the electric angle $\theta_{A5}$ and less than the electrical angle 360 degree.

In the absolute determination method, the position detector 53 determines the establishment or non-establishment of the following expressions (C1) to (C3) each time when the values of the voltages $V_{BC+CB}$, $V_{AC+CA}$, and $V_{AB+BA}$ are obtained in the position detection section. When the expression (C1) is not established, the expression (C2) is not established, and the expression (C3) is established, the position detector 53 determines that the rotor position is within the position range $R_A[0]$. When the expression (C1) is established, the expression (C2) is not established, and the expression (C3) is established, the position detector 53 determines that the rotor position is within the position range $R_A[1]$. When the expression (C1) is established, the expression (C2) is not established, and the expression (C3) is not established, the position detector 53 determines that the rotor position is within the position range $R_A[2]$. When the expression (C1) is established, the expression (C2) is established, and the expression (C3) is not established, the position detector 53 determines that the rotor position is within the position range $R_A[3]$. When the expression (C1) is not established, the expression (C2) is established, and the expression (C3) is not established, the position detector 53 determines that the rotor position is within the position range $R_A[4]$. When the expression (C1) is not established, the expression (C2) is established, and the expression (C3) is established, the position detector 53 determines that the rotor position is within the position range $R_A[5]$. The position detector 53 causes the determination result to be included in the signal $S_{DET}$ as a rotor position detection result.

$$V_{BC+CB} > 0 \quad \text{(C1)}$$

$$V_{AC+CA} > 0 \quad \text{(C2)}$$

$$V_{AB+BA} > 0 \quad \text{(C3)}$$

Figure 14:
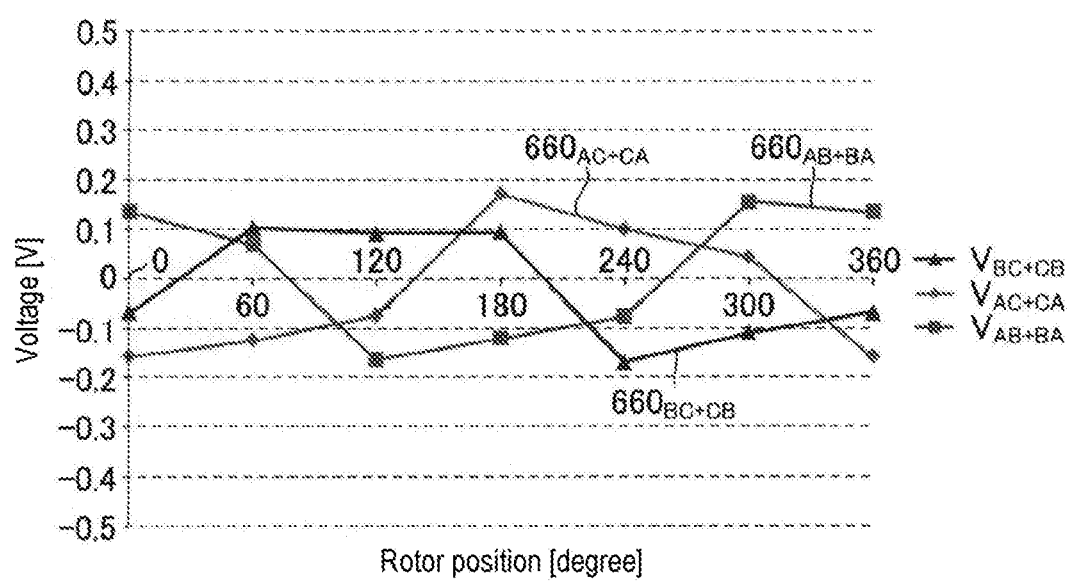
FIG. 14 is a diagram showing experimental results according to Example 1 of the present disclosure.

FIG. 14 shows a result of an experiment related to the HDD device 1. In this experiment, voltages $V_{BC+CB}$, $V_{AC+CA}$, and $V_{AB+BA}$ are obtained by actual measurements in a state in which the rotor is fixed at a position having an electrical angle 0 degrees, and the values of the voltages $V_{BC+CB}$, $V_{AC+CA}$, and $V_{AB+BA}$ thus obtained are plotted on a graph. This operation is performed in a state in which the rotor is fixed at positions having electrical angles of 60 degrees, 120 degrees, 180 degrees, 240 degrees, and 300 degrees. Then, the values of the voltage $V_{BC+CB}$ at the plotted electrical angles 0 degrees, 60 degrees, 120 degrees, 180 degrees, 240 degrees, 300 degrees, and 360 degrees are connected by a bent line to obtain a bent line waveform 660$_{BC+CB}$. Similarly, the values of the voltage $V_{AC+CA}$ at the plotted electrical angles 0 degrees, 60 degrees, 120 degrees, 180 degrees, 240 degrees, 300 degrees, and 360 degrees are connected by a bent line to obtain a bent line waveform 660$_{AC+CA}$. Similarly, the values of the voltage $V_{AB+BA}$ at the plotted electrical angles 0 degrees, 60 degrees, 120 degrees, 180 degrees, 240 degrees, 300 degrees, and 360 degrees are connected by a bent line to obtain a bent line waveform 660$_{AB+BA}$. In each of the waveforms 660$_{BC+CB}$, 660$_{AC+CA}$, and 660$_{AB+BA}$, the value at the electrical angle 0 degrees and the value at the electrical angle 360 degrees are the same.

The waveforms 660$_{BC+CB}$, 660$_{AC+CA}$, and 660$_{AB+BA}$ represent the rotor position dependency by actual measurements of the voltages $V_{BC+CB}$, $V_{AC+CA}$, and $V_{AB+BA}$, respectively. For example, in the waveform 660$_{BC+CB}$, the rotor position when the voltage $V_{BC+CB}$ is switched from negative to positive slightly deviates from a theoretical position "30 degrees" due to the fact that the experimental value is acquired only every 60 degrees or the error of the measurement accuracy in the experiment. However, it can be seen that the characteristics shown in FIG. 12 are generally obtained.

The values of the electrical angles $\theta_{A0}$ to $\theta_{A5}$ that define the position range $R_A[0]$ to $R_A[5]$ may be the theoretical values described above. Alternatively, values suitable for the SPM 13 actually used may be used as the values of the electrical angles $\theta_{A0}$ to $\theta_{A5}$ through experiments or the like as appropriate (the same applies to other Examples described later). For example, in theory, "$\theta_{A0}$=30 degrees," but the electrical angle $\theta_{A0}$ may be set to 25 degrees or the like. The same applies to the electrical angles $\theta_{A1}$ to $\theta_{A5}$.

According to this Example, the rotor position can be detected with a resolution of 60 degrees. In a steady state in which the rotor rotates stably at a substantially constant speed, the detection resolution of the rotor position may be 360 degrees or 180 degrees. However, especially in the acceleration process in which the rotational speed of the rotor is increased, appropriate acceleration control can be realized by detecting the rotor position with a high resolution (thus, the method shown in this Example is particularly useful at the time of accelerating the rotor).

Related methods for detecting the rotor position using the characteristic that the self-inductance of the coil of each phase is changed depending on the rotor position are known. However, there are motors of a type in which the amount of a change in the self-inductance is very small. In the motors of such a type, it is difficult for the related methods to correctly detect a rotor position. On the other hand, according to the method of this Example, it is possible to realize good detection accuracy even for a motor in which the amount of a change in the self-inductance is small. In other words, there is an advantage that good rotor position detection can always be realized regardless of the type of the SPM 13 applied to the HDD device 1 (without considering whether the amount of a change in the self-inductance is large or small).

In this Example, a dummy section is provided in front of the actual detection section. Voltage application similar to that in each actual detection section is performed in the dummy section (see FIGS. 8 and 11). The detection pulse voltage applied to the dummy section should be called a dummy pulse voltage. Instead of immediately starting the actual detection section in the position detection section, the dummy pulse voltage is first applied in the dummy section. By doing so, the state of the SPM 13 and the state of the IC 30 at the start of the actual detection section can be made constant without depending on the previous states, whereby the detection of the rotor position can be stabilized.

This will be described with a specific example. The voltages $V_{BC+CB}$, $V_{AC+CA}$, and $V_{AB+BA}$ depend on the slope of the current flowing through the target coil pair, but the current slope varies as the power supply voltage VPWR varies. This indicates that the power supply voltage VPWR needs to be stabilized in order to realize accurate rotor position detection. Although the power supply circuit in the HDD device 1 operates with the aim of keeping the value of the power supply voltage VPWR constant, the power supply voltage VPWR slightly deviates from the desired voltage depending on the current flowing through the line to which the power supply voltage VPWR is applied. When the detection pulse voltage is applied in the actual detection section in a state in which such a deviation from the desired voltage occurs, a voltage deviating from the voltage to be observed is sampled. As a result, the detection accuracy of the rotor position may be adversely affected. When the dummy section is provided against this problem as described above, the state of the power supply voltage VPWR at the start of the actual detection section can be kept constant regardless of the previous state, whereby the detection of the rotor position can be stabilized.

However, when the HDD device 1 is formed so as to be able to ignore the presence of the adverse effect described above, it is possible to delete the dummy section from the position detection section (this also applies to a 3-pulse application process and a 5-pulse application process described later).

Alternatively, it may be possible to adopt a modification in which the dummy section is not provided with the pulse application section (see FIG. 9A) and the half-bridge circuits 50A, 50B, and 50C are simply put into the Hi-Z state for a predetermined time in the dummy section (this also applies to a 3-pulse application process and a 5-pulse application process described later).

In each of the sections P[0] to P[6] of the position detection section, a non-application section (in other words, a Hi-Z section) in which the half-bridge circuits 50A, 50B, and 50C are put into the Hi-Z state for a predetermined time is provided after the pulse application section. As a result, the coil currents $I_A$, $I_B$, and $I_C$ can be first made zero in each non-application section, and the application of the detection pulse voltage can be started in a state in which the coil currents $I_A$, $I_B$, and $I_C$ are always zero in each pulse application section. Even when the coil currents $I_A$, $I_B$, and $I_C$ are not zero at the start of the application of the detection pulse voltage, the detection of the rotor position is theoretically not affected. In practice, however, various coil currents $I_A$, $I_B$, and $I_C$ at the start of the application of the detection pulse voltage may be an error factor in detecting the rotor position. Such an error factor can be eliminated by constantly setting the coil currents $I_A$, $I_B$, and $I_C$ to zero at the start of the application of the detection pulse voltage.

In addition, when there are various coil currents at the start of the application of the detection pulse voltage, the following problems may occur. That is, when a non-application section is not provided between adjacent pulse application sections, the coil current $I_A$ reaches one ampere in the first pulse application section, and then the coil current $I_A$ increases from one ampere as a starting point in the second pulse application section. At this time, when a predetermined limit value (e.g., 1.8 ampere) is determined as a limit current value for the coil current $I_A$, there may be a problem that the coil current $I_A$ reaches the limit value and the slope of the coil current $I_A$ cannot be kept constant. Such a problem can be solved by setting a non-application section.

However, when the HDD device 1 is formed so as not to cause the above problem, it is possible to delete the non-application section (the Hi-Z section) from the dummy section and each actual detection section (this also applies to a 3-pulse application process and a 5-pulse application process described later).

Instead of setting the non-application section as the Hi-Z section, it is also possible to perform a process of regenerating a current to the ground by turning on, for example, the low-side transistors TrL of the half-bridge circuits 50A, 50B, and 50C in the non-application section. In this case, the coil currents $I_A$, $I_B$, and $I_C$ at the start of the application of the detection pulse voltage may not become zero. However, when there is a section in which the slope of the current flowing through the target coil pair is constant in the application section of the detection pulse voltage and there is sufficient time until the response of the detection circuit for detecting the slope, the fact that the coil currents $I_A$, $I_B$, and $I_C$ at the start of the application of the detection pulse voltage do not become zero is not an error factor.

Example 2

Example 2 will be described. In Example 2, there will be described a relative determination method that can be used instead of the absolute determination method when the above-described 7-pulse application process is adopted.

Figure 15:
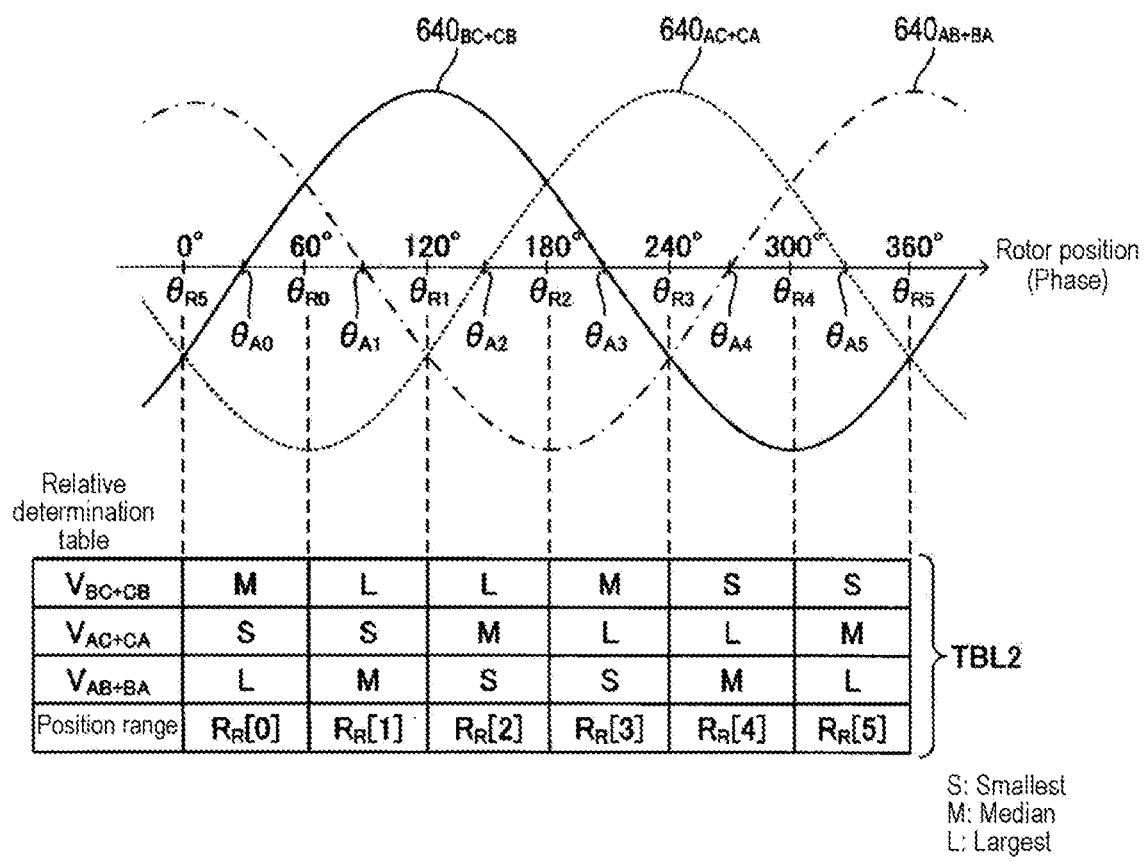
FIG. 15 is an explanatory view of a rotor position detection method according to Example 2 of the present disclosure.

FIG. 15 shows a relative determination table TBL2 that can be used for rotor position detection together with the waveforms $640_{BC+CB}$, $640_{AC+CA}$, and $640_{AB+BA}$ shown in FIG. 12. The position detector 53 according to Example 2 detects a rotor position by a relative determination method using the relative determination table TBL2. The table TBL2 is provided in the position detector 53. The rotor position range is considered by dividing the range into six position ranges $R_R[0]$ to $R_R[5]$ with electric angles $\theta_{R0}$ to $\theta_{R5}$ as boundaries. As described above, theoretically, "($\theta_{R0}$, $\theta_{R1}$, $\theta_{R2}$, $\theta_{R3}$, $\theta_{R4}$, $\theta_{R5}$)=(60 degrees, 120 degrees, 180 degrees, 240 degrees, 300 degrees, 360 degrees)."

The position range $R_R[1]$ is a range that is equal to or greater than the electrical angle $\theta_{R0}$ and less than the electrical angle $\theta_{R1}$.

The position range $R_R[2]$ is a range that is equal to or greater than the electrical angle $\theta_{R1}$ and less than the electrical angle $\theta_{R2}$.

The position range $R_R[3]$ is a range that is equal to or greater than the electrical angle $\theta_{R2}$ and less than the electrical angle $\theta_{R3}$.

The position range $R_R[4]$ is a range that is equal to or greater than the electrical angle $\theta_{R3}$ and less than the electrical angle $\theta_{R4}$.

The composite range including a range that is equal to or greater than the electric angle 0 degrees and less than the electrical angle $\theta_{R0}$ and a range that is equal to or greater than the electric angle $\theta_{R4}$ and less than the electrical angle 360 degrees is divided into a position range $R_R[0]$ and a position range $R_R[5]$. The boundary of the division is present at the electrical angle $\theta_{R5}$. At this time, between the two position ranges generated by the division, the position range including the electrical angle $\theta_{A0}$ is the position range $R_R[0]$, and the position range including the electrical angle $\theta_{A5}$ is the position range $R_R[5]$. Although it is possible to determine the electrical angle $\theta_{R5}$ so as not to be "$\theta_{R5}$=360 degrees," it is considered below that "$\theta_{R5}$=360 degrees." In this case, the range equal to or greater than the electrical angle 0 degrees and less than the electrical angle $\theta_{R0}$ is the position range $R_R[0]$, and the range equal to or greater than the electrical angle $\theta_{R4}$ and less than the electrical angle $\theta_{R5}$ is the position range $R_R[5]$.

Among the voltages $V_{BC+CB}$, $V_{AC+CA}$, and $V_{AB+BA}$, the voltage having a largest value is referred to as a largest voltage, the voltage having a smallest value is referred to as a smallest voltage, and the remaining one voltage is referred to as a median voltage. Then, the voltages $V_{BC+CB}$, $V_{AC+CA}$, and $V_{AB+BA}$ satisfy the following relationships in terms of the above-described mutual inductance characteristics. That is, the voltages $V_{BC+CB}$, $V_{AC+CA}$, and $V_{AB+BA}$ are the median voltage, the smallest voltage, and the largest voltage, respectively, when the rotor position is within the position range $R_R[0]$. The voltages $V_{BC+CB}$, $V_{AC+CA}$, and $V_{AB+BA}$ are the largest voltage, the smallest voltage, and the median voltage, respectively, when the rotor position is within the position range $R_R[1]$. The voltages $V_{BC+CB}$, $V_{AC+CA}$, and $V_{AB+BA}$ are the largest voltage, the median voltage, and the smallest voltage, respectively, when the rotor position is within the position range $R_R[2]$. The voltages $V_{BC+CB}$, $V_{AC+CA}$, and $V_{AB+BA}$ are the median voltage, the largest voltage, and the smallest voltage, respectively, when the rotor position is within the position range $R_R[3]$. The voltages $V_{BC+CB}$, $V_{AC+CA}$, and $V_{AB+BA}$ are the smallest voltage, the largest voltage, and the median voltage, respectively, when the rotor position is within the position range $R_R[4]$. The voltages $V_{BC+CB}$, $V_{AC+CA}$, and $V_{AB+BA}$ are the smallest voltage, the median voltage, and the largest voltage, respectively, when the rotor position is within the position range $R_R[5]$.

Therefore, in the relative determination method, the position detector 53 evaluates the magnitude relationship among the voltages $V_{BC+CB}$, $V_{AC+CA}$, and $V_{AB+BA}$ each time the values of the voltages $V_{BC+CB}$, $V_{AC+CA}$, and $V_{AB+BA}$ are obtained in the position detection section. When the voltages $V_{BC+CB}$, $V_{AC+CA}$, and $V_{AB+BA}$ are the median voltage, the smallest voltage, and the largest voltage, respectively, the position detector 53 determines that the rotor position is within the position range $R_R[0]$. When the voltages $V_{BC+CB}$, $V_{AC+CA}$, and $V_{AB+BA}$ are the largest voltage, the smallest voltage, and the median voltage, respectively, the position detector 53 determines that the rotor position is within the position range $R_R[1]$. When the voltages $V_{BC+CB}$, $V_{AC+CA}$, and $V_{AB+BA}$ are the largest voltage, the median voltage, and the smallest voltage, respectively, the position detector 53 determines that the rotor position is within the position range $R_R[2]$. When the voltages $V_{BC+CB}$, $V_{AC+CA}$, and $V_{AB+BA}$ are the median voltage, the largest voltage, and the smallest voltage, respectively, the position detector 53 determines that the rotor position is within the position range $R_R[3]$. When the voltages $V_{BC+CB}$, $V_{AC+CA}$, and $V_{AB+BA}$ are the smallest voltage, the largest voltage, and the median voltage, respectively, the position detector 53 determines that the rotor position is within the position range $R_R[4]$. When the voltages $V_{BC+CB}$, $V_{AC+CA}$, and $V_{AB+BA}$ are the smallest voltage, the median voltage, and the largest voltage, respectively, the position detector 53 determines that the rotor position is within the position range $R_R[5]$. The position detector 53 causes the determination result to be included in the signal $S_{DET}$ as a rotor position detection result.

Figure 16:
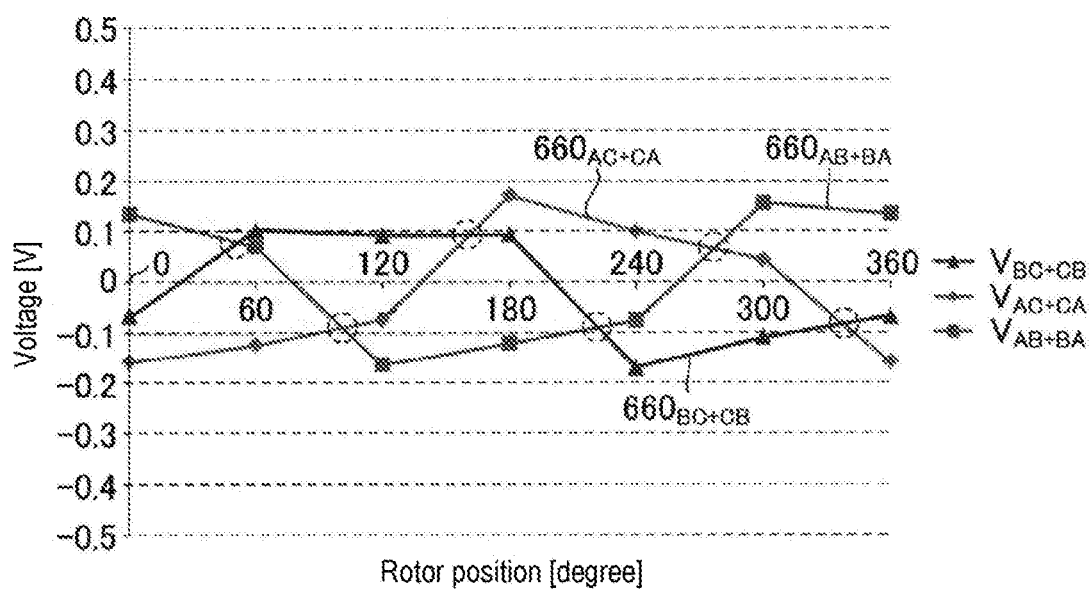
FIG. 16 is a diagram showing experimental results according to Example 2 of the present disclosure.

FIG. 16 shows a result of an experiment related to the HDD device 1. In FIG. 16, six broken line circles are added to the waveforms of FIG. 14. The broken line circles are added at the points where two of the voltages $V_{BC+CB}$, $V_{AC+CA}$, and $V_{AB+BA}$ intersect each other. In the waveforms $660_{BC+CB}$ and $660_{AB+BA}$, for example, in the positive voltage region, the rotor position where the voltage $V_{BC+CB}$ and the voltage $V_{AB+BA}$ intersect each other slightly deviates from the theoretical position "60 degrees" due to the fact that the experimental value is acquired only every 60 degrees or the error of the measurement accuracy in the experiment. However, it can be seen that the characteristics shown in FIG. 15 are generally obtained.

The values of the electrical angles $\theta_{R0}$ to $\theta_{R5}$ that define the position range $R_R[0]$ to $R_R[5]$ may be the theoretical values described above. Alternatively, values suitable for the SPM 13 actually used may be used as the values of the electrical angles $\theta_{R0}$ to $\theta_{R5}$ through experiments or the like as appropriate (the same applies to other Examples described later). For example, in theory, "$\theta_{R0}=60$ degrees," but the electrical angle $\theta_{R0}$ may be set to 55 degrees or the like. The same applies to the electrical angles $\theta_{R1}$ to $\theta_{R5}$.

Even when the relative determination method is used, the same operations and effects as those available at the time of using the absolute determination method of Example 1 can be obtained. The absolute determination method is directly affected by an offset of a circuit related to the rotor position detection, whereas the relative determination method has an advantage that it is not affected by the offset. When the offset is very large, for example, the values of the actually derived voltages $V_{BC+CB}$, $V_{AC+CA}$, and $V_{AB+BA}$ may all be positive (the waveforms $640_{BC+CB}$, $640_{AC+CA}$, and $640_{AB+BA}$ are the theoretical waveforms of the voltages $V_{BC+CB}$, $V_{AC+CA}$, and $V_{AB+BA}$, and the actual waveforms of those detected voltages may include an offset). In such a case, the relative determination method can detect the rotor position more stably than the absolute determination method.

Example 3

Example 3 will be described. The absolute determination method and the relative determination method described above may also be implemented in combination. In Example 3, a mixed determination method according to the combination will be described.

Also in the mixed determination method, as in Example 1 and Example 2, the voltages $V_{BC+CB}$, $V_{AC+CA}$, and $V_{AB+BA}$ are derived by executing the 7-pulse application process in each position detection section.

Thereafter, the position detector 53 determines whether the rotor position is within any of the position ranges $R_A[0]$ to $R_A[5]$ by the absolute determination method shown in Example 1, and determines whether the rotor position is within any of the position ranges $R_R[0]$ to $R_R[5]$ by the relative determination method shown in Example 2. Then, the position detector 53 finally determines that the rotor position exists in a position range in which a position range determined as where the rotor position exists by the absolute determination method and a position range determined as where the rotor position exists by the relative determination method overlap with each other. The position detector 53 causes the determination result to be included in the signal $S_{DET}$ as a rotor position detection result.

Figure 17:
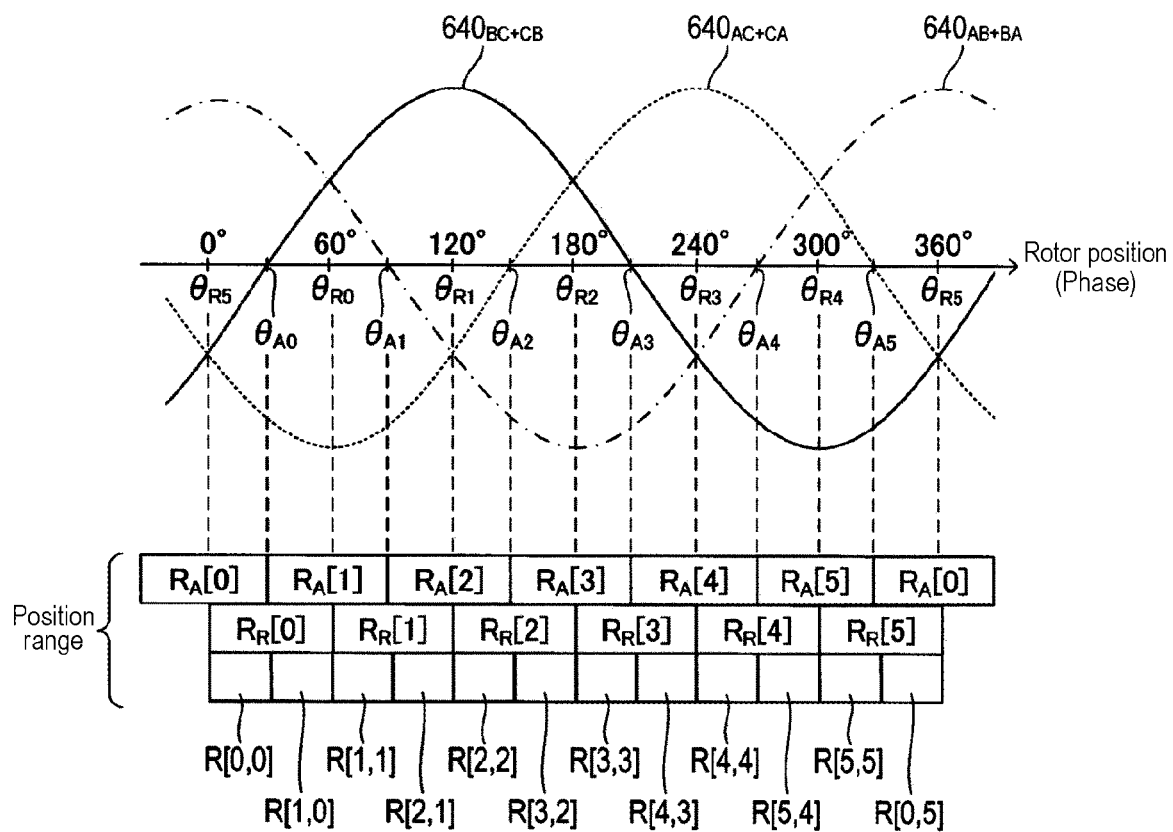
FIG. 17 is an explanatory view of a rotor position detection method according to Example 3 of the present disclosure.

When the mixed determination method is used, it is determined that the rotor position belongs to any one of twelve position ranges R[0, 0] to R[5, 5] shown in FIG. 17. When it is assumed that i and j are integers from zero to five, the position range R[i, j] indicates a position range where the position range $R_A[i]$ and the position range $R_R[j]$ overlap with each other.

Therefore, for example, when it is determined that the rotor position is within the position range $R_A[2]$ by the absolute determination method while it is determined that the rotor position is within the position range $R_R[2]$ by the relative determination method, the position detector 53 adopting the mixed determination method finally determines that the rotor position exists within the position range R[2, 2] (i.e., the range from the electrical angle $\theta_{R1}$ to the electrical angle $\theta_{A2}$) where the position range $R_A[2]$ and the position range $R_R[2]$ overlap with each other. The position detector 53 causes the final determination result to be included in the signal $S_{DET}$ as a rotor position detection result. Similarly, for example, when it is determined that the rotor position is within the position range $R_A[4]$ by the absolute determination method while it is determined that the rotor position is within the position range $R_R[3]$ by the relative determination method, the position detector 53 adopting the mixed determination method finally determines that the rotor position exists within the position range R[4, 3] (i.e., the range from the electrical angle $\theta_{A3}$ to the electrical angle $\theta_{R3}$) where the position range $R_A[4]$ and the position range $R_R[3]$ overlap with each other. The position detector 53 causes the final determination result to be included in the signal $S_{DET}$ as a rotor position detection result.

According to the mixed determination method, the rotor position range is divided into twelve position ranges with the electrical angles $\theta_{A0}$, $\theta_{R0}$, $\theta_{A1}$, $\theta_{R1}$, $\theta_{A2}$, $\theta_{R2}$, $\theta_{A3}$, $\theta_{R3}$, $\theta_{A4}$, $\theta_{R4}$, $\theta_{A5}$, and $\theta_{R5}$ as boundaries, and it is determined whether the rotor position exists in any of the twelve position ranges. The method of setting the values of the electrical angles $\theta_{A0}$ to $\theta_{A5}$ and $\theta_{R0}$ to $\theta_{R5}$ is the same as shown in Example 1 and Example 2.

According to the mixed determination method, the rotor position can be detected with a resolution of 30 degrees, and the detection accuracy can be improved as compared with the case where the absolute determination method or the relative determination method is used alone.

Example 4

Example 4 will be described. In Example 4, a method of determining a length of the pulse application section (i.e., the application time of the detection pulse voltage) in each actual detection section by using the dummy section will be described. In this Example, it is considered that the method is applied to the above-described 7-pulse application process. However, the method described in Example 4 can be applied to a 3-pulse application process and a 5-pulse application process described later.

In the above description, for the sake of convenience, the pulse voltage applied during the pulse application section is referred to as a detection pulse voltage for both the dummy section and the actual detection section. Since the detection pulse voltage applied during the dummy section does not directly affect the detection of the rotor position, the detection pulse voltage applied during the dummy section may be hereinafter referred to as a dummy pulse voltage.

The SPM driver 33 is provided with a current sensor (not shown) that detects a current flowing through the target coil pair. This detection may be realized by detecting a current flowing through the transistor TrH or TrL of each of the half-bridge circuits 50A, 50B, and 50C, or may be realized by detecting a current flowing through the terminals TMA, TMB, or TMC.

In Example 4, the length of the pulse application section in the dummy section and each actual detection section is variable. In the pulse application section of the dummy section, the current flowing through the target coil pair increases over time. The position detection controller 54 acquires the magnitude (absolute value) of the current flowing through the target coil pair in the pulse application section of the dummy section as a current value $I_{SENSE}$ using the current sensor, and compares the current value $I_{SENSE}$ with a predetermined positive limit value $I_{LMT}$. The position detection controller 54 continues the pulse application section of the dummy section until the current value $I_{SENSE}$ reaches the limit value $I_{LMT}$, and terminates the pulse application section of the dummy section when the current value $I_{SENSE}$ reaches the limit value $I_{LMT}$. At this time, the position detection controller 54 measures the length of the pulse application section of the dummy section using its own timer, and holds the measured length as a pulse-on time $T_{ON}$. Thereafter, the position detection controller 54 sets the length of the pulse application section to the pulse-on time $T_{ON}$ in each actual detection section of the position detection section.

That is, the position detection controller 54 measures a time from the start of the application of the dummy pulse voltage to the target coil pair to the time at which the current flowing through the target coil pair reaches the limit value $I_{LMT}$ in the dummy section, and holds the measured time as the pulse-on time $T_{ON}$. The position detection controller 54 sets the pulse-on time $T_{ON}$ to a detection pulse voltage application time in each actual detection section (in each of the actual detection sections P[1] to P[6] in the 7-pulse application process).

As described above, in Example 4, the length of the pulse application section of each actual detection section is dynamically set based on the current flowing through the target coil pair in the pulse application section of the dummy section (the setting method according to Example 4 is referred to as a pulse application length dynamic setting method).

The usefulness of the pulse application length dynamic setting method will be described. In the pulse application section of each actual detection section, the current flowing through the target coil pair increases over time, and shows a peak at the end timing of the pulse application section. On the other hand, the slope of the current flowing through the target coil pair is more stable immediately before the end of the pulse application section than immediately after the start of the pulse application section. Therefore, the sampling timing of the voltage to be observed is set to the timing immediately before the end of the pulse application section. Actually, in each actual detection section, the A/D converter 60 (see FIG. 5D) samples a coil voltage corresponding to the non-target coil at a predetermined sampling timing in the pulse application section. The sampling timing is set to the timing immediately before the end of the pulse application section with reference to the end timing of the pulse application section (the timing just before a predetermined minute time from the end timing of the pulse application section may be set as the sampling timing).

When a peak value of the current flowing through the target coil pair varies in the pulse application section (in other words, when the magnitude of the current flowing through the target coil pair varies during sampling), the rotor position detection may become unstable. The variation in the peak value should theoretically not affect the detection result of the rotor position, but may actually cause an error in detecting the rotor position. As an extreme example, when the peak value is 0.1 ampere, the power supply voltage VPWR is stabilized at a desired voltage. However, when the peak value is one ampere, the power supply voltage VPWR may deviate from the desired voltage to a non-negligible extent. As a result, the rotor position detection may vary. For this reason, it is preferable that the peak value is made constant.

Even when a method of fixing the length of the pulse application section in each actual detection section to a predetermined length (referred to as a pulse application length fixing method) is adopted, the peak value is constant in terms of design. In practice, however, the peak value varies due to environmental factors including a change in the ambient temperature of the IC 30 and a variation in the power supply voltage VPWR.

When the pulse application length dynamic setting method according to Example 4 is used, the peak value can be made constant without depending on the ambient temperature of the IC 30 (the current flowing through the target coil pair at the time of sampling can be made constant). Thus, the rotor position detection can be stabilized.

In the pulse application length dynamic setting method, the pulse-on time $T_{ON}$ may be measured only in the first position detection section. The pulse-on time $T_{ON}$ measured in the first position detection section may be commonly applied to each actual detection section of the first position detection section and the subsequent actual detection sections. Alternatively, the pulse-on time $T_{ON}$ may be measured and set for each position detection section.

In the IC 30, it may be possible to switch the pulse application length dynamic setting method and the pulse application length fixing method. The MPU 22 may specify the use of the pulse application length dynamic setting method and the pulse application length fixing method with respect to the IC 30. Furthermore, the MPU 22 may be able to specify the limit value $I_{LMT}$.

Example 5

Figure 18:
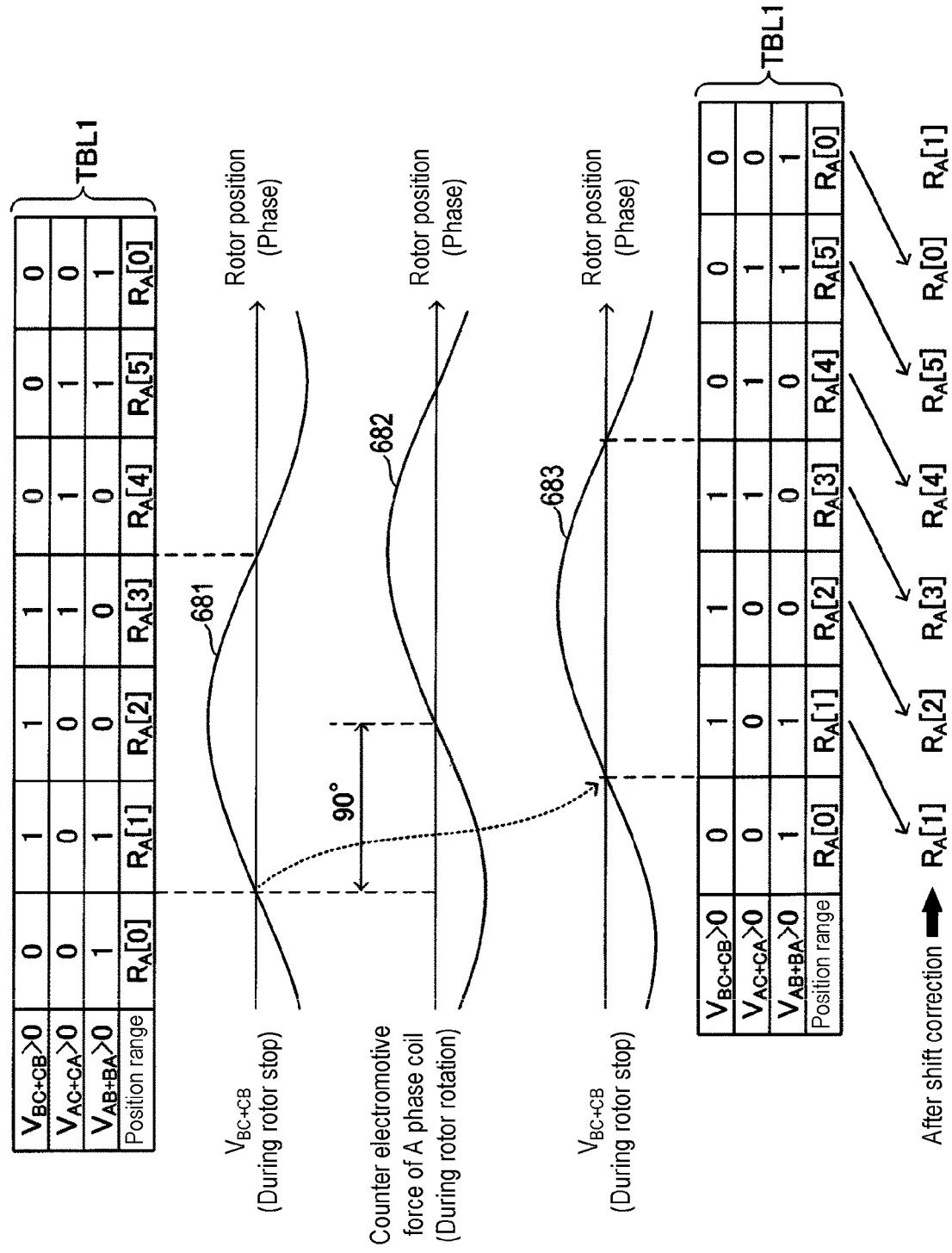
FIG. 18 is an explanatory view of a rotor position detection method according to Example 5 of the present disclosure.

Example 5 will be described. In FIG. 18, a waveform 681 represents a waveform (rotor position dependency) of the voltage $V_{BC+CB}$ when the rotor is stopped, a waveform 682 represents a waveform (rotor position dependency) of a counter electromotive force of the coil 13A when the rotor is rotating, and a waveform 683 represents a waveform (rotor position dependency) of the voltage $V_{BC+CB}$ when the rotor is rotating. As a matter of course, when the rotor is stopped, no counter electromotive force is generated in each coil of the SPM 13 including the coil 13A (that is, the counter electromotive force is zero).

The counter electromotive force of the coil 13A during the rotation of the rotor is delayed in phase by 90 degrees with respect to the voltage $V_{BC+CB}$ related to the coil 13A when the rotor is stopped. For this reason, when the rotor is rotating, the phase of the observed voltage $V_{BC+CB}$ is somewhat delayed as compared with the time at which the rotor is stopped. It is assumed that the above-described rotor position detection using the 7-pulse application process is particularly useful and utilized when the rotor is stopped or when the rotor is accelerated in a low-speed rotation region of the rotor. Therefore, it is often the case that the rotor position detection error does not matter even in the methods of the above-described Examples.

However, the position detection error based on the counter electromotive force may not be negligible depending on a revolution number of the rotor, which is the rotational speed of the rotor. Therefore, the position detector 53 according to Example 5 detects the rotor position in consideration of the revolution number of the rotor.

Figure 19:
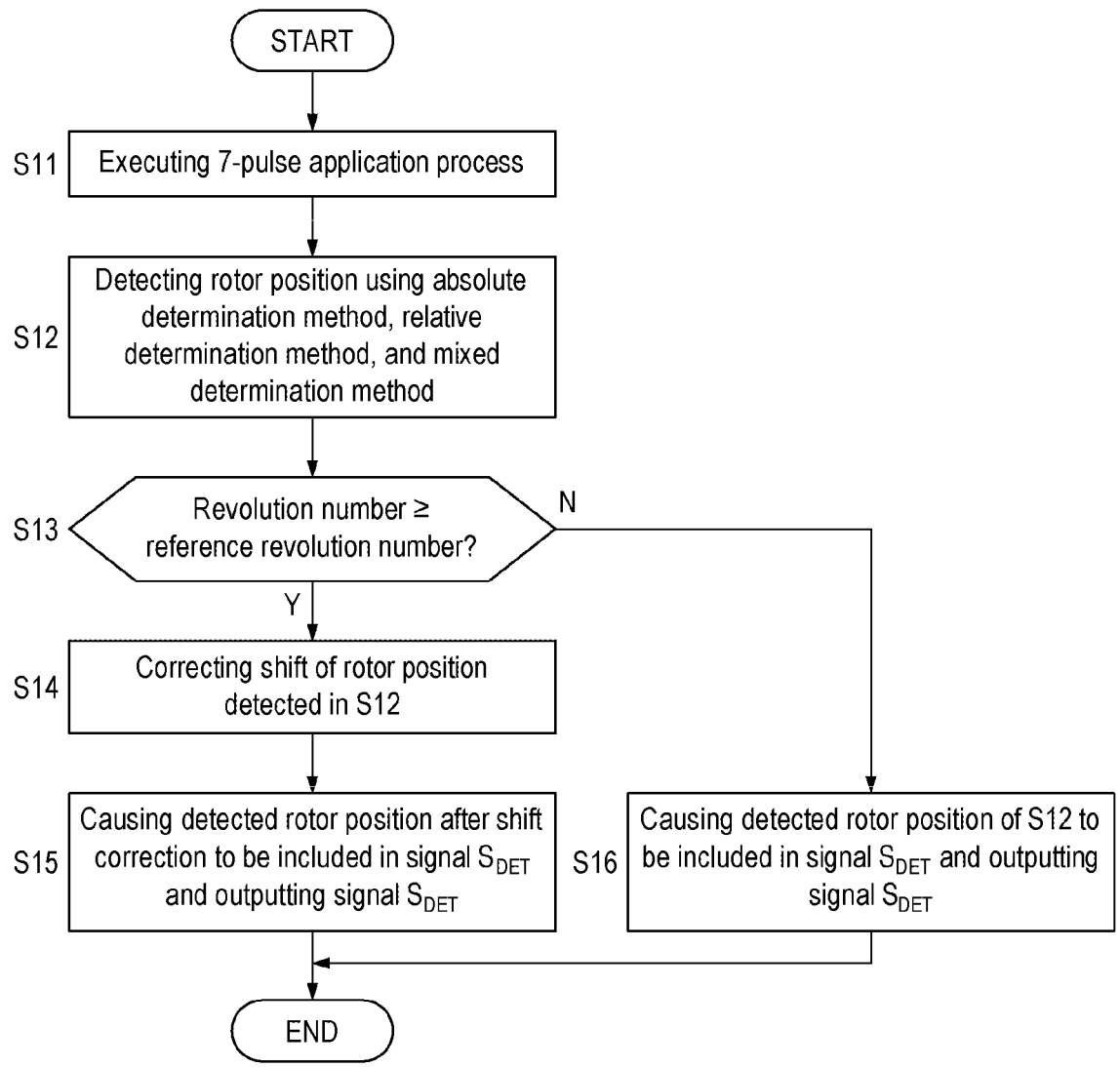
FIG. 19 is a flowchart of a rotor position detection operation according to Example 5 of the present disclosure.

FIG. 19 is a flowchart of a rotor position detection operation according to Example 5. The process including steps S11 to S16 in FIG. 19 may be executed for each position detection section. In the position detection section, first, the above-described 7-pulse application process is executed in step S11. In step S12, the rotor position is once detected (determined) by the absolute determination method shown in Example 1, the relative determination method shown in Example 2, or the mixed determination method shown in Example 3. In subsequent step S13, the position detector 53 determines whether or not a current revolution number of the rotor is equal to or higher than a predetermined reference revolution number (e.g., 200 rpm). The current revolution number of the rotor may be specified from change speeds of a plurality of detected rotor positions on the time series. When the current revolution number of the rotor is equal to or greater than the predetermined reference revolution number, the flow proceeds from step S13 to step S14, and the processes of steps S14 and S15 are performed. Otherwise, the flow proceeds from step S13 to step S16.

In step S14, the position detector 53 performs shift correction of the rotor position detected in step S12. In subsequent step S15, the position detector 53 causes the detected rotor position subjected to the shift correction to be included in the signal $S_{DET}$ as a final rotor position detection result and outputs the signal $S_{DET}$. On the other hand, in step S16, the position detector 53 causes the rotor position itself detected in step S12 to be included in the signal $S_{DET}$ as a final rotor position detection result and outputs the signal $S_{DET}$. The detection result of the rotor position when the flow proceeds to step S16 is the same as shown in Example 1, Example 2, or Example 3.

FIG. 18 shows an outline of the shift correction when the absolute determination method is used. In a case of performing the process of step S12 using the absolute determination method according to Example 1 and the shift correction of step S14 is performed, when it is determined in step S12 that the rotor positions are within the position ranges $R_A[0]$, $R_A[1]$, $R_A[2]$, $R_A[3]$, $R_A[4]$, and $R_A[5]$, the detected rotor positions subjected to the shift correction, which is the final rotor position detection result, fall within the position ranges $R_A[1]$, $R_A[2]$, $R_A[3]$, $R_A[4]$, $R_A[5]$, and $R_A[0]$, respectively. That is, in the shift correction of step S14, the rotor position detection result of step S12 is shifted in the phase advance direction by 60 degrees.

In a case of performing the process of step S12 using the relative determination method according to Example 2 and the shift correction of step S14 is performed, when it is determined in step S12 that the rotor positions are within the position ranges $R_R[0]$, $R_R[1]$, $R_R[2]$, $R_R[3]$, $R_R[4]$, and $R_R[5]$, the detected rotor positions subjected to the shift correction, which is the final rotor position detection result, fall within the position ranges $R_R[1]$, $R_R[2]$, $R_R[3]$, $R_R[4]$, $R_R[5]$, and $R_R[0]$, respectively. That is, in the shift correction of step S14, the rotor position detection result of step S12 is shifted in the phase advance direction by 60 degrees.

In a case of performing the process of step S12 using the mixed determination method according to Example 3 and the shift correction of step S14 is performed, when it is determined in step S12 that the rotor positions are within the position ranges R[0, j], R[1, j], R[2, j], R[3, j], R[4, j], and R[5, j], the detected rotor positions subjected to the shift correction, which is the final rotor position detection result, fall within the position ranges R[1, j], R[2, j], R[3, j], R[4, j], R[5, j], and R[0, j] (where j is 0 or 1), respectively. That is, in the shift correction of step S14, the rotor position detection result of step S12 is shifted in the phase advance direction by 60 degrees.

Alternatively, the shift correction when the mixed determination method is used may be a shift correction of 30 degrees. That is, in the case of performing the process of step S12 using the mixed determination method according to Example 3 and the shift correction of step S14 is performed, when it is determined in step S12 that the rotor positions are within the position ranges R[0, 0], R[1, 0], R[1,1], R[2, 1], R[2, 2], R[3, 2], R[3, 3], R[4, 3], R[4, 4], R[5, 4], R[5, 5], and R[0, 5], the detected rotor positions subjected to the shift correction, which is the final rotor position detection result, may fall within the position ranges R[1, 0], R[1, 1], R[2, 1], R[2, 2], R[3, 2], R[3, 3], R[4, 3], R[4, 4], R[5, 4], R[5, 5], R[0, 5], and R[0, 0], respectively.

When the revolution number of the rotor is equal to or higher than the reference revolution number, instead of first deriving the detected rotor position in the process of step S12 and then performing the shift correction in step S14, a process which combines the processes of steps S12 and S14 may be executed so as to obtain the same result as in the case where the shift correction is performed.

That is, for example, when the absolute determination method according to Example 1 is used and the revolution number of the rotor is equal to or higher than the reference revolution number, the position detector 53 may determine the establishment or non-establishment of the above expressions (C1) to (C3) based on the values of the voltages $V_{BC+CB}$, $V_{AC+CA}$, and $V_{AB+BA}$. When the expression (C1) is not established, the expression (C2) is not established, and the expression (C3) is established, the position detector 53 may determine that the rotor position is within the position range $R_A[1]$. When the expression (C1) is established, the expression (C2) is not established, and the expression (C3) is established, the position detector 53 may determine that the rotor position is within the position range $R_A[2]$. When the expression (C1) is established, the expression (C2) is not established, and the expression (C3) is not established, the position detector 53 may determine that the rotor position is within the position range $R_A[3]$. When the expression (C1) is established, the expression (C2) is established, and the expression (C3) is not established, the position detector 53 may determine that the rotor position is within the position range $R_A[4]$. When the expression (C1) is not established, the expression (C2) is established, and the expression (C3) is not established, the position detector 53 may determine that the rotor position is within the position range $R_A[5]$. When the expression (C1) is not established, the expression (C2) is established, and the expression (C3) is established, the position detector 53 may determine that the rotor position is within the position range $R_A[0]$. The position detector 53 may cause the determination result to be included in the signal $S_{DET}$ as a rotor position detection result. The same may be applied when using the relative determination method or the mixed determination method.

According to the present embodiment, it is possible to reduce the rotor position detection error caused by the counter electromotive force generated in each coil of the SPM 13.

The IC 30 may switch whether to perform the rotor position detection in consideration of the revolution number of the rotor. The MPU 22 may specify whether or not the IC 30 performs the rotor position detection in consideration of the revolution number of the rotor. Furthermore, the MPU 22 may specify the reference revolution number.

Example 6

Example 6 will be described. As described above, any of plural types of pulse train application processes may be performed as the position detection operation in the position detection sections. The 7-pulse application process, which is a reference pulse train application process, may always be performed in the position detection sections that appear one after another. However, once the rotor starts to rotate, a 3-pulse application process (a first modified pulse train application process), which is one type of the pulse train application processes, may be executed in one or more position detection sections. However, the 3-pulse application process can be executed only after the 7-pulse application process is performed one or more times.

Figure 20:
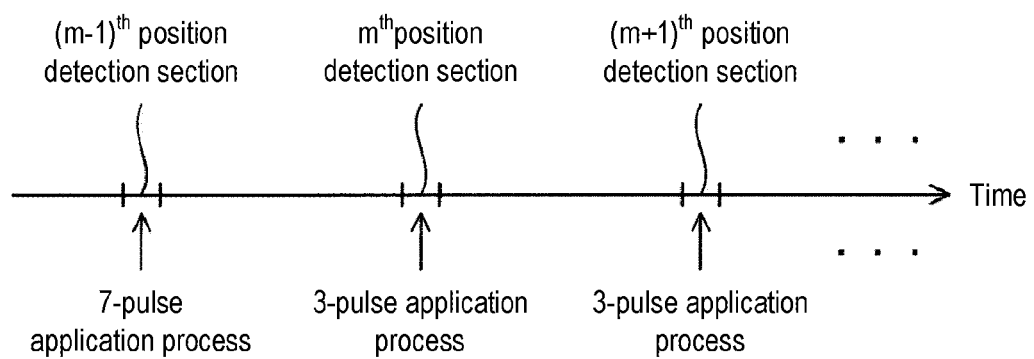
FIG. 20 is a diagram showing contents of pulse application processes in the respective position detection sections assumed in Example 6 of the present disclosure.

For the sake of concrete explanation, it is now assumed that as shown in FIG. 20, the 7-pulse application process and the rotor position detection by the absolute determination method are performed in the $(m-1)^{th}$ position detection section and the 3-pulse application process is executed in the $m^{th}$ position detection section and the subsequent position detection sections (where m is an arbitrary integer of two or more).

Figure 21:
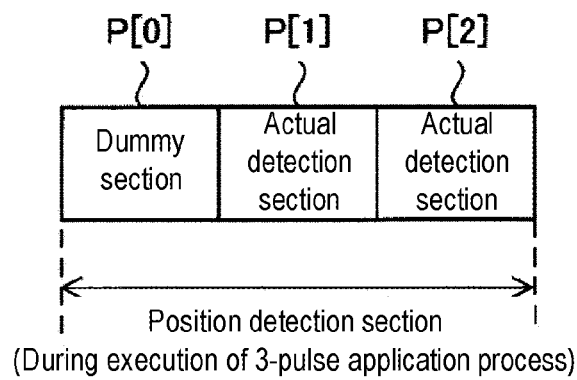
FIG. 21 is a configuration diagram of a position detection section when a 3-pulse application process is executed according to Example 6 of the present disclosure.

As shown in FIG. 21, when the 3-pulse application process is executed in the position detection section, the position detection section includes three sections P[0] to P[2], and does not include sections P[3] to P[6]. That is, the 3-pulse application process is executed using a dummy section corresponding to the section P[0] and two actual detection sections corresponding to the sections P[1] and P[2]. As described above, each of the sections P[0] to P[2] includes a pulse application section and a non-application section (see FIGS. 9A and 9B).

Even when the 3-pulse application process is executed, as in the case where the 7-pulse application process is executed, any of the application process BC, the application process BA, the application process CA, the application process CB, the application process AB, and the application process AC is executed during the pulse application section in one section P[i]. However, at least in the $m^{th}$ position detection section, the target coil pair in the actual detection sections P[1] and P[2] is determined according to the rotor position detection result based on the 7-pulse application process executed in the $(m-1)^{th}$ position detection section.

Figure 22:
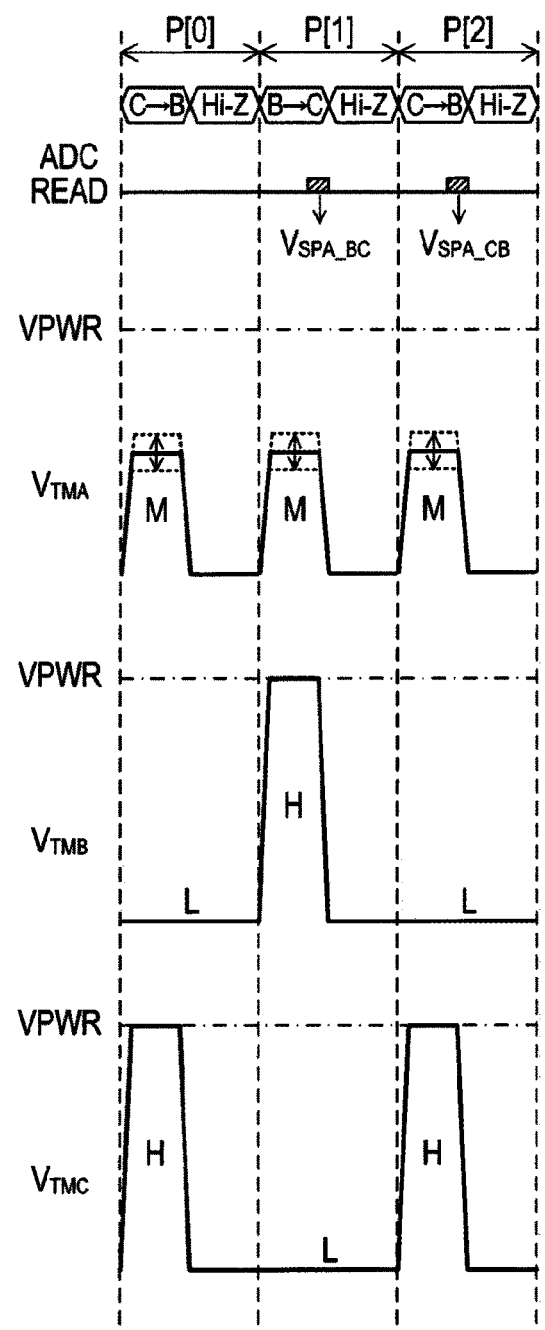
FIG. 22 is a timing chart of the 3-pulse application process according to Example 6 of the present disclosure.

A specific example of the 3-pulse application process will be described with reference to FIG. 22. It is assumed that the rotor position is detected to be within the position range $R_A[3]$ in the 7-pulse application process of the $(m-1)^{th}$ position detection section and that the detection result is included in the signal $S_{DET}$ (this assumption is referred to as an assumption $J_A$ for the sake of convenience). FIG. 22 is a timing chart of the 3-pulse application process executed in the $m^{th}$ position detection section under the assumption $J_A$.

During the rotation of the rotor, zero cross of any of the voltages $V_{BC+CB}$, $V_{AC+CA}$, and $V_{AB+BA}$ occurs one after another. However, after it is detected that the rotor position is within the position range $R_A[3]$ in the 7-pulse application process, the next zero cross should occur in the voltage $V_{BC+CB}$ (see FIG. 13). Therefore, in the 3-pulse application process executed after the rotor position is detected to be within the position range $R_A[3]$ in the 7-pulse application process, it is possible to determine whether or not the rotor position has shifted from the position range $R_A[3]$ to the position range $R_A[4]$ by merely evaluating whether or not the zero cross of the voltage $V_{BC+CB}$ has occurred. Therefore, under the assumption $J_A$, in the 3-pulse application process performed in the $m^{th}$ position detection section, the voltage for deriving the voltage $V_{BC+CB}$ may be sampled in the actual detection sections P[1] and P[2].

Therefore, in the 3-pulse application process of FIG. 22, the application process BC and the application process CB are executed in the pulse application sections of the actual detection sections P[1] and P[2], respectively. In the 3-pulse application process of FIG. 22, the application process CB is executed in the pulse application section of the dummy section P[0].

It can be said that the two application processes executed in the actual detection sections P[1] and P[2] constitute a 2-pulse application process and that the 3-pulse application process is obtained by adding the process in the dummy section P[0] to the 2-pulse application process. As described above, the dummy section P[0] may not be provided. In this case, the 3-pulse application process is the 2-pulse application process itself.

As described in Example 1, in the actual detection section (P[1] in the example of FIG. 22) in which the application process BC is performed, the A/D converter 60 samples the coil voltage $V_{SPA}$ at a predetermined sampling timing in the pulse application section. The value of the coil voltage $V_{SPA}$ obtained by this sampling is denoted by "$V_{SPA\_BC}$." In the actual detection section (P[2] in the example of FIG. 22) in which the application process CB is performed, the A/D converter 60 samples the coil voltage $V_{SPA}$ at a predetermined sampling timing in the pulse application section. The value of the coil voltage $V_{SPA}$ obtained by this sampling is denoted by "$V_{SPA\_CB}$."

The position detector 53 obtains the voltage $V_{BC+CB}$ (in other words, obtains the voltage value $V_{BC+CB}$) from the voltage values $V_{SPA\_BC}$ and $V_{SPA\_CB}$ obtained in the $m^{th}$ position detection section according to the above expression (B1). When the obtained voltage $V_{BC+CB}$ is positive, the position detector 53 determines that the rotor position is still within the position range $R_A[3]$. The position detector 53 causes the determination result to be included in the signal $S_{DET}$ as a detection result of the m$^{th}$ rotor position. On the other hand, when the obtained voltage $V_{BC+CB}$ is negative or zero, the position detector 53 determines that the rotor position has shifted to a position within the position range $R_A[4]$. The position detector 53 causes the determination result to be included in the signal $S_{DET}$ as a detection result of the m$^{th}$ rotor position.

Thus, when the 3-pulse application process is executed after the 7-pulse application process (that is, when the first modified pulse train application process is executed after the reference pulse train application process), a target coil pair (the pair of coils 13B and 13C in the assumption $J_A$) and a non-target coil (the coil 13A in the assumption $J_A$) are set based on the detection result of the rotor position (the position range $R_A[3]$ in the assumption $J_A$) using the 7-pulse application process. Based on the voltages ($V_{SPA\_BC}$ and $V_{SPA\_CB}$ in the assumption $J_A$) generated in the non-target coil in the actual detection sections P[1] and P[2] in the 3-pulse application process, the rotor position is detected through the determination of presence or absence of the zero cross of the sum of those voltages ($V_{BC+CB}$ in the assumption $J_A$).

When it is determined that the rotor position is still within the position range $R_A[3]$ by the 3-pulse application process in the m$^{th}$ position detection section, even in the 3-pulse application process in the (m+1)$^{th}$ position detection section, the position detector 53 executes the application process BC and the application process CB in the actual detection sections P[1] and P[2] to determine the polarity of the voltage $V_{BC+CB}$.

When it is determined that the rotor position has shifted to a position within the position range $R_A[4]$ by the 3-pulse application process in the m$^{th}$ position detection section, the next zero cross should occur in the voltage $V_{AB+BA}$ (see FIG. 13). Therefore, in the 3-pulse application process of the (m+1)$^{th}$ position detection section, the position detector 53 executes the application process AB and the application process BA in the actual detection sections P[1] and P[2] in order to determine the polarity of the voltage $V_{AB+BA}$ (in this case, for example, the application process BA may be executed in the dummy section P[0]).

Figure 23:
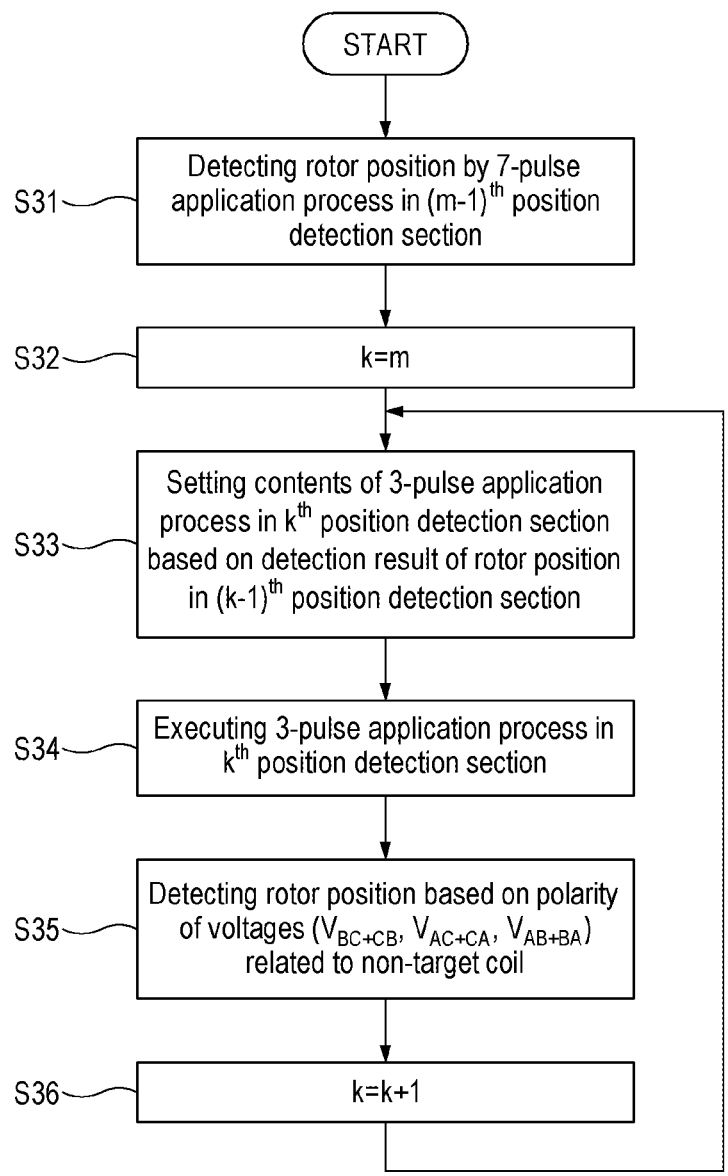
FIG. 23 is a flowchart of a rotor position detection operation according to Example 6 of the present disclosure.

FIG. 23 is a flowchart of a rotor position detection operation starting from the (m−1)$^{th}$ position detection section. In step S31, the 7-pulse application process is executed in the (m−1)$^{th}$ position detection section, and the rotor position is detected by the absolute determination method shown in Example 1. In subsequent step S32, the value "m" is substituted for the variable k, and then the flow proceeds to step S33. In step S33, the position detection controller 54 sets the contents of the 3-pulse application process in the k$^{th}$ position detection section based on the detection result of the rotor position in the (k−1)$^{th}$ position detection section. After step S33, the flow proceeds to step S34.

A method for setting the contents of the 3-pulse application process will be described with reference to FIG. 24. When it is detected that the rotor position is within the position range $R_A[0]$ or $R_A[3]$ in the (k−1)$^{th}$ position detection section, the next zero cross should occur in the voltage $V_{BC+CB}$ (see FIG. 13). Therefore, it is determined that the target coil pair in the k$^{th}$ position detection section is set to the pair of coils 13B and 13C, the non-target coil is set to the coil 13A, and the application processes CB, BC, and CB are executed in the sections P[0], P[1], and P[2] of the k$^{th}$ position detection section, respectively. When it is detected that the rotor position is within the position range $R_A[1]$ or $R_A[4]$ in the (k−1)$^{th}$ position detection section, the next zero cross should occur in the voltage $V_{AB+BA}$ (see FIG. 13). Therefore, it is determined that the target coil pair in the k$^{th}$ position detection section is set to the pair of coils 13A and 13B, the non-target coil is set to the coil 13C, and the application processes BA, AB, and BA are executed in the sections P[0], P[1], and P[2] of the k$^{th}$ position detection section, respectively. When it is detected that the rotor position is within the position range $R_A[2]$ or $R_A[5]$ in the (k−1)$^{th}$ position detection section, the next zero cross should occur in the voltage $V_{AC+CA}$ (see FIG. 13). Therefore, it is determined that the target coil pair in the k$^{th}$ position detection section is set to the pair of coils 13C and 13A, the non-target coil is set to the coil 13B, and the application processes CA, AC, and CA are executed in the sections P[0], P[1], and P[2] of the k$^{th}$ position detection section, respectively. In any case, any one of the application processes BC, BA, CA, CB, AB, and AC may be determined as an application process to be executed in the dummy section P[0] of the k$^{th}$ position detection section.

In step S34, the position detection controller 54 executes the 3-pulse application process in the k$^{th}$ position detection section according to the setting and determination contents of step S33. In subsequent step S35, the position detector 53 detects the rotor position in the k$^{th}$ position detection section based on the polarity of the voltage (i.e., $V_{BC+CB}$, $V_{AC+CA}$, or $V_{AB+BA}$) related to the non-target coil in the 3-pulse application process of the k$^{th}$ position detection section. Thereafter, one is added to the variable k in step S36, and then the flow returns to step S33. The above-described respective steps after step S33 are repeated.

The process of step S35 will be specifically described. For the sake of simplification of description, the cases in which the rotor position in the (k−1)$^{th}$ position detection section is detected to be within the position ranges $R_A[0]$, $R_A[1]$, $R_A[2]$, $R_A[3]$, $R_A[4]$, and $R_A[5]$ are denoted by cases $CASE_A[0]$, $CASE_A[1]$, $CASE_A[2]$, $CASE_A[3]$, $CASE_A[4]$, and $CASE_A[5]$, respectively. In addition, the rotor position in the k$^{th}$ position detection section is denoted by "rotor position $R_{P\_k}$."

In the case $CASE_A[0]$, the polarity of the voltage $V_{BC+CB}$ derived based on the result of the 3-pulse application process of step S34 is determined. When the voltage $V_{BC+CB}$ is negative, it is determined that the rotor position $R_{P\_k}$ is still within the position range $R_A[0]$. When the voltage $V_{BC+CB}$ is zero or positive, it is determined that the rotor position $R_{P\_k}$ has shifted to a position within the position range $R_A[1]$. In the case $CASE_A[1]$, the polarity of the voltage $V_{AB+BA}$ derived based on the result of the 3-pulse application process of step S34 is determined. When the voltage $V_{AB+BA}$ is positive, it is determined that the rotor position $R_{P\_k}$ is still within the position range $R_A[1]$. When the voltage $V_{AB+BA}$ is zero or negative, it is determined that the rotor position $R_{P\_k}$ has shifted to a position within the position range $R_A[2]$. In the case $CASE_A[2]$, the polarity of the voltage $V_{AC+CA}$ derived based on the result of the 3-pulse application process of step S34 is determined. When the voltage $V_{AC+CA}$ is negative, it is determined that the rotor position $R_{P\_k}$ is still within the position range $R_A[2]$. If the voltage $V_{AC+CA}$ is zero or positive, it is determined that the rotor position $R_{P\_k}$ has shifted to a position within the position range $R_A[3]$.

In the case $CASE_A[3]$, the polarity of the voltage $V_{BC+CB}$ derived based on the result of the 3-pulse application process of step S34 is determined. When the voltage $V_{BC+CB}$ is positive, it is determined that the rotor position $R_{P\_k}$ is still within the position range $R_A[3]$. When the voltage $V_{BC+CB}$ is zero or negative, it is determined that the rotor position $R_{P\_k}$ has shifted to a position within the position range $R_A[4]$. In the case $CASE_A[4]$, the polarity of the voltage $V_{AB+BA}$ derived based on the result of the 3-pulse application process of step S34 is determined. When the voltage $V_{AB+BA}$ is negative, it is determined that the rotor position $R_{P\_k}$ is still within the position range $R_A[4]$. When the voltage $V_{AB+BA}$ is zero or positive, it is determined that the rotor position $R_{P\_k}$ has shifted to a position within the position range $R_A[5]$. In the case $CASE_A[5]$, the polarity of the voltage $V_{AC+CA}$ derived based on the result of the 3-pulse application process of step S34 is determined. When the voltage $V_{AC+CA}$ is positive, it is determined that the rotor position $R_{P\_k}$ is still within the position range $R_A[5]$. When the voltage $V_{AC+CA}$ is zero or negative, it is determined that the rotor position $R_{P\_k}$ has shifted to a position within the position range $R_A[0]$.

It can be said that the position detection section that does not contribute to the motor drive should be as short as possible. When the 3-pulse application process is used, the length of the position detection section can be shortened as compared with the case where the 7-pulse application process is used.

The IC 30 may switch the method of continuously using the 7-pulse application process and the method of executing the 3-pulse application process after the 7-pulse application process. The MPU 22 may specify which one of the two methods is used by the IC 30.

Example 7

Example 7 will be described. As described above, any of plural types of pulse train application processes may be performed as the position detection operation in the position detection sections. The 7-pulse application process, which is a reference pulse train application process, may always be performed in the position detection sections that appear one after another. However, once the rotor starts to rotate, a 5-pulse application process (a second modified pulse train application process), which is one type of pulse train application processes, may be executed in one or more position detection sections. However, the 5-pulse application process can be executed only after the 7-pulse application process is performed one or more times.

Figure 25:
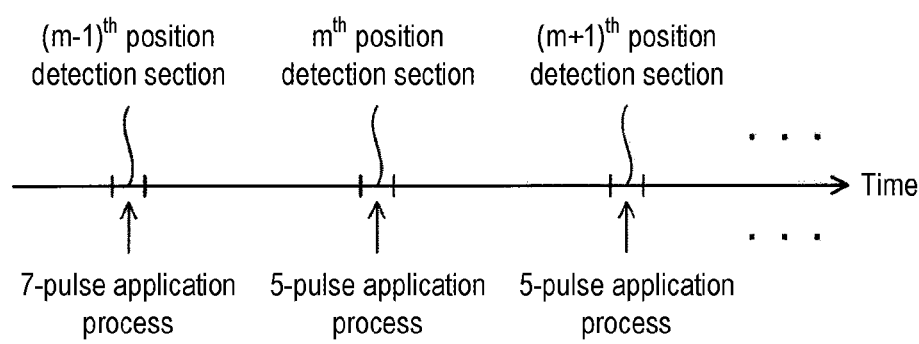
FIG. 25 is a diagram showing contents of a pulse application process in each position detection section assumed in Example 7 of the present disclosure.

For the sake of concrete explanation, it is now assumed that as shown in FIG. 25, the 7-pulse application process and the rotor position detection by the relative determination method are performed in the $(m-1)^{th}$ position detection section and the 5-pulse application process is executed in the $m^{th}$ position detection section and the subsequent position detection sections (where m is an arbitrary integer of two or more).

Figure 26:
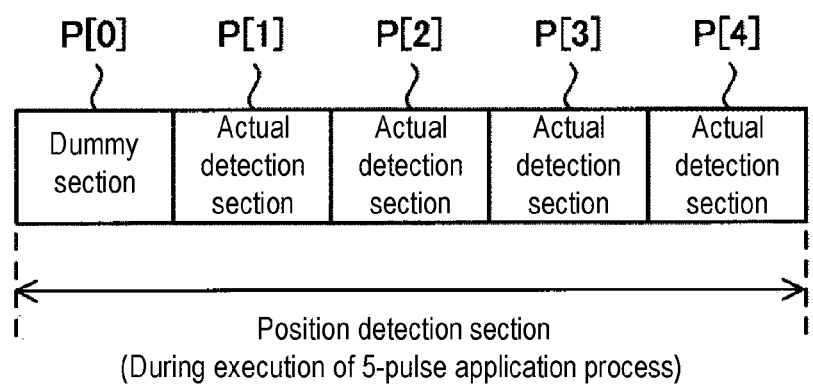
FIG. 26 is a block diagram of a position detection section when a 5-pulse application process is executed according to Example 7 of the present disclosure.

As shown in FIG. 26, when the 5-pulse application process is executed in the position detection section, the position detection section includes five sections P[0] to P[4], and does not include sections P[5] and P[6]. That is, the 5-pulse application process is executed using a dummy section corresponding to the section P[0] and four actual detection sections corresponding to the sections P[1] and P[4]. As described above, each of the sections P[0] to P[4] includes a pulse application section and a non-application section (see FIGS. 9A and 9B).

Even when the 5-pulse application process is executed, as in the case where the 7-pulse application process is executed, any of the application process BC, the application process BA, the application process CA, the application process CB, the application process AB, and the application process AC is executed during the pulse application section in one section P[i]. However, at least in the $m^{th}$ position detection section, the target coil pair in the actual detection sections P[1] to P[4] is determined according to the rotor position detection result based on the 7-pulse application process executed in the $(m-1)^{th}$ position detection section.

Figure 27:
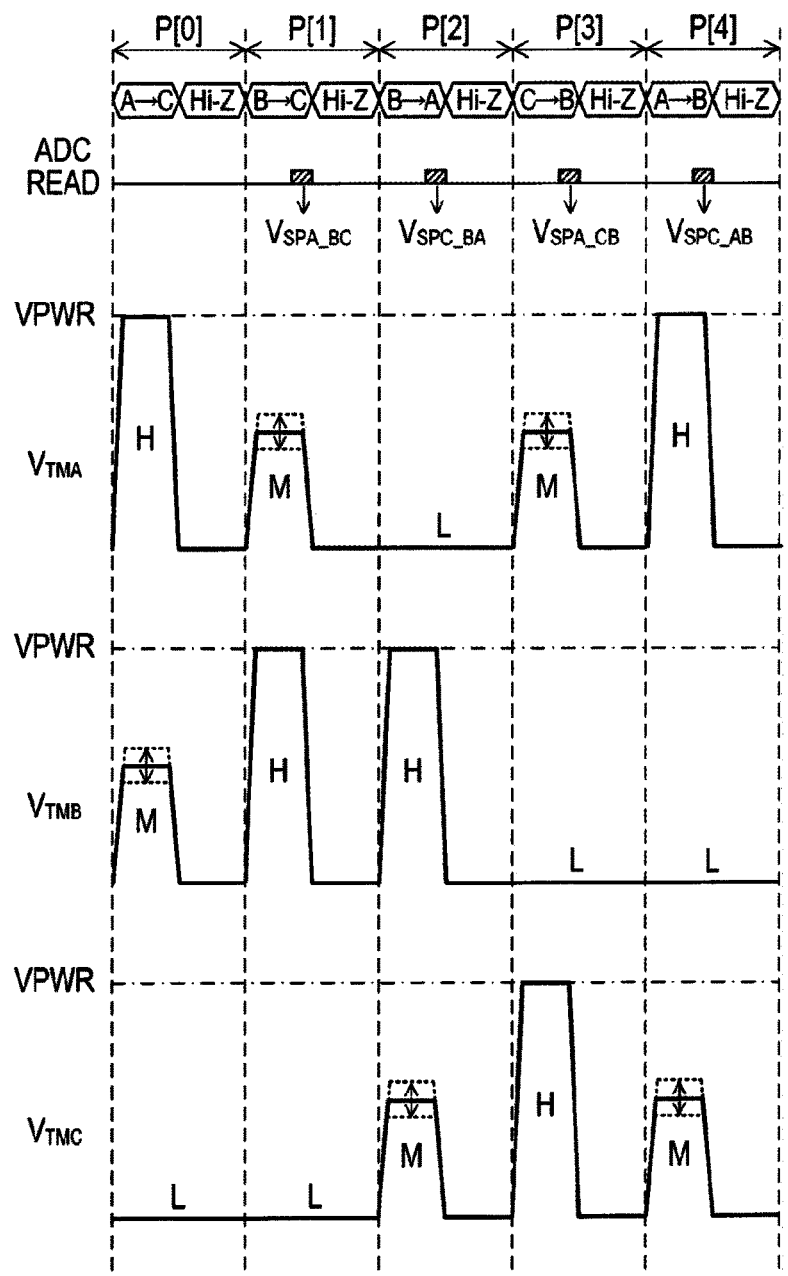
FIG. 27 is a timing chart of the 5-pulse application process according to Example 7 of the present disclosure.

A specific example of the 5-pulse application process will be described with reference to FIG. 27. It is assumed that the rotor position is detected to be within the position range $R_R[3]$ in the 7-pulse application process of the $(m-1)^{th}$ position detection section and that the detection result is included in the signal $S_{DET}$ (this assumption is referred to as an assumption $J_R$ for the sake of convenience). FIG. 27 is a timing chart of the 5-pulse application process executed in the $m^{th}$ position detection section under the assumption $J_R$.

During the rotation of the rotor, two of the voltages $V_{BC+CB}$, $V_{AC+CA}$, and $V_{AB+BA}$ cross one after another (such cross is hereinafter referred to as a voltage cross). That is, the magnitude relationship between the two voltages is reversed. However, after it is detected that the rotor position is within the position range $R_R[3]$ in the 7-pulse application process, the next voltage cross should occur between the voltage $V_{BC+CB}$ and the voltage $V_{AB+BA}$ (see FIG. 15). Therefore, in the 5-pulse application process executed after the rotor position is detected to be within the position range $R_R[3]$ in the 7-pulse application process, it is possible to determine whether or not the rotor position has shifted from the position range $R_R[3]$ to the position range $R_R[4]$ by merely evaluating whether or not the voltage cross has occurred between the voltage $V_{BC+CB}$ and the voltage $V_{AB+BA}$. Therefore, under the assumption $J_R$, in the 5-pulse application process performed in the $m^{th}$ position detection section, the voltages for deriving the voltage $V_{BC+CB}$ and the voltage $V_{AB+BA}$ may be sampled in the actual detection sections P[1] to P[4].

Therefore, in the 5-pulse application process of FIG. 27, the application processes BC, BA, CB, and AB are executed in the pulse application sections of the actual detection sections P[1], P[2], P[3], and P[4], respectively. In the 5-pulse application process of FIG. 27, the application process AC is executed in the pulse application section of the dummy section P[0].

It can be said that the four application processes executed in the actual detection sections P[1] to P[4] constitute a 4-pulse application process and that the 5-pulse application process is obtained by adding the process in the dummy section P[0] to the 4-pulse application process. As described above, the dummy section P[0] may not be provided. In this case, the 5-pulse application process is the 4-pulse application process itself.

In the actual detection sections (P[1], P[2], P[3], and P[4] in the example of FIG. 27) in which the application processes BC, BA, CB, and AB are performed, the A/D converter 60 samples the coil voltages $V_{SPA}$, $V_{SPC}$, $V_{SPA}$, and $V_{SPC}$ at a predetermined sampling timing during the pulse application section, thereby obtaining voltage values $V_{SPA\_BC}$, $V_{SPC\_BA}$, $V_{SPA\_CB}$, and $V_{SPA\_AB}$.

The position detector 53 obtains voltages $V_{BC+CB}$ and $V_{AB+BA}$ (in other words, obtains voltage values $V_{BC+CB}$ and $V_{AB+BA}$) from the voltage values $V_{SPA\_BC}$, $V_{SPC\_BA}$, $V_{SPA\_CB}$, and $V_{SPA\_AB}$ obtained in the $m^{th}$ position detection section according to the above expressions (B1) and (B3). Then, the position detector 53 evaluates the magnitude relationship between the voltages $V_{BC+CB}$ and $V_{AB+BA}$. When "$V_{BC+CB}>V_{AB+BA}$," the position detector 53 determines that the rotor position is still within the position range $R_R[3]$. The position detector 53 causes the determination result to be included in the signal $S_{DET}$ as a detection result of the $m^{th}$ rotor position. On the other hand, when "$V_{BC+CB} \leq V_{AB+BA}$," the position detector 53 determines that the rotor position has shifted to a position within the position range $R_R[4]$. The position detector 53 causes the determination result to be included in the signal $S_{DET}$ as a detection result of the $m^{th}$ rotor position.

Thus, when the 5-pulse application process is executed after the 7-pulse application process (that is, when the second modified pulse train application process is executed after the reference pulse train application process), target coil pairs (the pair of coils 13B and 13C and the pair of coils 13A and 13B in the assumption $J_R$) and non-target coils (the coil 13A and the coil 3B in the assumption $J_R$) are set based on the detection result of the rotor position (the position range $R_R[3]$ in the assumption $J_R$) using the 7-pulse application process. Based on the voltages ($V_{SPA\_BC}$, $V_{SPAC\_BA}$, $V_{SPA\_CB}$, and $V_{SPC\_AB}$ in the assumption $J_R$) generated in the non-target coils in the actual detection sections P[1] to P[4] in the 5-pulse application process, the rotor position is detected.

When it is determined that the rotor position is still within the position range $R_R[3]$ by the 5-pulse application process in the $m^{th}$ position detection section, even in the 3-pulse application process in the $(m+1)^{th}$ position detection section, the position detector 53 executes the application processes BC, BA, CB, and AB in the actual detection sections P[1] to P[4] to evaluate the magnitude relationship between the voltages $V_{BC+CB}$ and $V_{AB+BA}$.

When it is determined that the rotor position has shifted to a position within the position range $R_R[4]$ by the 5-pulse application process in the $m^{th}$ position detection section, the next voltage cross should occur between the voltage $V_{AC+CA}$ and the voltage $V_{AB+BA}$ (see FIG. 15). Therefore, in the 5-pulse application process of the $(m+1)^{th}$ position detection section, the position detector 53 executes the application processes AC, BA, CA, and AB in the actual detection sections P[1] to P[4] in order to determine the magnitude relationship between the voltages $V_{AC+CA}$ and $V_{AB+BA}$ (in this case, for example, the application process BA may be executed in the dummy section P[0]).

Figure 28:
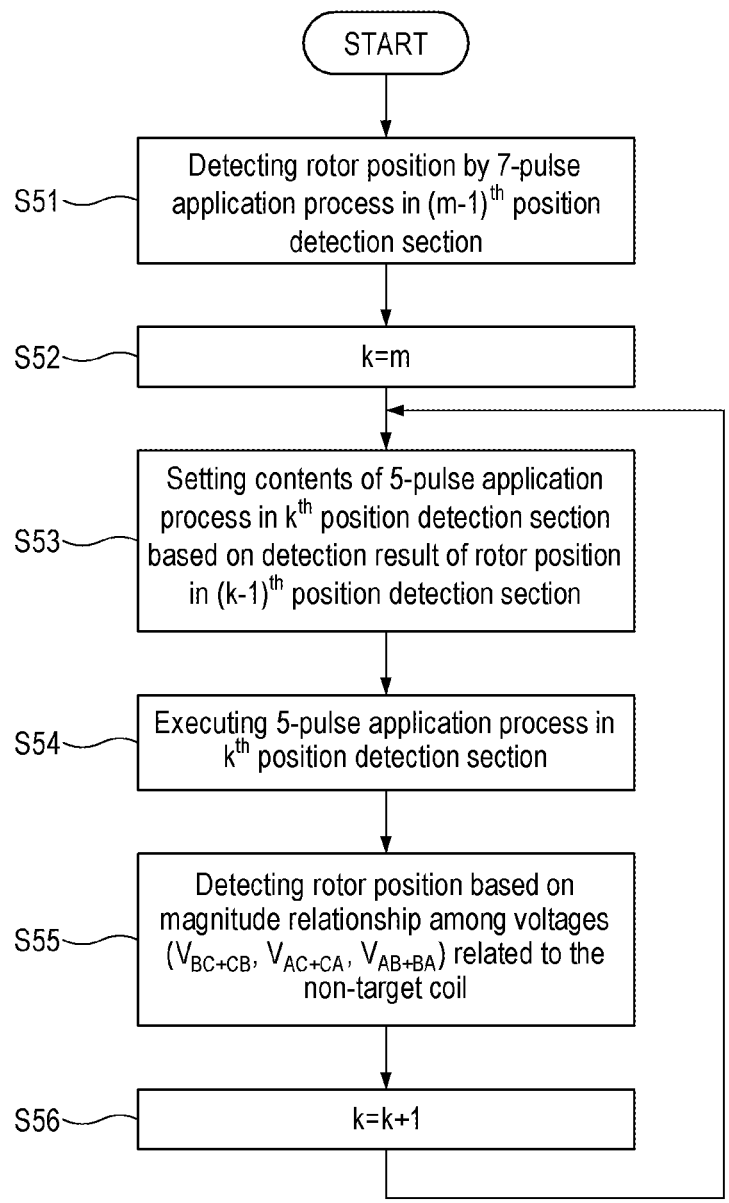
FIG. 28 is a flowchart of a rotor position detection operation according to Example 7 of the present disclosure.

FIG. 28 shows a flowchart of a rotor position detection operation starting from the $(m-1)^{th}$ position detection section. In step S51, the 7-pulse application process is executed in the $(m-1)^{th}$ position detection section, and the rotor position is detected by the relative determination method shown in Example 2. In subsequent step S52, the value "m" is substituted for the variable k, and then the flow proceeds to step S53. In step S53, the position detection controller 54 sets the contents of the 5-pulse application process in the $k^{th}$ position detection section based on the detection result of the rotor position in the $(k-1)^{th}$ position detection section. After step S53, the flow proceeds to step S54.

A method for setting the contents of the 5-pulse application process will be described with reference to FIG. 29. When it is detected that the rotor position is within the position range $R_R[0]$ or $R_R[3]$ in the $(k-1)^{th}$ position detection section, the next voltage cross should occur between the voltage $V_{BC+CB}$ and the voltage $V_{AB+BA}$ (see FIG. 15). Therefore, it is determined that two sets of target coil pairs in the $k^{th}$ position detection section are set to the pair of coils 13B and 13C and the pair of coils 13A and 13B, and the application processes AC, BC, BA, CB, and AB are executed in the sections P[0], P[1], P[2], P[3], and P[4] of the $k^{th}$ position detection section, respectively. When it is detected that the rotor position is within the position range $R_R[1]$ or $R_R[4]$ in the $(k-1)^{th}$ position detection section, the next voltage cross should occur between the voltage $V_{AC+CA}$ and the voltage $V_{AB+BA}$ (see FIG. 15). Therefore, it is determined that two sets of target coil pairs in the $k^{th}$ position detection section are set to the pair of coils 13A and 13C and the pair of coils 13A and 13B, and the application processes BC, AC, BA, CA, and AB are executed in the sections P[0], P[1], P[2], P[3], and P[4] of the $k^{th}$ position detection section, respectively. When it is detected that the rotor position is within the position range $R_R[2]$ or $R_R[5]$ in the $(k-1)^{th}$ position detection section, the next voltage cross should occur between the voltage $V_{BC+CB}$ and the voltage $V_{AC+CA}$ (see FIG. 15). Therefore, it is determined that two sets of target coil pairs in the $k^{th}$ position detection section are set to the pair of coils 13A and 13C and the pair of coils 13B and 13C, and the application processes BA, AC, BC, CA, and CB are executed in the sections P[0], P[1], P[2], P[3], and P[4] of the $k^{th}$ position detection section, respectively. In any case, any one of the application processes BC, BA, CA, CB, AB, and AC may be determined as an application process to be executed in the dummy section P[0] of the $k^{th}$ position detection section.

In step S54, the position detection controller 54 executes the 5-pulse application process in the $k^{th}$ position detection section according to the setting and determination contents of step S53. In subsequent step S55, the position detector 53 detects the rotor position in the $k^{th}$ position detection section based on the magnitude relationship between the voltages (i.e., two of $V_{BC+CB}$, $V_{AC+CA}$, and $V_{AB+BA}$) related to two non-target coils in the 5-pulse application process of the $k^{th}$ position detection section. Thereafter, one is added to the variable k in step S56, and then the flow returns to step S53. The above-described respective processes after step S53 are repeated.

The process of step S55 will be specifically described. For the sake of simplification of description, the cases in which the rotor position in the $(k-1)^{th}$ position detection section is detected to be within the position ranges $R_R[0]$, $R_R[1]$, $R_R[2]$, $R_R[3]$, $R_R[4]$, and $R_R[5]$ are denoted by cases $CASE_R[0]$, $CASE_R[1]$, $CASE_R[2]$, $CASE_R[3]$, $CASE_R[4]$, and $CASE_R[5]$, respectively. In addition, the rotor position in the $k^{th}$ position detection section is denoted by "rotor position $R_{P\_k}$."

In the case $CASE_R[0]$, the magnitude relationship between the voltages $V_{BC+CB}$ and $V_{AB+BA}$ derived based on the result of the 5-pulse application process of step S54 is determined. When "$V_{BC+CB} < V_{AB+BA}$," it is determined that the rotor position $R_{P\_k}$ is still within the position range $R_R[0]$. When "$V_{BC+CB} \geq V_{AB+BA}$," it is determined that the rotor position $R_{P\_k}$ has shifted to a position within the position range $R_R[1]$. In the case $CASE_R[1]$, the magnitude relationship between the voltages $V_{AC+CA}$ and $V_{AB+BA}$ derived based on the result of the 5-pulse application process of step S54 is determined. When "$V_{AC+CA} < V_{AB+BA}$," it is determined that the rotor position $R_{P\_k}$ is still within the position range $R_R[1]$. When "$V_{AC+CA} \geq V_{AB+BA}$," it is determined that the rotor position $R_{P\_k}$ has shifted to a position within the position range $R_R[2]$. In the case $CASE_R[2]$, the magnitude relationship between the voltages $V_{AC+CA}$ and $V_{BC+CB}$ derived based on the result of the 5-pulse application process of step S54 is determined. When "$V_{AC+CA} < V_{BC+CB}$," it is determined that the rotor position $R_{P\_k}$ is still within the position range $R_R[2]$. When "$V_{AC+CA} \geq V_{BC+CB}$," it is determined that the rotor position $R_{P\_k}$ has shifted to a position within the position range $R_R[3]$.

In the case $CASE_R[3]$, the magnitude relationship between the voltages $V_{BC+CB}$ and $V_{AB+BA}$ derived based on the result of the 5-pulse application process of step S54 is determined. When "$V_{BC+CB} > V_{AB+BA}$," it is determined that the rotor position $R_{P\_k}$ is still within the position range $R_R[3]$. When "$V_{BC+CB} \leq V_{AB+BA}$," it is determined that the rotor position $R_{P\_k}$ has shifted to a position within the position range $R_R[4]$. In the case $CASE_R[4]$, the magnitude relationship between the voltages $V_{AC+CA}$ and $V_{AB+BA}$ derived based on the result of the 5-pulse application process of step S54 is determined. When "$V_{AC+CA} > V_{AB+BA}$," it is determined that the rotor position $R_{P\_k}$ is still within the position range $R_R[4]$. When "$V_{AC+CA} \leq V_{AB+BA}$," it is determined that the rotor position $R_{P\_k}$ has shifted to a position within the position range $R_R[5]$. In the case $CASE_R[5]$, the magnitude relationship between the voltages $V_{AC+CA}$ and $V_{BC+CB}$ derived based on the result of the 5-pulse application process of step S54 is determined. When "$V_{AC+CA} > V_{BC+CB}$," it is determined that the rotor position $R_{P\_k}$ is still within the position range $R_R[5]$. When "$V_{AC+CA} \leq V_{BC+CB}$," it is determined that the rotor position $R_{P\_k}$ has shifted to a position within the position range $R_R[0]$.

It can be said that the position detection section that does not contribute to the motor drive should be as short as possible. When the 5-pulse application process is used, the length of the position detection section can be shortened as compared with the case where the 7-pulse application process is used.

The IC 30 may switch the method of continuously using the 7-pulse application process and the method of executing the 5-pulse application process after the 7-pulse application process. The MPU 22 may specify which one of the two methods is used by the IC 30.

In the above-described 3-pulse application process, as in the absolute determination method of the 7-pulse application process, the rotor position is detected based on the polarity of the voltage. For this reason, the 3-pulse application process is directly affected by the offset of the circuit related to the rotor position detection. In some cases, the voltage ($V_{BC+CB}$, $V_{AC+CA}$, or $V_{AB+BA}$) actually derived in the 3-pulse application process may always become positive. In such a case, the rotor position cannot be detected by the 3-pulse application process. Therefore, the rotor position may be detected again by the 5-pulse application process. Thereafter, the rotor position may be detected by the 5-pulse application process.

Example 8

Example 8 will be described. Although not particularly considered so far, the rotation of the rotor in the above description refers to the rotation of the rotor in a first rotation direction (hereinafter referred to as a forward rotation). The rotation of the rotor in a second rotation direction opposite to the first rotation direction may be referred to as a backward rotation. For example, in a case where the electrical angle of the rotor position is 90 degrees, when the rotor rotates forward by 30 degrees, the rotor position becomes 120 degrees. When the rotor rotates backward by 30 degrees, the rotor position becomes 60 degrees.

The HDD device 1 is designed to read and write data from and to the magnetic disk 10 while causing the rotor to rotate forward. For this reason, when the rotor is rotating backward, it is necessary to quickly detect the backward rotation and to return the rotation direction of the rotor to the original direction (i.e., the first rotation direction) or to stop the rotation of the rotor.

The position detector 53 includes a backward rotation detector (not shown). The backward rotation detector detects whether or not the rotor is rotating backward (in other words, the backward rotation detector detects which of the first and second rotations is the rotation direction of the rotor). In Example 8, a first backward rotation detection method for such detection will be described.

Figure 30A:
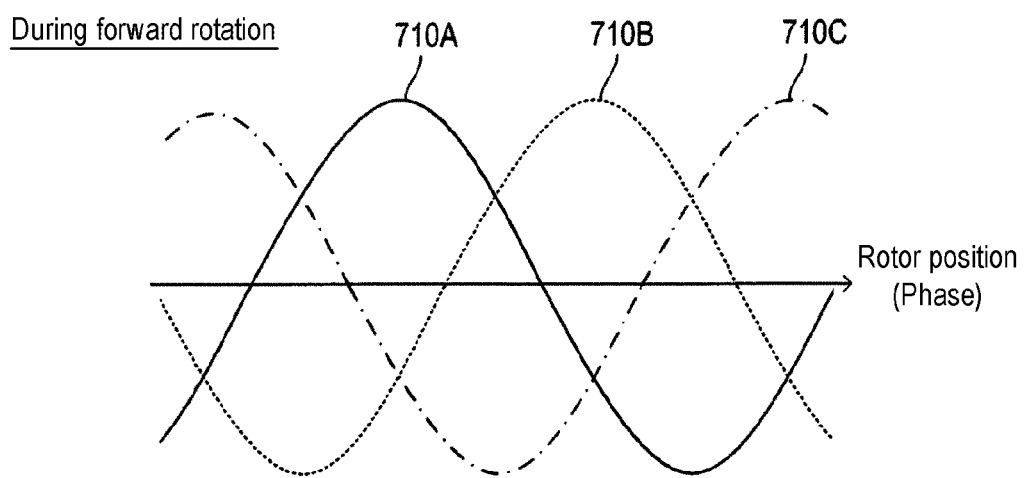
FIGS. 30A and 30B are diagrams illustrating waveforms of a terminal voltage of each coil when a rotor is rotating forward and backward due to inertia according to Example 8 of the present disclosure.
Figure 30B:
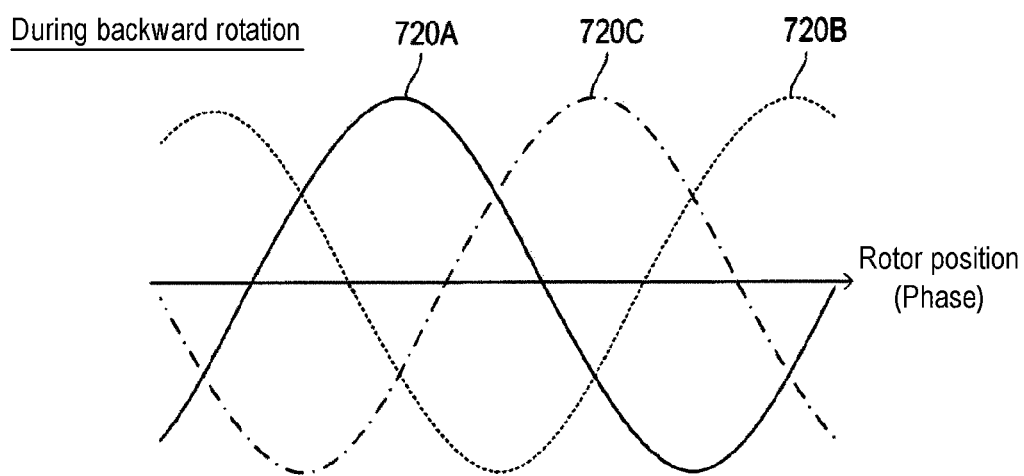

In FIG. 30A, a curved waveform 710A indicated by a solid line, a curved waveform 710B indicated by a broken line, and a curved waveform 710C indicated by a one-dot chain line respectively represent the waveforms of the terminal voltages $V_{TMA}$, $V_{TMB}$, and $V_{TMC}$ when all the half-bridge circuits 50A, 50B, and 50C are in the Hi-Z state and the rotor is rotating forward due to inertia. In FIG. 30B, a curved waveform 720A indicated by a solid line, a curved waveform 720B indicated by a broken line, and a curved waveform 720C indicated by a one-dot chain line respectively represent the waveforms of the terminal voltages $V_{TMA}$, $V_{TMB}$, and $V_{TMC}$ when all the half-bridge circuits 50A, 50B, and 50C are in the Hi-Z state and the rotor is rotating backward due to inertia. When all the half-bridge circuits 50A, 50B, and 50C are in the Hi-Z state, the voltage at the neutral point 13CT is zero, so that "$V_{TMA} = V_{TMA} - V_{CT} = V_{SPA}$," "$V_{TMB} = V_{TMB} - V_{CT} = V_{SPB}$," and "$V_{TMC} = V_{TMC} - V_{CT} = V_{SPC}$." Therefore, the waveforms 710A and 720A are also the waveforms of the coil voltage $V_{SPA}$, the waveforms 710B and 720B are also the waveforms of the coil voltage $V_{SPB}$, and the waveforms 710C and 720C are also the waveforms of the coil voltage $V_{SPC}$. In addition, the coil voltages $V_{SPA}$, $V_{SPB}$, and $V_{SPC}$ when all the half-bridge circuits 50A, 50B, and 50C are in the Hi-Z state are equal to the counter electromotive forces generated in the coils 13A, 13B, and 13C, respectively.

The polarity of the remaining two coil voltages (e.g., $V_{SPB}$ and $V_{SPC}$) when a certain phase coil voltage (e.g., $V_{SPA}$) crosses zero differs between the forward rotation and the backward rotation of the rotor. In the first backward rotation detection method, the forward rotation and backward rotation of the rotor are determined using this characteristic.

Specifically, the position detector 53 determines the forward rotation and backward rotation of the rotor according to the table shown in FIG. 31. The position detection controller 54 may provide a Hi-Z section in which all the half-bridge circuits 50A, 50B, and 50C are temporarily kept in the Hi-Z state at an arbitrary timing when the rotor is rotating forward or backward. The position detector 53 detects the coil voltages $V_{SPA}$ to $V_{SPC}$ (i.e., the counter electromotive forces generated in the coils 13A, 13B, and 13C) in the Hi-Z section, and the polarity of the remaining two coil voltages is determined at the timing when any one of the coil voltages $V_{SPA}$ to $V_{SPC}$ crosses zero, thereby discriminating the forward rotation and backward rotation of the rotor.

More specifically, when "$V_{SPB} > 0$" and "$V_{SPC} < 0$" at the zero cross timing at which the coil voltage $V_{SPA}$ is switched from positive to negative, it is determined that the rotor is rotating forward. When "$V_{SPC} > 0$" and "$V_{SPB} < 0$," it is determined that the rotor is rotating backward. Similarly, when "$V_{SPC} > 0$" and "$V_{SPA} < 0$" at the zero cross timing at which the coil voltage $V_{SPB}$ is switched from positive to negative, it is determined that the rotor is rotating forward. When "$V_{SPA} > 0$" and "$V_{SPC} < 0$," it is determined that the rotor is rotating backward. Similarly, when "$V_{SPA} > 0$" and "$V_{SPB} < 0$" at the zero cross timing at which the coil voltage $V_{SPC}$ is switched from positive to negative, it is determined that the rotor is rotating forward. When "$V_{SPB} > 0$" and "$V_{SPA} < 0$," it is determined that the rotor is rotating backward. Even at the zero cross timing at which the coil voltage $V_{SPA}$, $V_{SPB}$, or $V_{SPC}$ is switched from negative to positive, the forward rotation and the backward rotation of the rotor can be determined in a similar manner. In the first backward rotation detection method, the terminal voltages $V_{TMA}$ to $V_{TMC}$ may be used instead of the coil voltages $V_{SPA}$ to $V_{SPC}$.

Example 9

Example 9 will be described. In Example 9, a second backward rotation detection method using the position detector 53 will be described. The second backward rotation detection method is a backward rotation detection method using the detection result of the rotor position obtained by the above-described 7-pulse application process.

It is assumed that the rotor position is detected with the absolute determination method by executing the 7-pulse application process in the position detection sections that appear one after another. Furthermore, it is assumed that the revolution number of the rotor is set to be low or the insertion period of the position detection section is set, such that the rotor position does not change by 60 degrees or more in between the two adjacent position detection sections. By doing so, when it is determined by the 7-pulse application process in the previous position detection section that the rotor position is within the position range RAW, and when the rotation direction of the rotor is the forward rotation direction (i.e., the first rotation direction), it is expected to be determined by the 7-pulse application process in the current position detection section that the rotor position is within the position range RAW or $R_A[i+1]$ (where "i" is an integer from zero to four). This principle is used in the second backward rotation detection method.

Figure 32:
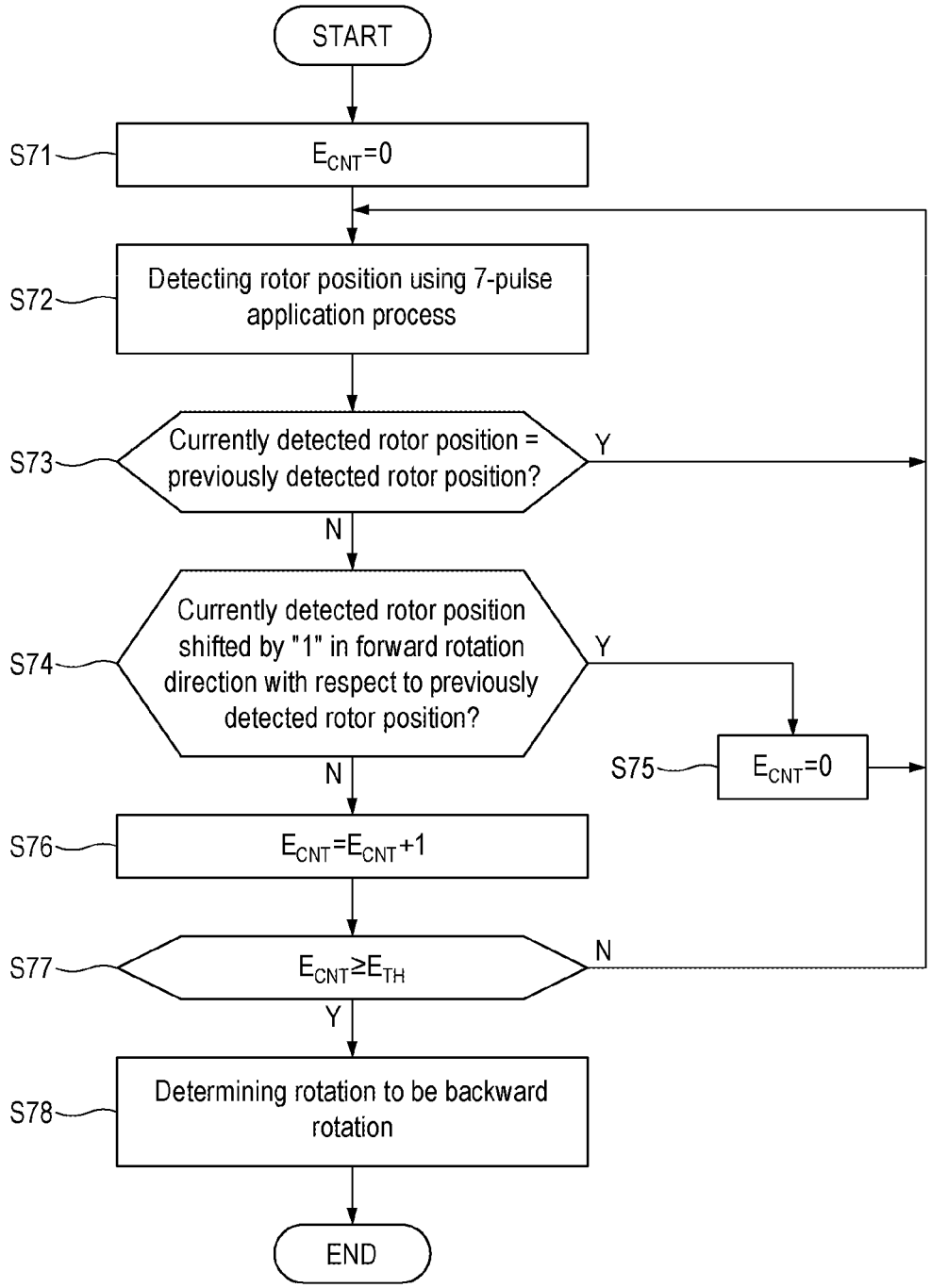
FIG. 32 is a flowchart of a backward rotation detection operation using a second backward rotation detection method according to Example 9 of the present disclosure.

FIG. 32 is a flowchart of a backward rotation detection operation using the second backward rotation detection method. The position detector 53 includes an error counter for counting an error count value $E_{CNT}$. First, in step S71, zero is substituted for the error count value $E_{CNT}$. In subsequent step S72, the rotor position detection using the 7-pulse application process is performed. Unless the flow proceeds to step S78 described later, the process of step S72 is repeatedly performed each time when the position detection section comes. In this regard, it is assumed that the absolute determination method is used in step S72.

In subsequent step S73, the position detector 53 determines whether or not a currently detected rotor position is the same as the previously detected rotor position. The currently detected rotor position refers to the detection result of the rotor position obtained in the latest step S72, and a previously detected rotor position refers to the detection result of the rotor position obtained in step S72 executed once before the currently detected rotor position. When the currently detected rotor position is the same as the previously detected rotor position, the flow returns to step S72. However, when they are different, the flow proceeds to step S74.

In step S74, the position detector 53 determines whether or not the currently detected rotor position is shifted by "1" in the forward rotation direction with respect to the previously detected rotor position. When it is indicated that the previously detected rotor position is a position within the position range $R_A[0]$, $R_A[1]$, $R_A[2]$, $R_A[3]$, $R_A[4]$, and $R_A[5]$, and when it is indicated that the currently detected rotor position is a position within the position range $R_A[1]$, $R_A[2]$, $R_A[3]$, $R_A[4]$, $R_A[5]$, and $R_A[0]$, respectively, the determination in step S74 is "Yes" and the flow proceeds to step S75. Otherwise, the determination in step S74 is "No" and the flow proceeds to step S76. That is, for example, for the integer i satisfying "0≤i≤4," when it is indicated that the previously detected rotor position is a position within the position range $R_A[i]$, and when it is indicated that the currently detected rotor position is a position within the position range $R_A[i+1]$, the determination in step S74 is "Yes" and the flow proceeds to step S75. Otherwise, the determination in step S74 is "No" and the flow proceeds to step S76.

When the flow proceeds to step S75, it is determined that the rotor is rotating forward. Thus, zero is substituted for the error count value $E_{CNT}$, and the flow returns to step S72.

When the flow proceeds to step S76, one is added to the error count value $E_{CNT}$, and the flow proceeds to step S77. In step S77, the error count value $E_{CNT}$ is compared with a predetermined error determination value $E_{TH}$. When the error count value $E_{CNT}$ is equal to or greater than the error determination value $E_{TH}$, the flow proceeds to step S78. Otherwise, the flow returns to step S72. The error determination value $E_{TH}$ has an integer value of one or more. The MPU 22 may specify the error determination value $E_{TH}$ for the IC 30.

In step S78, the position detector 53 determines that the rotor is rotating backward, and the determination result is sent to the drive controller 52 and the position detection controller 54. When it is determined that the rotor is rotating backward, the drive controller 52 stops driving the rotor based on the determination result (that is, the drive controller 52 generates and outputs the drive control signals DRVA, DRVB, and DRVC so that all the half-bridge circuits 50A, 50B, and 50C are maintained in the Hi-Z state).

Figure 33A:
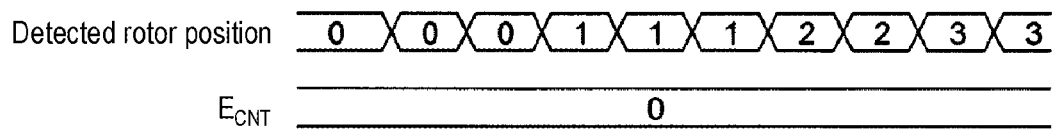
FIGS. 33A to 33C are diagrams showing examples of a relationship between a detected rotor position and an error count value according to Example 9 of the present disclosure.
Figure 33B:
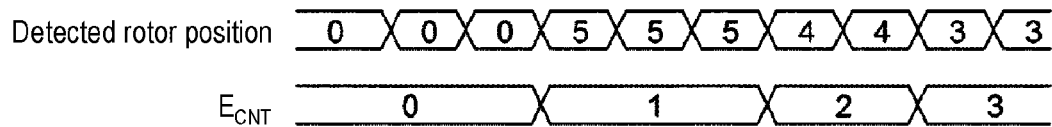
Figure 33C:
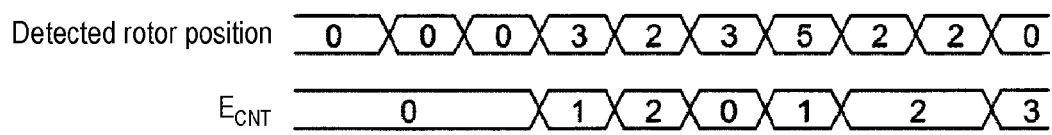

FIG. 33A shows a relationship between the detected rotor position expected during forward rotation and the error count value $E_{CNT}$, and FIG. 33B shows a relationship between the detected rotor position expected during backward rotation and the error count value $E_{CNT}$ (where it is assumed that "$E_{TH}$ 3"). FIG. 33C corresponds to a case where an increase and a decrease in the error count value $E_{CNT}$ are mixed due to the influence of the detection error or the like. The error determination value $E_{TH}$ may be set to "1." However, considering that though rare, the flow may proceed to step S76 even when the rotor is actually rotating forward, it is preferable to set the error determination value $E_{TH}$ to two or more.

In the above description regarding the flowchart of FIG. 32, it is assumed that the absolute determination method is used in step S72. However, the relative determination method may be used in step S72. In this case, when it is indicated that the previously detected rotor position is a position within the position range $R_R[0]$, $R_R[1]$, $R_R[2]$, $R_R[3]$, $R_R[4]$, and $R_R[5]$, and when it is indicated that the currently detected rotor position is a position within the position range $R_R[1]$, $R_R[2]$, $R_R[3]$, $R_R[4]$, $R_R[5]$, and $R_R[0]$, respectively, the determination in step S74 is "Yes" and the flow proceeds to step S75. Otherwise, the determination in step S74 is "No" and the flow proceeds to step S76.

Similarly, the mixed determination method may be used in step S72. In this case, when it is indicated that the previously detected rotor position is a position within the position range R[0, 0], R[1, 0], R[1, 1], R[2, 1], R[2, 2], R[3,2], R[3,3], R[4,3], R[4,4], R[5,4], R[5,5], and R[0,5], and when it is indicated that the currently detected rotor position is a position within the position range R[1, 0], R[1, 1], R[2, 1], R[2, 2], R[3, 2], R[3, 3], R[4, 3], R[4, 4], R[5, 4], R[5, 5], R[0, 5], and R[0, 0], respectively, the determination in step S74 is "Yes" and the flow proceeds to step S75. Otherwise, the determination in step S74 is "No" and the flow proceeds to step S76. However, when the mixed determination method is used, it is assumed that the revolution number of the rotor is set to be low or the insertion period of the position detection section is set, such that the rotor position does not change by 60 degrees or more in between the two adjacent position detection sections.

Example 10

Example 10 will be described. An example of how to use the first and second backward rotation detection methods described above will be described with reference to FIG. 34. FIG. 34 is an operation flowchart of the SPM driver 33 in a process from a rotation stop of the rotor to a rotation of the rotor at a steady speed.

Consideration is made based on a state in which the rotor has already started rotating. In the first step S111 in FIG. 34, the SPM driver 33 comes into a CLC state. The CLC state is a state in which all the half-bridge circuits 50A, 50B, and 50C are in the Hi-Z state and the coil voltages $V_{SPA}$ to $V_{SPC}$ (or the terminal voltages $V_{TMA}$ to $V_{TMC}$) are monitored to extract rotor rotation information. In the CLC state, whether or not the rotor is rotating backward is determined by the first backward rotation detection method. Although not particularly shown in FIG. 34, when it is determined that the rotor is rotating backward, control is executed to return the rotation direction of the rotor to the original direction (i.e., the first rotation direction). Alternatively, control is executed to stop the rotation of the rotor.

When it is determined in step S111 that the rotor is not rotating backward (in other words, when it is determined that the rotor is rotating forward), the revolution number of the rotor is compared with a predetermined value (e.g., 400 rpm) in step S112. When the revolution number of the rotor is equal to or less than the predetermined value, the flow proceeds to step S113. When the revolution number of the rotor is greater than the predetermined value, the flow proceeds to step S116. In step S113, the rotor position is detected using the 7-pulse application process. In subsequent step S114, whether or not the rotor is rotating backward is detected by the second backward rotation detection method. Although not particularly shown in FIG. 34, when it is determined that the rotor is rotating backward, control is executed to stop the rotation of the rotor. When it is determined in step S114 that the rotor is not rotating backward (in other words, when the determination that the rotor is rotating backward is not established), the revolution number of the rotor is compared with a predetermined value (e.g., 400 rpm) in step S115. When the revolution number of the rotor is equal to or less than the predetermined value, the flow proceeds to step S113. When the revolution number of the rotor is greater than the predetermined value, the flow proceeds to step S116.

In step S116, the SPM driver 33 comes into the CLS state. The CLS state is a state in which the rotor is driven in a sine wave. The rotor is accelerated while performing the sine wave drive (step S117). In the CLS state, the detection of the rotor position by the 7-pulse application process, the 3-pulse application process, and the 5-pulse application process described above may be used. However, in the CLS state, the rotor position may be estimated and detected using any known method for estimating a rotor position (e.g., a method of estimating a rotor position through detection of a zero cross point of a counter electromotive force of the coil 13A, 13B, or 13C).

Example 11

Example 11 will be described. In Example 11, modifications of the above-described several techniques will be described.

In the 7-pulse application process shown in FIG. 11, the application process AC is executed in the dummy section P[0]. However, any one of the application processes BC, BA, CA, CB, AB, and AC may be executed in the dummy section P[0] in the 7-pulse application process. The same applies to the dummy section P[0] in the 3-pulse application process and the 5-pulse application process.

In the 7-pulse application process shown in FIG. 11, the application processes BC, BA, CA, CB, AB, and AC are executed in the actual detection sections P[1] to P[6], respectively. As long as the application processes BC, BA, CA, CB, AB, and AC are executed in the actual detection sections P[1] to P[6], the order of these six application processes may be arbitrarily changed.

The same applies to the two application processes executed in the actual detection sections P[1] and P[2] in the 3-pulse application process. That is, in the 3-pulse application process, for example, when it is necessary to execute the application processes BC and CB in the sections P[1] and P[2] (see FIG. 22), it may be possible to first execute any of the application processes BC and CB. The same applies to the four application processes executed in the actual detection sections P[1] to P[4] in the 5-pulse application process. That is, in the 5-pulse application process, for example, when it is necessary to execute the application processes BC, BA, CB, and AB in the sections P[1] to P[4] (see FIG. 27), the execution order of these four application processes may be arbitrary.

Each circuit element of the IC 30 is formed in the form of a semiconductor integrated circuit. A semiconductor device is configured by enclosing the semiconductor integrated circuit in a housing (package) made of a resin. However, a circuit equivalent to the circuit in the IC 30 may be configured by using a plurality of discrete components. Some aforementioned circuit elements (e.g., the transistors TrH and TrL) included in the IC 30 may be provided outside the IC 30 and externally connected to the IC 30. A semiconductor integrated circuit including only the SPM driver 33 may be formed.

In the above-described embodiments, there have been described examples in which the present disclosure is applied to the motor driver device (driver IC 30) for the SPM 13 of the HDD device 1. However, the present disclosure may be widely applied to any motor driver device that drives a motor. For example, the present disclosure may be applied to a motor driver device for driving a fan motor for air cooling.

The transistor TrH may be configured by a P-channel type MOSFET. In addition, the channel type of the FET may be arbitrarily changed.

Each transistor described above may be any type of transistor. For example, the transistor described above as a MOSFET may be replaced by a junction FET, an IGBT (Insulated Gate Bipolar Transistor), or a bipolar transistor. The arbitrary transistor includes a first electrode, a second electrode, and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor that does not belong to the IGBT, one of the first and second electrodes is a collector, the other is an emitter, and the control electrode is a base.

Consideration of Present Disclosure

The present disclosure embodied in the above embodiments is considered.

A motor driver device, which drives a brushless DC motor in a sensorless manner, according to one aspect of the present disclosure includes: a position detector (53) configured to detect a position of a rotor of the brushless DC motor having first to third phase coils (13A, 13B, 13C) connected to one another at a neutral point (13CT) based on a voltage of each of the phase coils; a drive controller (52) configured to generate a drive control signal for rotating the rotor based on a detection result of the position of the rotor obtained by the position detector; and an output stage circuit (51, 50A, 50B, 50C) configured to supply drive voltages to the respective phase coils based on the drive control signal. The motor driver device further includes a position detection controller (54) configured to set a position detection section and cause the output stage circuit to execute a position detection operation in the position detection section. The position detection operation includes a pulse train application process (a 6-pulse application process or a 7-pulse application process including the 6-pulse application process). In the pulse train application process, given that two of the first to third phase coils are set as a target coil pair and a remaining one of the first to third phase coils is set as a non-target coil, the output stage circuit is further configured to, with respect to all combinations of target coil pairs, execute a first process of applying a pulse voltage from a first direction to the target coil pair and a second process of applying a pulse voltage from a second direction opposite to the first direction to the target coil pair, and stops power supply to the non-target coil in the first process and the second process. The position detector detects the position of the rotor based on voltages ($V_{SPA\_BC}$, $V_{SPC\_BA}$, $V_{SPB\_CA}$, $V_{SPA\_CB}$, $V_{SPC\_AB}$, $V_{SPB\_AC}$) generated in the non-target coil in each first process and each second process of the pulse train application process.

Therefore, the rotor position can be satisfactorily detected with a resolution of 60 degrees.

Specifically, for example, in the motor driver device, the pulse train application process may include a first application process of applying the pulse voltage to the target coil pair composed of the first phase coil and the second phase coil with the first phase coil set to a high potential side, a second application process of applying the pulse voltage to the target coil pair composed of the first phase coil and the second phase coil with the second phase coil set to a high potential side, a third application process of applying the pulse voltage to the target coil pair composed of the second phase coil and the third phase coil with the second phase coil set to a high potential side, a fourth application process of applying the pulse voltage to the target coil pair composed of the second phase coil and the third phase coil with the third phase coil set to a high potential side, a fifth application process of applying the pulse voltage to the target coil pair composed of the third phase coil and the first phase coil with the third phase coil set to a high potential side, and a sixth application process of applying the pulse voltage to the target coil pair composed of the third phase coil and the first phase coil with the first phase coil set to a high potential side, wherein the non-target coil may be the third phase coil in the first application process and the second application process. The non-target coil may be the third phase coil in the first application process and the second application process, the first phase coil in the third application process and the fourth application process, and the second phase coil in the fifth application process and the sixth application process. The position detector may detect the position of the rotor based on a first evaluation voltage, a second evaluation voltage, and a third evaluation voltage. The first evaluation voltage, the second evaluation voltage, and the third evaluation voltage may be a sum of voltages generated in the third phase coil in the first application process and the second application process, a sum of voltages generated in the first phase coil in the third application process and the fourth application process, and a sum of voltages generated in the second phase coil in the fifth application process and the sixth application process, respectively.

In the above-described embodiments, the application processes BC, BA, CA, CB, AB, and AC correspond respectively to the first application process to the sixth application process, and the voltages $V_{BC+CB}$, $V_{AC+CA}$, and $V_{AB+BA}$ correspond respectively to the first evaluation voltage to the third evaluation voltage.

In the motor driver device, the position detector may detect the position of the rotor based on polarities of the first evaluation voltage to the third evaluation voltage (which corresponds to the absolute determination method of Example 1). The position detector may detect the position of the rotor based on magnitude relationships among the first evaluation voltage to the third evaluation voltage (which corresponds to the relative determination method of Example 2). The position detector may detect the position of the rotor based on polarities of the first evaluation voltage to the third evaluation voltage and magnitude relationships among the first evaluation voltage to the third evaluation voltage (which corresponds to the mixed determination method of Example 3).

According to the present disclosure in some embodiments, it is possible to provide a motor driver device and a semiconductor device capable of stably detecting a rotor position with a high resolution in a sensorless manner.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver device that drives a brushless direct current (DC) motor in a sensorless manner, the motor driver device comprising:
   a position detector configured to detect a position of a rotor of the brushless DC motor, which has first to third phase coils connected to one another at a neutral point, based on a voltage of each of the phase coils;
   a drive controller configured to generate a drive control signal for rotating the rotor based on a detection result of the position of the rotor obtained by the position detector; and
   an output stage circuit configured to supply drive voltages to the respective phase coils based on the drive control signal,
   wherein the motor driver device further comprises a position detection controller configured to set a position detection section and cause the output stage circuit to execute a position detection operation in the position detection section,
   wherein the position detection operation includes a pulse train application process,
   wherein in the pulse train application process, given that two of the first to third phase coils are set as a target coil pair and a remaining one of the first to third phase coils is set as a non-target coil, the output stage circuit is further configured to, with respect to all combinations of target coil pairs, execute a first process of applying a pulse voltage from a first direction to the target coil pair and a second process of applying a pulse voltage from a second direction opposite to the first direction to the target coil pair, and stop power supply to the non-target coil in the first process and the second process, and wherein the position detector detects the position of the rotor based on voltages generated in the non-target coil in each first process and each second process of the pulse train application process.

2. The motor driver device of claim 1, wherein the pulse train application process includes a first application process of applying the pulse voltage to the target coil pair composed of the first phase coil and the second phase coil with the first phase coil set to a high potential side, a second application process of applying the pulse voltage to the target coil pair composed of the first phase coil and the second phase coil with the second phase coil set to a high potential side, a third application process of applying the pulse voltage to the target coil pair composed of the second phase coil and the third phase coil with the second phase coil set to a high potential side, a fourth application process of applying the pulse voltage to the target coil pair composed of the second phase coil and the third phase coil with the third phase coil set to a high potential side, a fifth application process of applying the pulse voltage to the target coil pair composed of the third phase coil and the first phase coil with the third phase coil set to a high potential side, and a sixth application process of applying the pulse voltage to the target coil pair composed of the third phase coil and the first phase coil with the first phase coil set to a high potential side, wherein the non-target coil is the third phase coil in the first application process and the second application process, the first phase coil in the third application process and the fourth application process, and the second phase coil in the fifth application process and the sixth application process, wherein the position detector detects the position of the rotor based on a first evaluation voltage, a second evaluation voltage, and a third evaluation voltage, and wherein the first evaluation voltage, the second evaluation voltage, and the third evaluation voltage are a sum of voltages generated in the third phase coil in the first application process and the second application process, a sum of voltages generated in the first phase coil in the third application process and the fourth application process, and a sum of voltages generated in the second phase coil in the fifth application process and the sixth application process, respectively.

3. The motor driver device of claim 2, wherein the position detector detects the position of the rotor based on polarities of the first evaluation voltage to the third evaluation voltage.

4. The motor driver device of claim 3, wherein the position detection controller is further configured to:
insert a plurality of position detection sections into a drive section in which the drive voltages are supplied;
cause the output stage circuit to execute a reference pulse train application process, which is the pulse train application process, as the position detection operation in a first position detection section; and then
cause the output stage circuit to execute a modified pulse train application process as the position detection operation in a second position detection section, wherein in the modified pulse train application process, given that two of the first to third phase coils are set as the target coil pair and a remaining one of the first to third phase coils is set as the non-target coil, the output stage circuit is further configured to execute the first process and the second process with respect to the target coil pair, and stop power supply to the non-target coil in the first process and the second process, wherein the position detection controller sets the target coil pair in the modified pulse train application process based on the detection result of the position of the rotor obtained in the reference pulse train application process, and wherein when the modified pulse train application process is executed after the reference pulse train application process, the position detector detects the position of the rotor based on a voltage generated in the non-target coil in the first process and the second process of the modified pulse train application process.

5. The motor driver device of claim 2, wherein the position detector detects the position of the rotor based on magnitude relationships among the first evaluation voltage to the third evaluation voltage.

6. The motor driver device of claim 5, wherein the position detection controller is further configured to:
insert a plurality of position detection sections into a drive section in which the drive voltages are supplied;
cause the output stage circuit to execute a reference pulse train application process, which is the pulse train application process, as the position detection operation in a first position detection section; and then
cause the output stage circuit to execute a modified pulse train application process as the position detection operation in a second position detection section, wherein in the modified pulse train application process, given that two sets of target coil pairs are set such that in each of the two sets, two of the first to third phase coils are set as the target coil pair and a remaining one of the first to third phase coils is set as the non-target coil, the output stage circuit is further configured to execute the first process and the second process with respect to the two sets of target coil pairs, and stop power supply to the non-target coil in the first process and the second process, wherein the position detection controller sets the two sets of target coil pairs in the modified pulse train application process based on the detection result of the position of the rotor obtained in the reference pulse train application process, and wherein when the modified pulse train application process is executed after the reference pulse train application process, the position detector detects the position of the rotor based on a voltage generated in the non-target coil in the first process and the second process of the modified pulse train application process.

7. The motor driver device of claim 2, wherein the position detector detects the position of the rotor based on polarities of the first evaluation voltage to the third evaluation voltage and magnitude relationships among the first evaluation voltage to the third evaluation voltage.

8. The motor driver device of claim 2, wherein the pulse train application process further includes a dummy application process that is executed before the first application process to the sixth application process, and wherein in the dummy application process, the output stage circuit sets two of the first to third phase coils as the target coil pair, applies the pulse voltage to the target coil pair, and stops power supply to a remaining one of the first to third phase coils in the dummy application process.

9. The motor driver device of claim 6, wherein the position detection controller sets an application time of the pulse voltage applied to each target coil pair in the first application process to the sixth application process based on a current flowing through the target coil pair in the dummy application process.

10. The motor driver device of claim 9, wherein the position detection controller measures a time from a start of application of the pulse voltage to the target coil pair to a time at which the current flowing through the target coil pair reaches a predetermined value in the dummy application process, and sets the measured time as the application time of the pulse voltage applied to each target coil pair in the first application process to the sixth application process.

11. The motor driver device of claim 1, wherein the position detector detects the position of the rotor in consideration of a revolution number of the rotor when detecting the position of the rotor from the detection result of the voltage generated in the non-target coil.

12. The motor driver device of claim 1, wherein the motor driver device drives a spindle motor, which rotates a magnetic disk of a magnetic disk device, as the brushless DC motor in a sensorless manner.

13. A semiconductor device that forms the motor driver device of claim 1, wherein the motor driver device is formed of an integrated circuit.

* * * * *